United States Patent
Stebbings

(10) Patent No.: US 7,111,449 B1
(45) Date of Patent: Sep. 26, 2006

(54) GAS HEAT ENGINE

(76) Inventor: David W. Stebbings, 9521 Narragansett Pl., Vienna, VA (US) 22180-3445

( * ) Notice: Subject to any disclaimer, the term of this patent is extended or adjusted under 35 U.S.C. 154(b) by 102 days.

(21) Appl. No.: 10/294,030

(22) Filed: Nov. 14, 2002

Related U.S. Application Data

(63) Continuation-in-part of application No. 09/373,747, filed on Aug. 13, 1999, now abandoned.

(60) Provisional application No. 60/096,695, filed on Aug. 14, 1998.

(51) Int. Cl.
*F02K 3/00* (2006.01)
(52) U.S. Cl. .................................................. 60/269
(58) Field of Classification Search ................. 60/269
See application file for complete search history.

(56) References Cited

U.S. PATENT DOCUMENTS

| | | | |
|---|---|---|---|
| 2,502,332 A | 3/1950 | McCollum |
| 2,542,953 A | 2/1951 | Williams, Jr. |
| 2,663,142 A | 12/1953 | Wilson |
| 2,670,597 A | 3/1954 | Villeméjane |
| 3,323,304 A | 6/1967 | Llobet et al. |
| 3,382,679 A | 5/1968 | Spoerlein |
| 3,750,400 A | 8/1973 | Sharpe |
| 3,768,257 A | 10/1973 | Neuffer |
| 5,417,057 A | 5/1995 | Robey |

OTHER PUBLICATIONS

Anderson, J., Modern Compressible Flow, McGraw-Hill, New York, 1982, pp. 70-71, 127-135, 435-437.

(Continued)

*Primary Examiner*—Michael Koczo, Jr.
(74) *Attorney, Agent, or Firm*—Irah H. Donner; Wilmer Cutler Pickering Hale and Dorr LLP

(57) ABSTRACT

A new type of gas heat engine is described that has several features similar to a gas turbine or jet engine. The engine is developed in many different configurations, each yielding different theoretical advantages and degrees of freedom. All of this family of engines have no moving components, provide heat recovery and operate over a wide range of input gas velocities. The new engines can use higher combustion temperatures and consequently have the potential for improved efficiency over current technology.

There are many theoretical and practical advantages to the new concepts, which give flexibility in both engine design and operating characteristics that are difficult to embody in current turbo jets. Among the most important is the potential for a thermodynamic efficiency which exceeds that of current open cycle gas heat engines at a given pressure ratio.

A new term in the equation of the Enthalpy of a gas is described, which could be exploited in yet other variants of the engine.

An application of special interest that emerges from this work is the potential to design first stage rocket boosters.

The substantiative benefits of the new engines are improved safety to aircraft, fuel economy, reduced engine weight, and cost. Furthermore, the engine concepts can be scaled to create engines of any desired size and power output without the conventional mechanical limits associated with gas turbines.

20 Claims, 37 Drawing Sheets

NEW CLAIMED ENGINE

OTHER PUBLICATIONS

Harman, Richard T.C., Gas Turbine Engineering: Applications, Cycles and Characteristics. New York: Halsted Press. (pp. 40-44).

"Transactions of the AMSE" Journal of Applied Mechanics, Sep., 1961 (pp. 335-338).

A.L. Addy et al., "Supersonic Ejector-Diffuser Theory and Experiments." Research supported by U.S. Army Research Office (Grant No. DAHC 04-74-G-0112) and Dept. of Mechanical and Industrial Engineering, U of IL at Urbana-Champaign, Aug., 1981 (pp. 963-1077).

J.E. Minardi, "Characteristics of High Performance Ejectors." U of Dayton Research Institute, Dayton, OH (pp. 179-279).

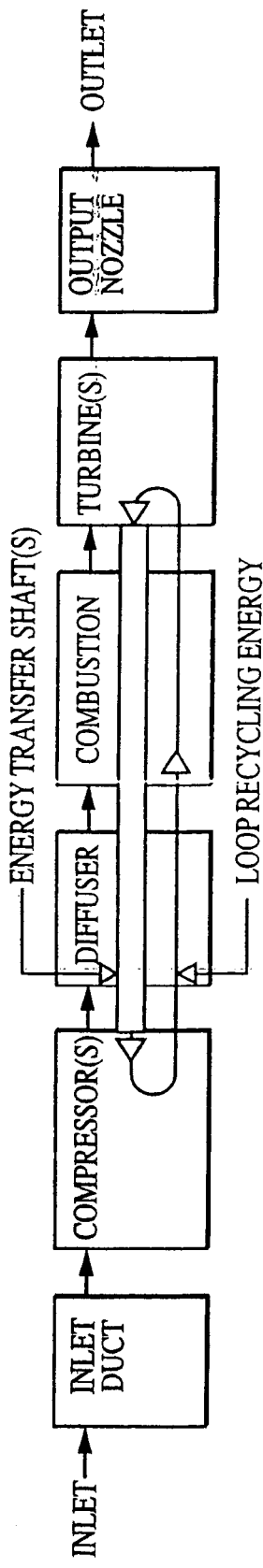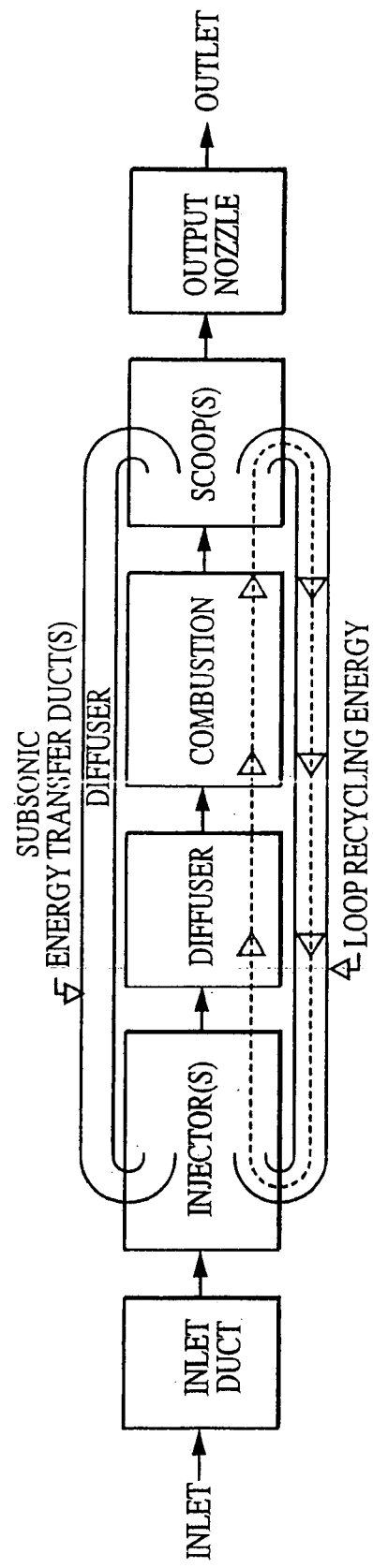

DIAGRAMATIC REPRESENTATION OF MASS FLOWS IN NEW ENGINE

CASCADED ENGINES TO ACCUMULATE INCREASED EXHAUST VELOCITIES

VELOCITY MACH NUMBER VERSUS RAM PRESSURE RATIO

VELOCITY MACH NUMBER VERSUS ALTITUDE,
SHOWING CURVE OF CONSTANT INPUT PRESSURE

SCOOP POSITION IN OUTLET DUCT, AND RELATIONSHIP
BETWEEN GAS PRESSURE, TEMPERATURE AND VELOCITY

NEW ENGINE EQUIVALENT TO A TRIPLE SPOOL FAN-JET
SHOWING VARIOUS POSSIBILITIES WITH THE NEW ENGINE FORMAT. (SIMPLIFICATION)

BLOCK DIAGRAM OF NEW FAN-JET, SHOWING MASS FLOWS

ALTERNATE NEW CLAIMED ENGINE CONFIGURATION, WITH TWO COMBUSTION SYSTEMS, BASICALLY EQUIVALENT TO STANDARD LAYOUT

ALTERNATE ENGINE CONFIGURATION, SHOWING EQUIVALENCE OF PRESSURES, TEMPERATURES AND VELOCITIES OF THE SYSTEM GASSES AND FUEL FLOWS, TO THE NEW CLAIMED ENGINE.

BLOCK DIAGRAM OF TYPE II ENGINE WITH LOOP COMBUSTION ONLY

NEW CLAIMED ENGINE EQUIVALENT TO A GAS TURBINE FAN-JET, BLOCK DIAGRAM SHOWING MASS FLOWS.

Figure 14

| Altitude Ft. | Altitude km | $T_a$ °K | $P_a$ (N/m²) | kg/m³ $\rho$ | $C_p$ J/kgK | $\gamma$ | c m/s | $\frac{\gamma}{\gamma-1}$ | $\frac{\gamma-1}{2}$ | $P_a$ bur | $P_{SL}/P_a$ | M for $P_r=P_{SL}$ | V m/s |
|---|---|---|---|---|---|---|---|---|---|---|---|---|---|
| 0 | 0 | 288 | 101,325 | 1.226 | 1005.7 | 1.3993 | 340.10 | 3.5044 | 0.1996 | 1 | 1 | 0 | 0 |
| 5,000 | 1.515 | 278 | 83,937 | 1.052 | 1003.8 | 1.4000 | 334.22 | 3.5000 | 0.2000 | 0.8284 | 1.2072 | 0.7251 | 242.3 |
| 10,000 | 3.03 | 268.5 | 69,932 | .9075 | 1002.0 | 1.4014 | 328.6 | 3.4913 | 0.2007 | 0.6902 | 1.4489 | 0.7472 | 245.5 |
| 15,000 | 4.55 | 258.5 | 57,298 | .7723 | 1000 | 1.4025 | 322.6 | 3.4845 | 0.2012 | 0.5655 | 1.7684 | 0.9399 | 302.2 |
| 20,000 | 6.06 | 249 | 47,072 | .6587 | 998.1 | 1.4036 | 316.7 | 3.4777 | 0.2018 | 0.4646 | 2.1526 | 1.1055 | 350.1 |
| 30,000 | 9.1 | 229 | 30,329 | .4610 | 994.2 | 1.4059 | 304.0 | 3.4637 | 0.2030 | 0.2993 | 3.3409 | 1.4326 | 435.5 |
| 40,000 | 12.12 | 217 | 23,991 | .3852 | 991.8 | 1.4072 | 296.0 | 3.4558 | 0.2036 | 0.2368 | 4.2235 | 1.5939 | 471.85 |
| 57,500 | 17.5 | 217 | 8,171 | 1.312-1 | 991.8 | 1.4072 | 296.0 | 3.4558 | 0.2036 | 8.064$_{10}$-2 | 12.40 | 2.295 | 679.22 |
| 87,500 | 26.7 | 230 | 2,020 | 3.06-2 | 994.2 | 1.4059 | 304.0 | 3.4637 | 0.2030 | 1.994$_{10}$-3 | 50.16 | 3.214 | 977.0 |
| 116,000 | 35.4 | 250 | 528.1 | 7.36-3 | 998.1 | 1.4036 | 316.7 | 3.4777 | 0.2018 | 5.21$_{10}$-3 | 191.9 | 4.1848 | 1325.3 |
| 156,000 | 47.5 | 278 | 117.3 | 1.47-3 | 1003.8 | 1.4000 | 334.2 | 3.5000 | 0.2000 | 1.16$_{10}$-3 | 863.8 | 5.4323 | 1815.5 |
| 182,000 | 55.5 | 265 | 43.8 | 5.76-4 | 1002 | 1.4014 | 328.6 | 3.4913 | 0.2007 | 4.32$_{10}$-4 | 2,313.3 | 6.3904 | 2099.9 |
| 200,000 | 60.61 | 255 | 14.0 | 7.42-5 | 1000 | 1.4025 | 322.6 | 3.4845 | 0.2012 | 1.38$_{10}$-4 | 7,237 | 7.6622 | 2471.8 |
| 250,000 | 75.76 | 183 | 2.11 | 4.02-5 | 985 | 1.4112 | 272.2 | 3.4319 | 0.2056 | 2.08$_{10}$-5 | 48,021 | 10.3738 | 2823.7 |

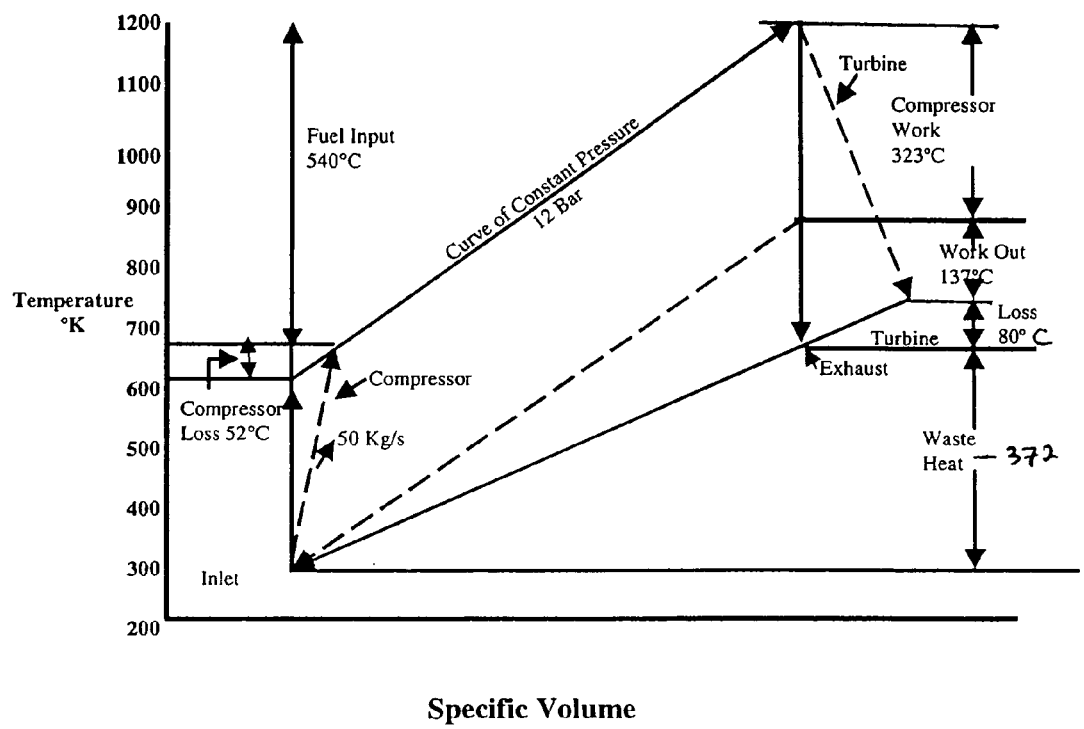
Figure 15 Cycle Diagram of Standard Turbo-Jet

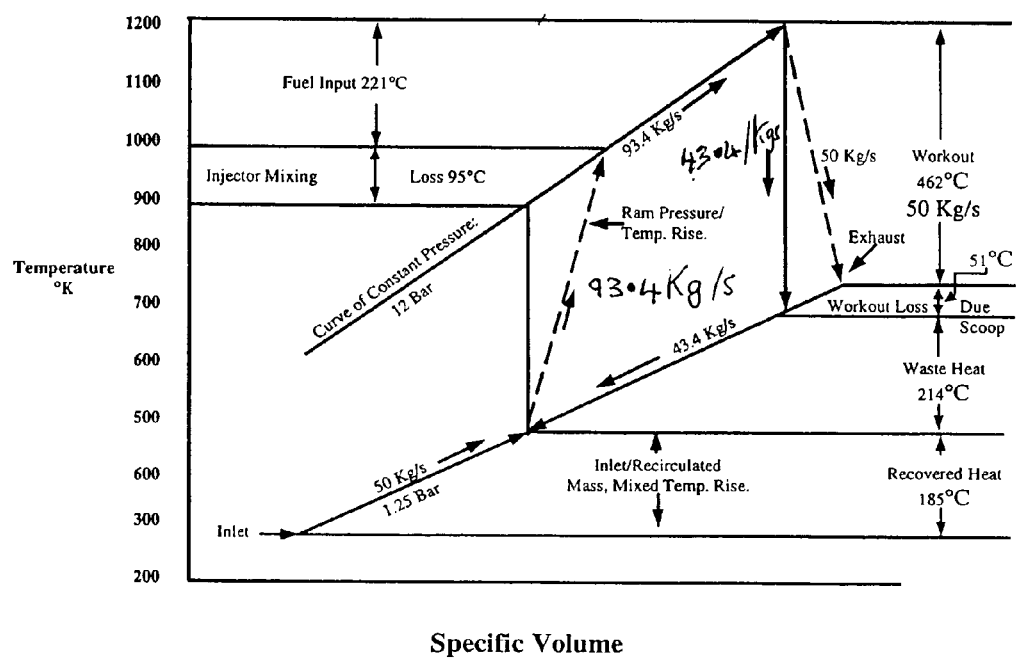
Figure 16    Cycle Diagram of the new Engine

Figure 17  Calculation of Transit Time for Engine Described in Section 6
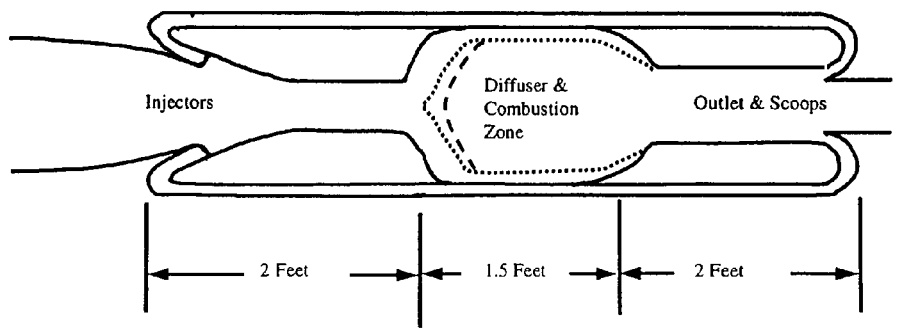
| Component | Length Feet | Min. Velocity Feet/second | Delay Msec | Max. Velocity Feet/second | Delay Msec |
|---|---|---|---|---|---|
| Injectors | 2.0 | 700 | 2.8 | 2,400 | 0.8 |
| Diffuser & Combustion | 1.5 | 300 | 5.0 | 600 | 2.5 |
| Outlet & Scoops (Average) | 2.0 | 700 | 2.8 | 2,000 | 1.0 |
| Recirculation Loop Duct | 5.5 | 1,000 | 5.5 | 3,500 | 1.6 |
| Total Round-Trip | 11.0 | | 16.1 | | 5.9 |
| Corresponding Frequency | | | 62.1 Hz | | 169.0 Hz |
| $t_r$ = Rise Time = $T_r$ Delay | | | 50.6 ms | | 18.5 ms |
| Average $t_r$ = 35.0 ms | | | | | |

Figure 18    Two Engines Thrust Modulated in Anti-Phase to Cancel D.C. Component
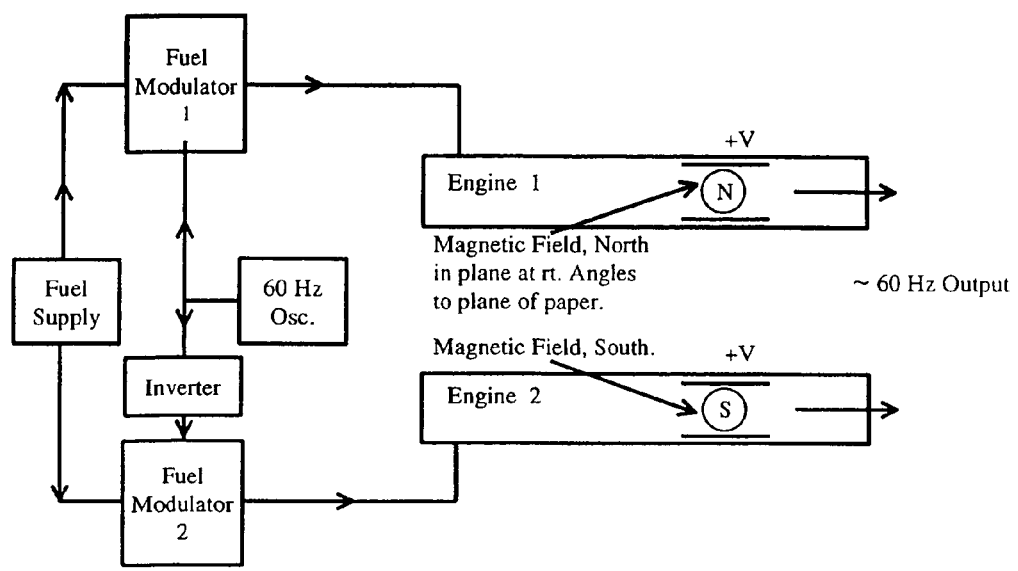
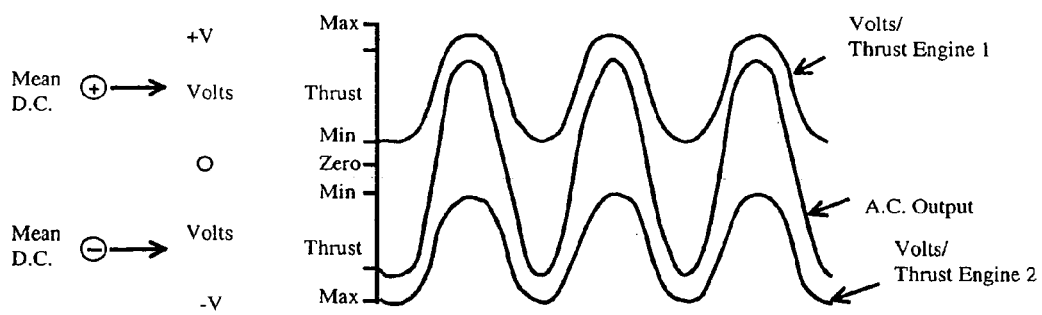

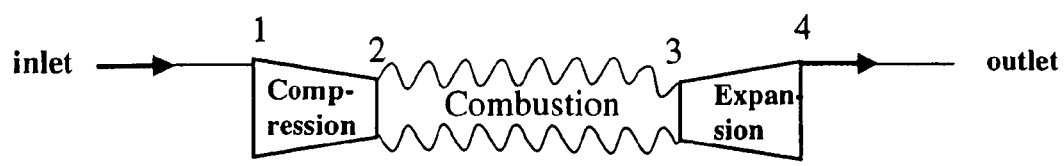
Figure 19   Working Fluid Stations

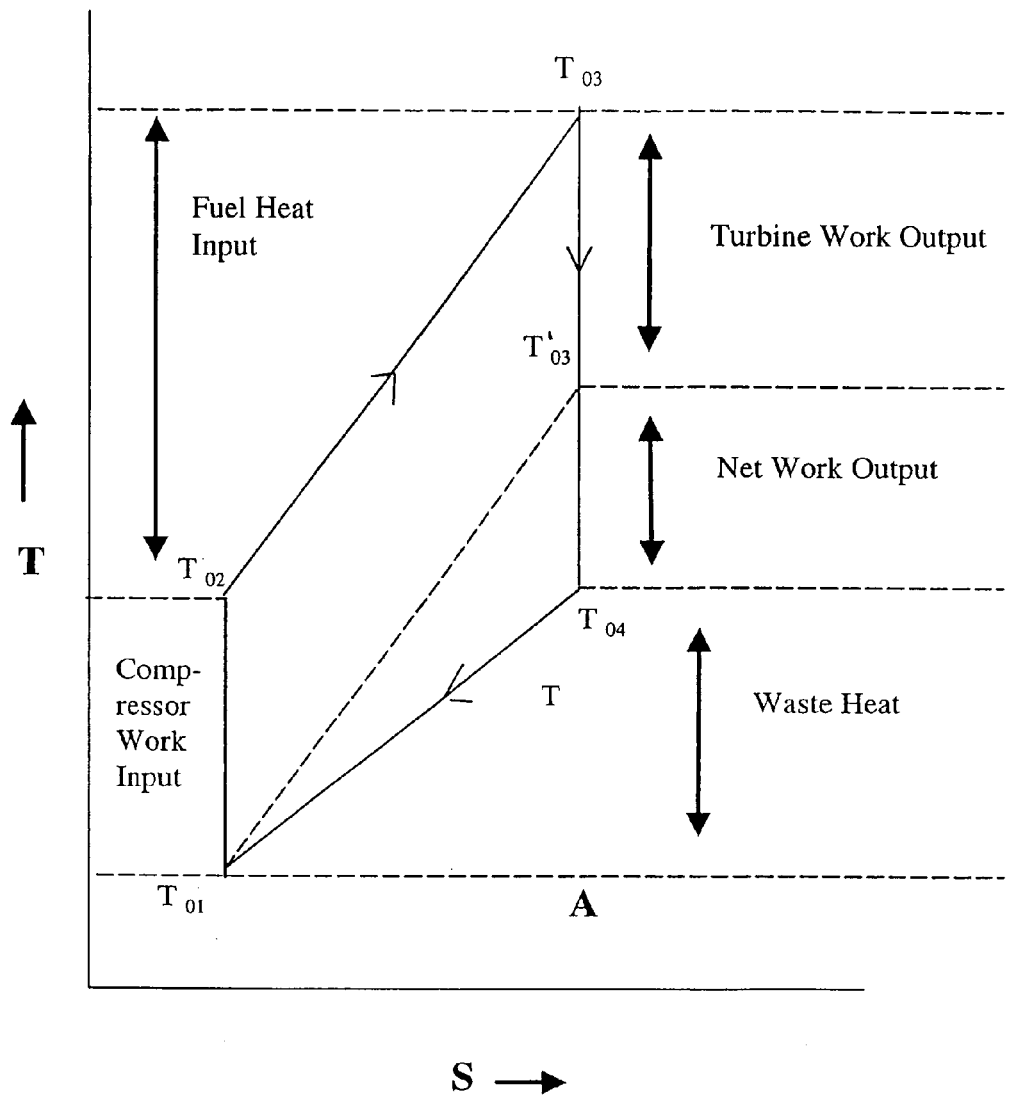
Figure 20. Idealized Gas Turbine Cycle.

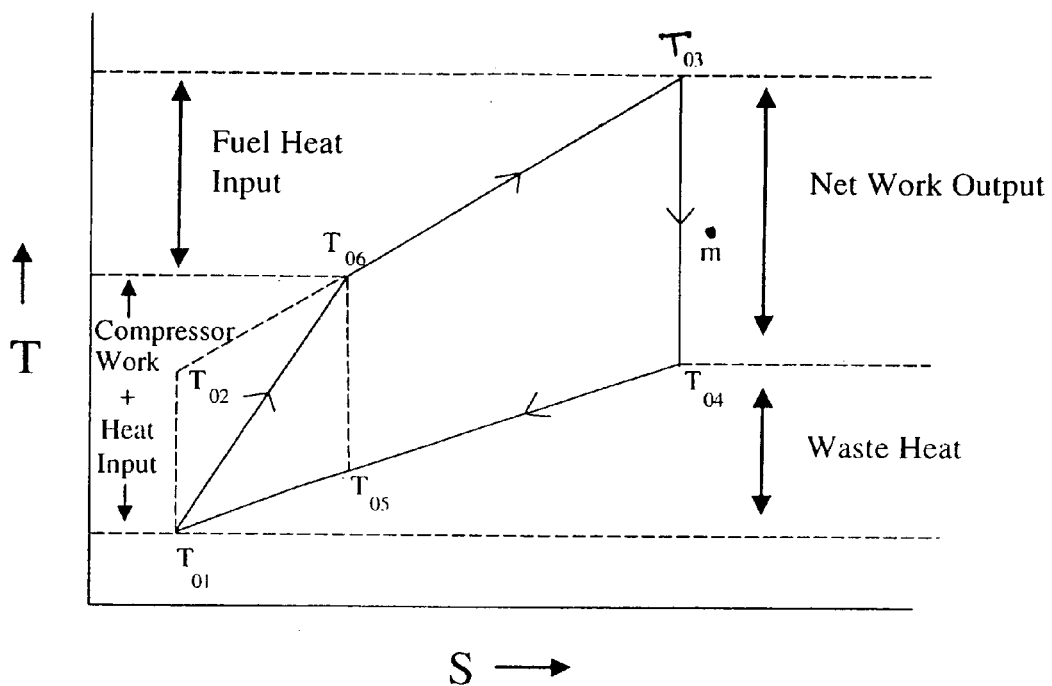
Figure 21. New Engine Type 1 Overall Mass-Flow Cycle

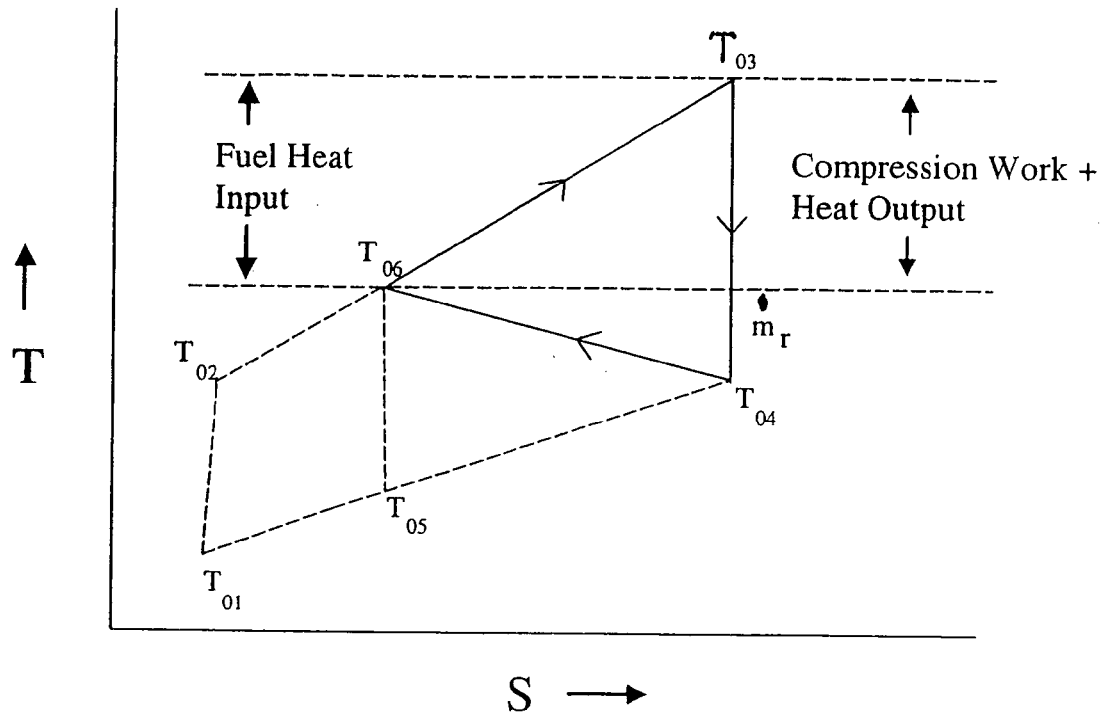
Figure 22.   New Engine Type 1 Recirculating Mass-Flow Cycle

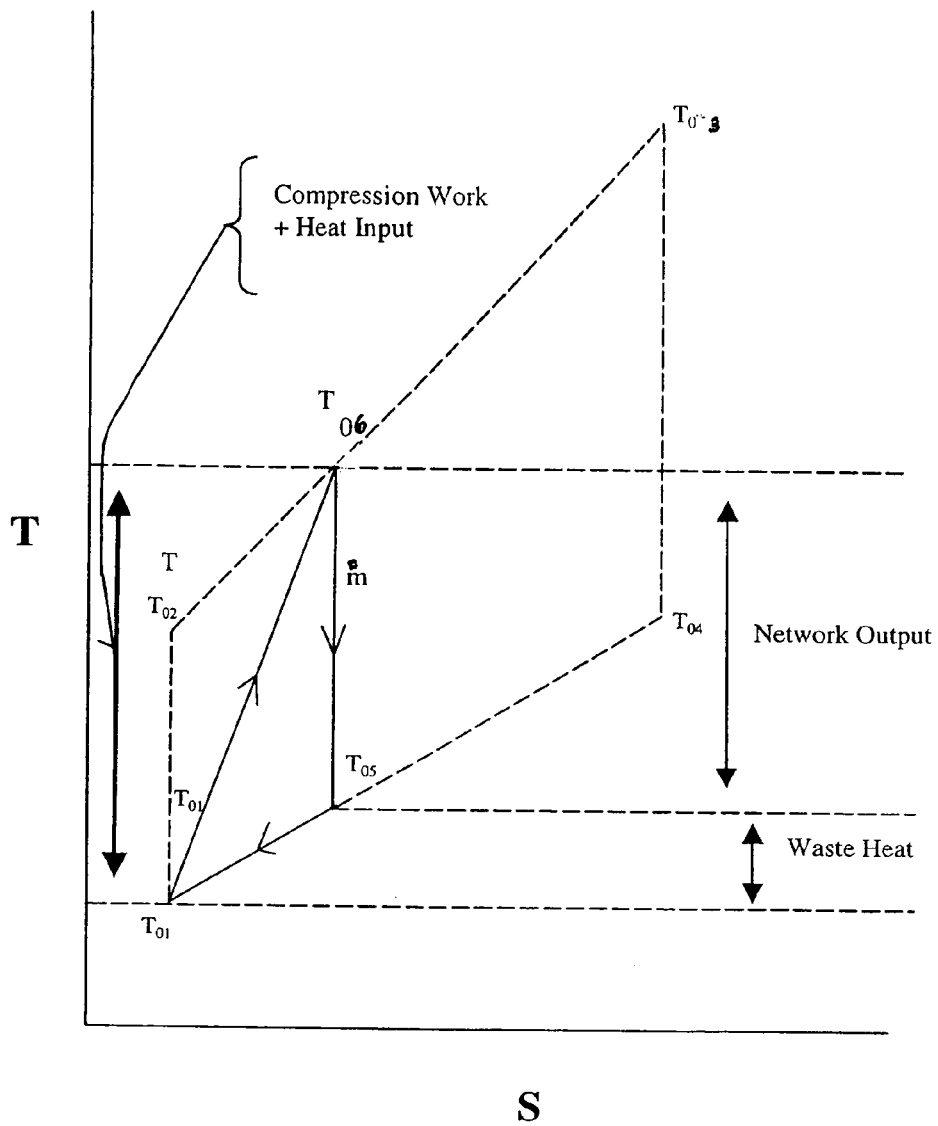
Figure 23.  New Engine Type 2 Overall Mass-Flow Cycle

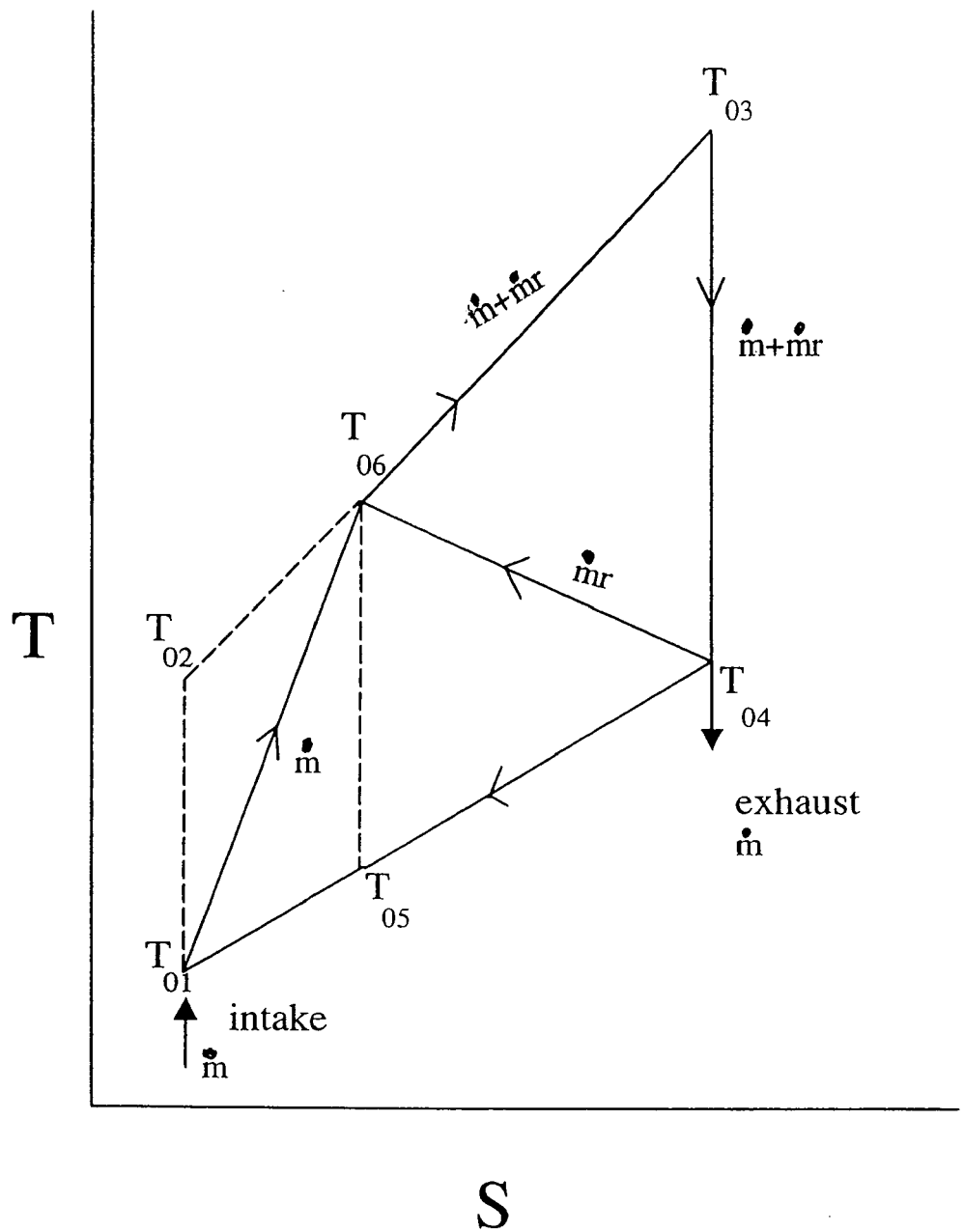
Figure 24. Combined Cycle Diagram Showing Mass-Flows.

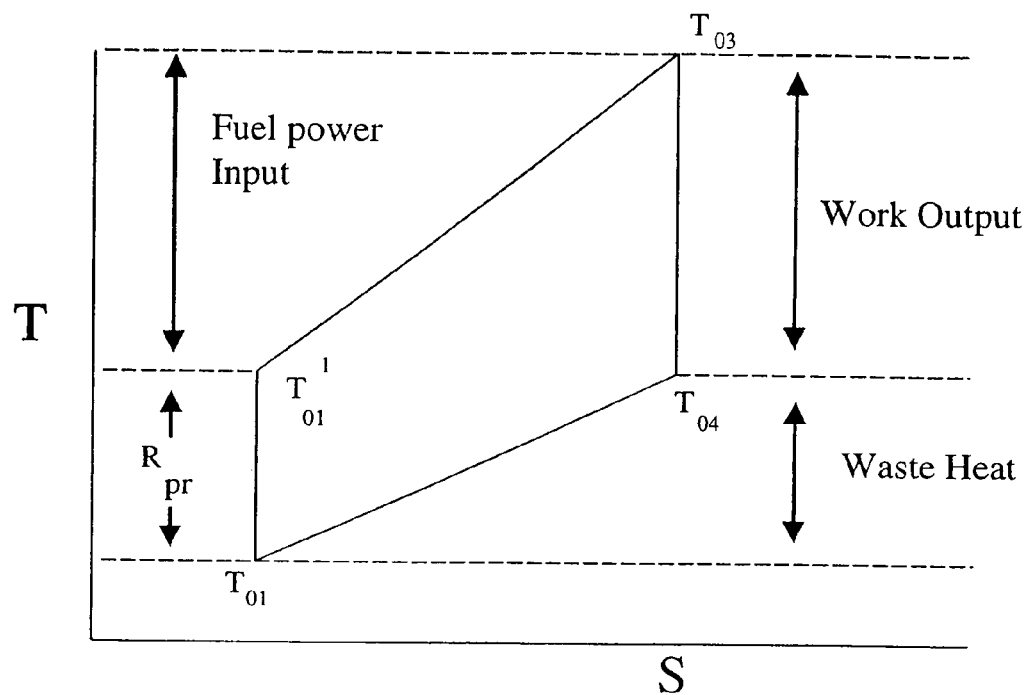
Figure 25   Ram-Jet Thermodynamic Cycle

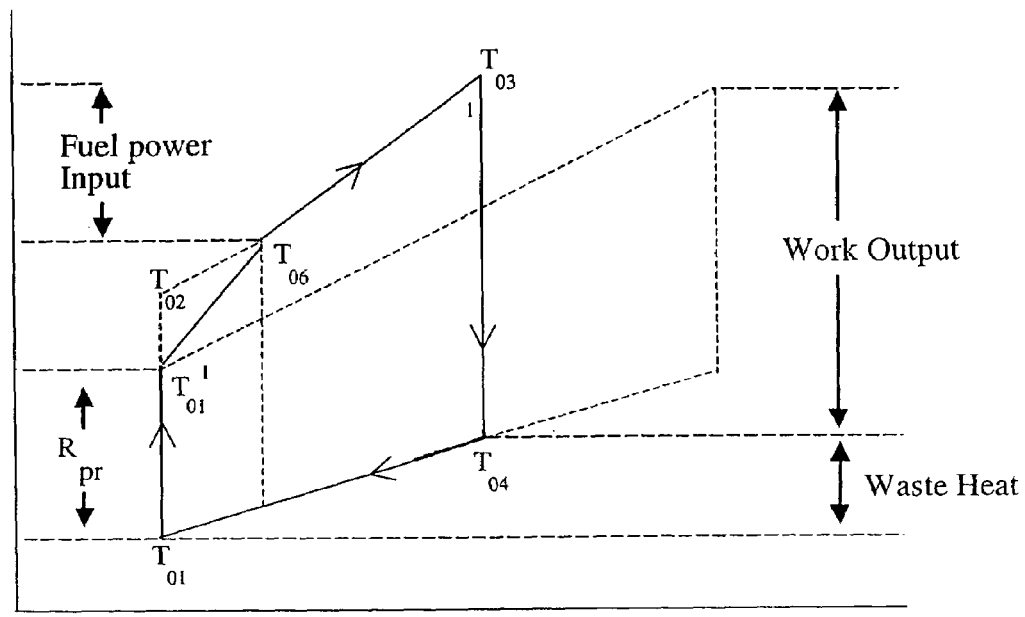
Figure 26   New Engine, Type 1, Cycle Showing Input Ram Pressure Ratio

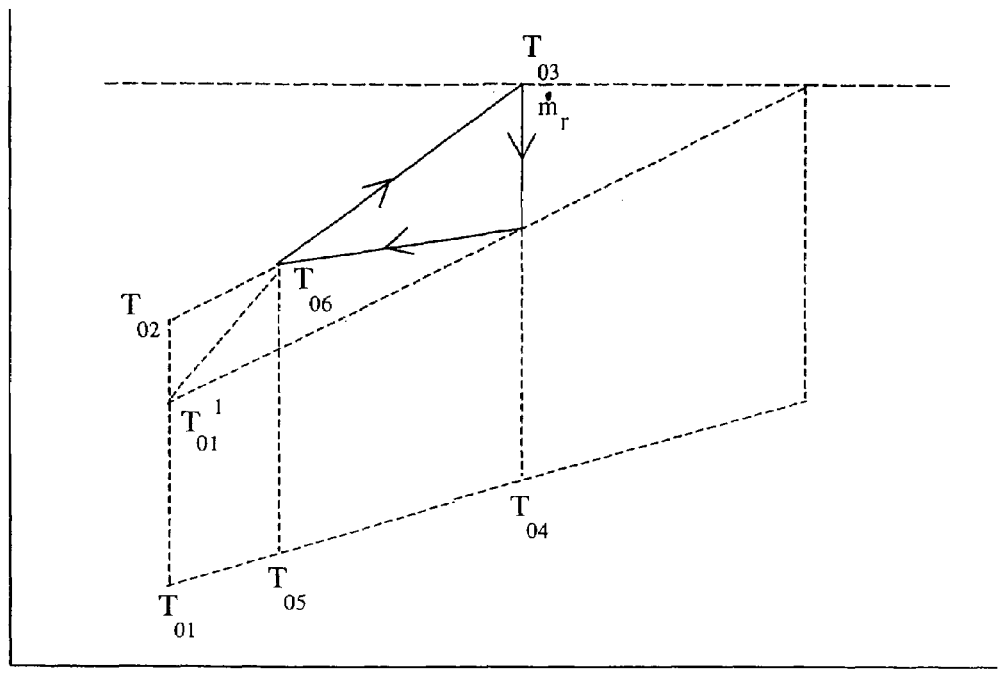
Figure 27    New Engine type 1 Recirculating Mass Flow Cycle, for Ram Input Conditions

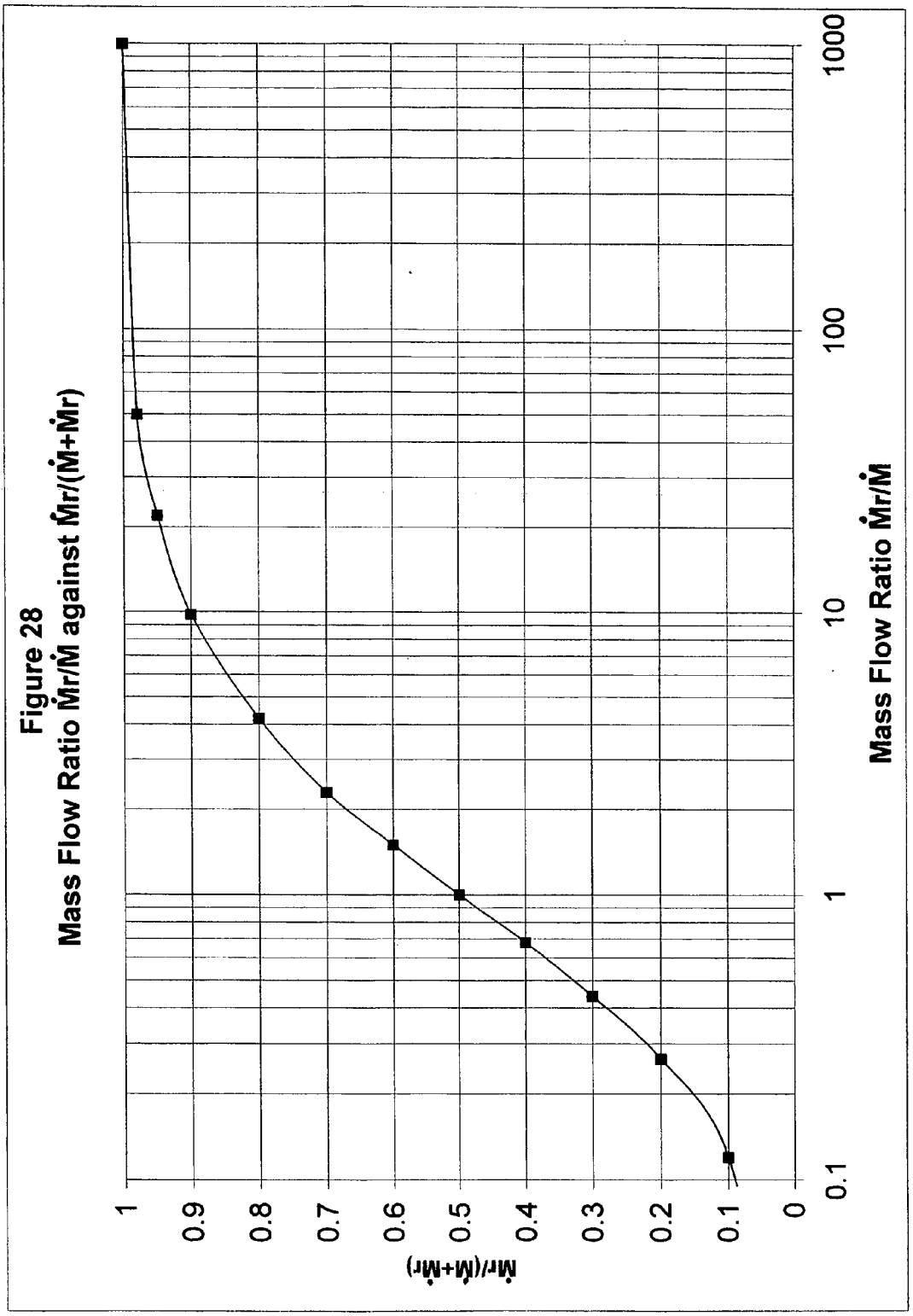

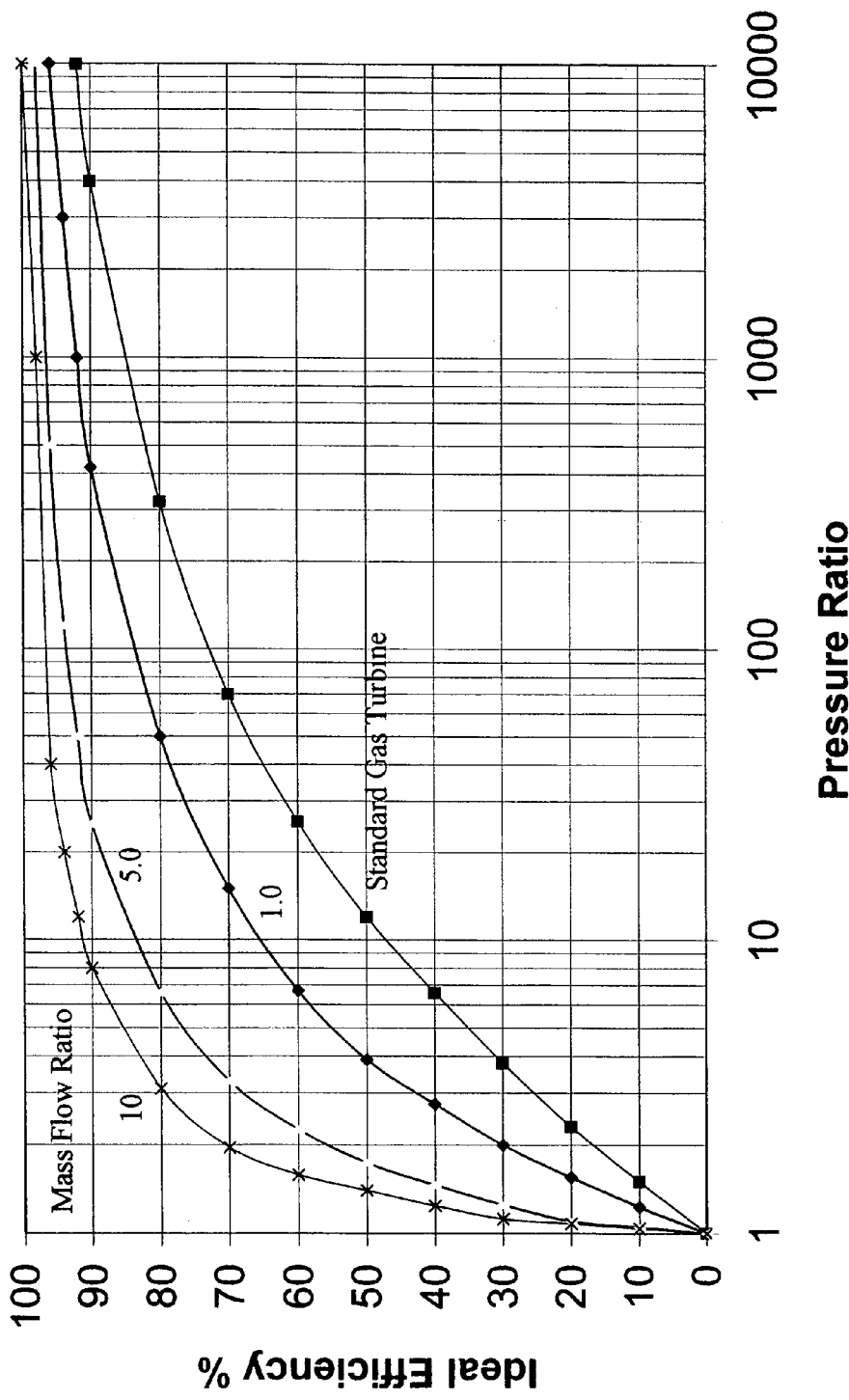

Engine Type 1 Efficiency versus Mass Flow Ratio
Curves of Constant Pressure Ratio Type 1 Engine for Same Efficiency and Output as Gas Turbine Gas Turbine Engine Efficiency

GAS HEAT ENGINE

RELATED APPLICATIONS

This application claims priority to, and is a continuation-in-part of U.S. application Ser. No. 09/373,747 filed Aug. 13, 1999 now abandoned which in turn claims priority to U.S. Provisional Application Ser. No. 60/096,695, filed Aug. 14, 1998, all of which are hereby incorporated by reference.

BACKGROUND OF THE INVENTION

1. Field of the Invention

A new type of gas heat engine is described that has several features similar to a gas turbine or jet engine. The engine is developed in many different configurations, each yielding different theoretical advantages and degrees of freedom. All of this family of engines have no moving components, provide heat recovery and operate over a wide range of input gas velocities. The new engines can use higher combustion temperatures and consequently have the potential for improved efficiency over current technology.

There are many theoretical and practical advantages to the new concepts, which give flexibility in both engine design and operating characteristics that are difficult to embody in current turbo jets. Among the most important is the potential for a thermodynamic efficiency which exceeds that of current open cycle gas heat engines at a given pressure ratio.

A new term in the equation of the Enthalpy of a gas is described, which could be exploited in yet other variants of the engine.

An application of special interest that emerges from this work is the potential to design first stage rocket boosters.

The substantiate benefits of the new engines are improved safety to aircraft, fuel economy, reduced engine weight, and cost. Furthermore, the engine concepts can be scaled to create engines of any desired size and power output without the conventional mechanical limits associated with gas turbines.

2. Background of the Related Art

A gas-turbine is an engine designed to produce useful energy (or work) output by deriving that energy from chemical energy produced by the combustion (or breakdown) of fuel. (e.g. Kerosene). (N.B.1). A gas turbine or jet engine, is the most powerful engine, (Megawatts/per unit volume and weight) known to man which is continuously rated. Rockets are more powerful but work intermittently, usually for only a few minutes.

A gas turbine consists essentially of three basic parts:

1. A compressor which derives working gas or fluid from the intake (e.g. air), and increases the pressure of the gas and supplies it to the combustion system. For compressible fluids (i.e. gases) an increase in temperature is also normally obtained.
2. A combustion system that supplies fuel which is burnt and in the process gives out energy in the form of heat.
3. A turbine which derives mechanical energy from the hot gas after the combustion process and recycles the energy, by a mechanical-link, to the compressor to do work on the input gas.

Work left over at the output of the turbine is the useful work or energy output of the engine. Since the proportion of the energy derived from the gas by the turbine is reintroduced to the gas at the input to the engine by the compressor, these two components work ideally in a closed cycle, and are present to make the engine operate correctly by performing a thermodynamic cycle on the working fluid at the best possible efficiency. In practice both the compressor and turbine are a nuisance, because they are both less than 100% efficient thereby wasting useful work output, and they cause many other restrictions and difficulties which will be discussed later. (Sections 3, 4, 6 and Appendix 4). The useful work output appears as heat, velocity and increased pressure of the gas emerging from the engine. This energy can be used in a number of ways: In a jet engine it is used directly in the form of a force (thrust) to propel the engine forward when mounted in an aircraft. In ground installations it is used to drive another turbine whose mechanical energy is then employed to operate machinery or to generate electricity.

All gas turbines are governed by thermodynamic laws of physics, and are in the group generically known as heat engines. All operate in closed, partially closed or open forms of heat cycle. The theoretical maximum efficiency, or $$\left(\frac{\text{work output}}{\text{heat input}}\right)$$

of heat engines has been well understood for decades. Carnot in 1824 was the first to calculate the basic rule for the theoretical efficiency of such engines. Nowadays there are more sophisticated ways of describing efficiency in terms of Entropy or Enthalpy diagrams and others. (N.B.2). However, for simplicity, the basic efficiency of an engine is related only to the ratio of the temperatures before and after the adiabatic compression of the input working fluid, where the temperatures are measured in degrees Absolute. (Kelvin).

Now if: $\eta$ equals the efficiency in percent;
$T_{in}$ equals the cold input gas temperature
$T_{comp.}$ equals the hot compressed gas temperature
Then for an ideal engine the maximum possible efficiency is given by:

$$\eta = \left(1 - \frac{T_{in}}{T_{comp.}}\right)100$$

It can be seen that if $T_{in}$ is as low as possible, and $T_{comp.}$ is as high as possible, then the ratio of the two terms, $$\left(\frac{T_{in}}{T_{comp.}}\right),$$

is small, and the efficiency is greatest.

For a typical jet engine the value of $T_{in}$ might be 300° K (27° C.), and $T_{comp.}$ might be 600° K (327° C.), (Corresponding to a compression ratio of about 12 to 1).

$$\text{Then } \eta = \left(1 - \frac{300}{600}\right) \times 100 \text{ giving } 50\%$$

Unfortunately in practice losses of energy occur in all stages of actual gas turbines resulting in efficiencies usually in the range of 60 to 80% of the theoretical value. How these losses occur will be described later in Section 3. Suffice to say at this stage that the major losses are caused by the compressor and turbine. It can be seen that the higher the theoretical efficiency for a given percentage loss, then the higher will be the overall efficiency. It can also be seen that the limit is provided by the highest temperature point or combustion temperature of the cycle which must be higher than $T_{comp}$, since it is impractical to reduce $T_{in}$. The combustion temperature in turn is limited by the hot strength of the turbine blades which are fully immersed in the gas exiting from the combustion process. In jet engines some 40 years of development has been devoted to the design of blades that will withstand higher and higher temperatures, and at the same time withstand large centrifugal forces. The use of single crystal alloys and all the skills of modern technology have given everyday engines which are only some 40% efficient. It is of interest to note what the progress has been:—The first flying Whittle engine in 1942 was about 10% efficient, and in 1982 the best (N.B.3) is about 40%, or on average an improvement of 30% in 40 years, or 0.75% per annum.

Since the compressor and turbine combination are needed to make the working fluid operate in a cycle, and do so by recirculating energy round the engine, and since the thermo/mechanical properties of the turbine blades limit the maximum temperature (or efficiency) of the cycle, it is essential in future developments to try to completely eliminate the turbine blade and hence the turbine from the operation of the engine. The limit on maximum temperature would then be mach higher and be caused instead by the heat resistance of the enclosing structure or body of the engine.

These structures can be lined with ceramics and locally cooled by bleeds of cool air, as is current practice for blades, combustion shields and other critical hot spots. It is not possible to make turbine blades of ceramics because they need a high strength to weight ratio due to the large centrifugal forces, whereas on body structures ceramics can provide the high temperature resistance and the metal backing the necessary strength.

It is therefore the elimination of the turbine can bring substantial benefits, but this would mean in turn that the compressor would also have to be eliminated, since there would be no source of mechanical energy to drive it. Some other new means of recirculating energy round the engine must be found to compress the input gas, and make it operate correctly and efficiently.

SUMMARY OF THE INVENTION

This application also claims and practical advantages to the new systems which include: New forms of et engine of increased efficiency, reduced weight and cost, a wider number of degrees of freedom in design and operation and possible future applications for rocket boosters and the direct generation of electricity.

As already stated, the practical losses present in engines conspire to reduce the overall efficiency to about 60 to 80% the theoretical value. Some of these losses will now be described.

The compressor uses more mechanical energy than the isentropic minimum required to compress the gas for its output. This is due to the aerodynamic properties and overall design of the compressor. The loss is normally in the range of 12–17%. With modern engines, multi-stage compressors (double or triple spool) are used, each having similar amounts of loss. Losses accumulate multiplicatively. E.g. triple spool compressors, each of 0.87 efficiency give a total loss of 34.15%.

Combustion processes although largely empirical, are well understood and the losses small. Using modern liquid fuels, the losses usually amount to less than one percent. The calorific value of organic fuels such as kerosene is such that a low percentage of the oxygen in the air is used. If 100% of the Oxygen was burnt, (i.e. a stochiometric mixture of fuel and air), then a temperature rise of about 2,500° C. is possible. There is usually a loss of about 2 to 5% in gas pressure in this process, and this gives a significant reduction in work output.

Similar to the compressor, the turbine removes more energy from the output gas than it converts to mechanical energy which is then used to drive the compressor. Modern engines use double or triple spool turbines and each stage has typical losses of between 10 and 13%.

The main frictional loss is due to the viscosity of the working gas in its passage through the engine. The gas has a tortuous path and is made to travel at high pressure and/or velocity through ducts, over turbine blades, round combustion chamber shields, etc. There are small mechanical losses due to friction of the rotating shafts connecting the turbines and compressors. Taken together these losses amount to a few percent.

Since gas turbines work at high temperatures, relatively cool bleeds of gas at the output of the compressor are diverted to reduce the temperature of the hot spots. These processes waste energy amounting to a few percent.

The specific heat of the working fluid is not a constant, but varies as a function of temperature in its path through the engine. Although the energy content is not lost, it may not be in a form suitable for recovery to provide useful work output for the engine. Gains in output are usually obtained but variations in efficiency are usually quite small.

A few percent of power is used in driving pumps for fuel supply, bearing lubrication, oil coolers, pneumatic valves, etc.

This concludes a brief discussion of the practical losses which occur in modern gas turbines. It can be seen that the largest reduction in efficiency is caused by the compressor(s) and turbine(s).

One important aspect of this invention is that the compressor(s) and turbine(s) are omitted, thus removing all the losses and difficulties associated with these components. This invention does not claim, however, that the new process used to transfer energy from the output to the input of the engine does not have a loss. Other kinds of loss will occur, but there are theoretical and practical advantages to the new system which can make the overall efficiency of the engine much higher. (The full theoretical analysis is given in Appendix 4). Some of the other losses may also be reduced, particularly those due to gas viscosity and some auxilliary services which are not required.

BRIEF DESCRIPTION OF DRAWINGS

FIGS. 1(a) and (b) are block diagrams of the Conventional and New Engine.

FIG. 14 is a Values of Altitude and Mach # to give constant Ram Pressure at Inlet of One bar.

FIG. 15 is a Gas Turbine Cycle Diagram.

FIG. 16 is a Cycle Diagram of the New Engine.

FIG. 17 is a Calculation of Transit Time for Engine E6.

FIG. 18 is a Two Engines Thrust Modulated in Anti-Phase.

FIG. 19 is a Working Fluid Stations.

FIG. 20 is an Idealized Gas Turbine Cycle.

FIG. 21 is a New Engine Type 1 Overall Mass-Flow Cycle.

FIG. 22 is a New Engine Type 1 Recirculating Mass-Flow Cycle.

FIG. 23 is a New Engine Type 2 Overall Mass-Flow Cycle.

FIG. 24 is a Combined Cycle Diagram showing Mass-Flows.

FIG. 25 is a Ram Jet Thermodynamic Cycle.

FIG. 26 is a New Engine Type 1, Cycle Showing Input Ram Pressure Ratio.

FIG. 27 is a New Engine Type 1 Recirculating Mass-Flow Cycle for Ram Input Conditions.

FIG. 28 is a Curve of Mass Flow Ratio against overall Mass-Flow Ratio.

FIG. 29 is a Type 1 Engine Efficiency as a Function of Mass-Flow Ratios.

DETAILED DESCRIPTION OF INVENTION

Figure 2:
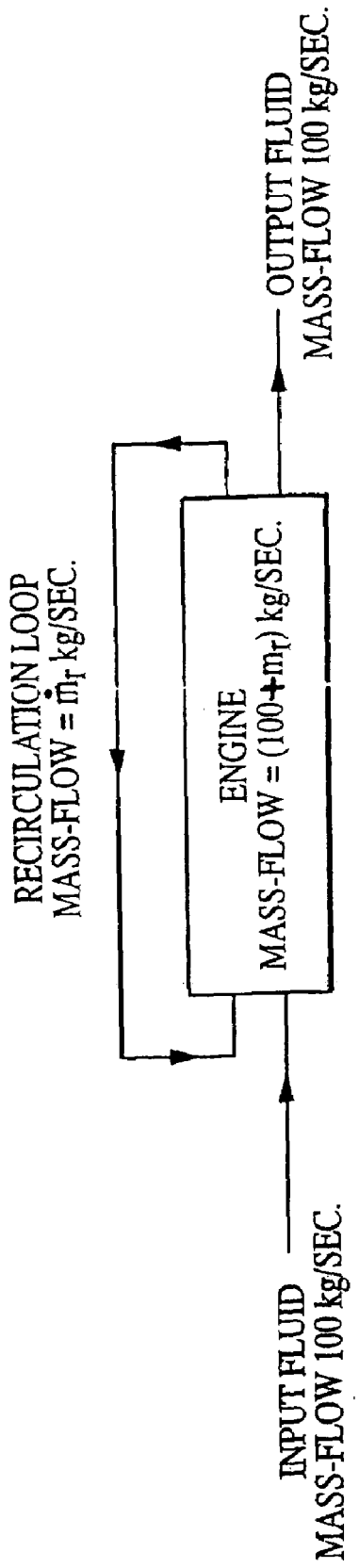
FIG. 2 is a diagram Representation of Mass-Flows in New Engine.

It has been made clear that the elimination of the compressor and turbine would potentially increase efficiency by removing many disadvantages caused by these components. But in doing so requires that some other means of transferring energy from the output to the input of the engine is found, to do work on the input gas.

A Major Claim Of This Application is: The Working Fluid (or Air), Itself, is used to make this Energy Transfer, by Continuously Recycling a proportion of the Energetic Gas from the Output to the Input of the Engine.

In one embodiment, ducts (hereinafter called Scoops), are placed in the output nozzle of the engine, and are arranged to face forwards towards the combustion system. They are used to pick up a proportion of the output gas and divert it forwards by aerodynamically reversing the direction of flow through 180 degrees. The gas then travels along appropriate ducts to the front of the engine. Here the gas is again diverted through 180 degrees and is Injected through appropriate nozzles, (hereinafter called Injectors, which fire the gas back through the engine towards the combustion system. Since the Injected air has high velocity and/or pressure, (typical values might be 2,500 ft/sec, and/or 150 psi), the normal input air to the engine is increased in velocity and compressed in the process. The high energy of the Injected gas is mixed and shared with the low energy input gas, resulting in a substantial increase in its energy in the form of velocity, and/or stagnation pressure and temperature. The combined gases will produce shock waves and are then introduced into an expanding duct, which is a well-known aerodynamic device called a diffuser, whose function is to convert the velocity component of the gas to a further increase in pressure, as efficiently as possible. That is, the kinetic energy component of the gas is reduced while the pressure component is increased, the total energy ideally remaining constant. The gas is then admitted to the combustion process, defined by current practice, and exits towards the output of the engine with increased temperature and velocity. A proportion of this gas is again removed by the Scoops, diverted forwards, and re-Injected rearwards in the engine inlet duct to compress more of the new air entering the intake.

The proportion of gas which continues to travel to the output after passing the Scoops, flows out of the engine and produces the net useful work output or energy output obtained from the engine.

As before, this energy may be used directly as thrust or be used to derive mechanical work.

FIG. 1-*a* shows a block diagram of a conventional engine and 1-*b* the new engine. In 1-*a*, air enters the inlet duct and passes to the compressor(s), from which it enters the diffuser and goes to the combustion system. The heated gas then enters the turbine(s) and leaves the engine via the exit nozzle. Shaft(s) transfer energy forwards from the turbine(s) to compressor(s). The energy transfer operating ideally, in a closed loop.

In 1-*b*, air again enters the inlet duct and passes to the Injector(s). At high velocity and increasing pressure it then enters the diffuser and combustion system as before. From the combustion process a proportion of the heated gas is diverted forwards via the Scoops, the remaining proportion passes out of the engine via the exit nozzle. Duct(s) transfer the energetic gas forwards from the Scoop(s) to the Injector(s). The energy transfer operating ideally, in a closed loop.

In summary, the recirculating energy, which is necessary for an engine to operate successfully, with this new invention, is in the form of the actual energetic working gas (or air) itself, and does not go through the tortuous process of being transferred to rotational mechanical energy and then retransferred back to gas energy having traveled along a shaft from the output to the input of the engine. Apart from the physical transfer of gas in ducts, the only energy transfer which is required is internal to the gas itself, and is that the velocity of the high energy gas, after Injection, should be largely transformed to the equivalent increase in pressure and temperature of the mixed gases before combustion. This is mainly a thermodynamic process and is described by an interchange between three of, the normal four (N.B. 4.) components of the total energy, Heat content or Enthalpy of a gas. It can be seen that the normal laws of thermodynamics can now be used to describe the through and loop paths of the engine, and no resort need now to be made to a description of the aerodynamic, mechanical and thermal behavior of compressors and turbines. Naturally, the diversion, Injection and mixing processes do involve aerodynamic analyses, but these are much easier to handle than the design of a compressor which can take decades of man years of work. An important point in the new format is that, ideally, the thrust produced by the Scoops in diverting the recirculating gas through 180° is exactly balanced by the thrust produced by the second diversion for the Injectors. There is thus no net thrust on the engine from this cause. It is exactly analogous to the turbine and compressor, since the turbine produces a thrust rearwards, and the compressor an equal and opposite thrust forwards. The net thrust of the engine in each case is mainly derived from the change in momentum of the gas accelerating out of the engine.

In general, with conventional engines, the greater the recycled energy, the greater is the overall pressure ratio and efficiency. These improvements can only be obtained at the cost of increased complexity, weight and expense of the engine. A further claim of this application is that the size and/or number of Scoops, ducts and Injectors can be increased to recycle more energy. This is a much simpler matter to arrange than radical redesign of compressors and turbines as there are no miring parts. It is not claimed, however, that increasing Injectors, etc., is a simple task, since it will be shown later that Injectors must in general operate supersonically, and to avoid high losses the mixing and diffusion processes should work with minimum turbulence and increase of entropy. However, increasing the recycled energy can be performed without changing the overall mass-flow through the engine from input to outputs.

FIG. 2 diagramatically shows the possibilities. The overall mass-flow in this example is 100 kg/s. The recirculated mass-flow has a value $\dot{m}_r$ kg/s and the mass-flow through the center of the engine is clearly $(100+\dot{m}_r)$ kg/s. Now $\dot{m}_r$ can have any value, for instance, in extreme cases it could be 10 kg/s or 1,000 kg/s and the corresponding mass-flow through the center of the engine would be, 110 and 1,100 kg/s. Obviously widely different operating conditions would exist for the Injectors, diffusers, combustion system and Scoops, with different pressures, velocities and temperatures even though the overall mass-flow exiting the engine is constant.

Since the energy round the loop is continuously recycled, the function of the fuel is only to heat the overall, input to output, air. There is, therefore, a fresh supply of oxygen for combustion, available to the engine at all times, even if a stochiometric mixture of air is burnt, and there is no supply of oxygen in the gas round the loop. Current engines burn only a low percentage of oxygen in the air that passes through the engine, in which case the loop would supply oxygen as well.

Calculations in a later section will show that typical values for the loop energy in comparison with current engines will give recirculating mass-flow values, in the example in FIG. 2, in the range of 50 to 200 kg/s and an example will be shown using multiple Injectors and Scoops which is analogous to a triple spool Fan-jet. It will be shown in Appendix 4, that the recirculating mass-flow directly affects the theoretical maximum thermodynamic efficiency of the engines, FOR A GIVEN, FIXED PRESSURE-RATIO.

But first an extremely important consequence of using the gas itself to re-cycle energy is explained, which is not in the least concerned with efficiency and maximum operating temperature.

With the new engine format, since the loop Injected air is the means of obtaining compression of the input gas, in principle, it can have any value of velocity and therefore can be used to compress the input air at whatever speed the gas enters the engine. The only requirements are that the Injected gas velocity exceeds the input air speed, (caused, for example, by the flight of the air-craft carrying the engine), and that there is a sufficient recirculating mass-flow to effect the necessary compression. By suitably arranging the aerodynamic profile of the Injector nozzle, the recirculated gas can be Injected at speeds exceeding the exit velocity of the gas which leaves the engine and it will be shown that it can be at velocities greater than the entry speed. Naturally the gas exit velocity can have any value also, it being determined by the working fluid temperature and pressure ratios in the outlet pipe. This leads to another major claim of this patent application:

The Velocity Of the Input Gas To the Engine Can Be Increased Theoretically Without Limit. The practical limit being now provided by the pressure and temperature ratios in the outlet.

Current gas turbine engines have a severe limit on the input gas velocity. It is caused by the maximum speed of rotation of the compressor, which is usually obtained when the blade tip velocity is about 450 to 500 meters/sec. (1,460 to 1,620 ft/sec. Or Mach 1.5). The corresponding input gas speed is approximately determined by the angle of attack of the compressor blades and the resultant value is about the same as the blade tip speed, i.e. about Mach 1.5. If the entry gas velocity exceeds this figure, then the compressor can do no useful work on the input gas. Air entering the engine approaching this velocity must first be slowed down by shock waves and a diffuser, and this is the technique adopted in the supersonic Concorde for example. The blade tip velocity is limited by the strength of materials in the presence of the centrifugal forces, clearly a gas has no such constraint.

The importance of this claim is that now a single engine can be designed to operate at forward velocities from zero to hypersonic, (i.e. in excess of Mach 4.0). This means that these engines have important implications for future high speed flight, (e.g. boost and glide), and also could be used as first stage booster rockets. Calculations in a later section give interesting results on this subject, and Appendix 5 discusses an engine designed to produce constant thrust at flight speeds from zero to Mach 9.

Figure 3:
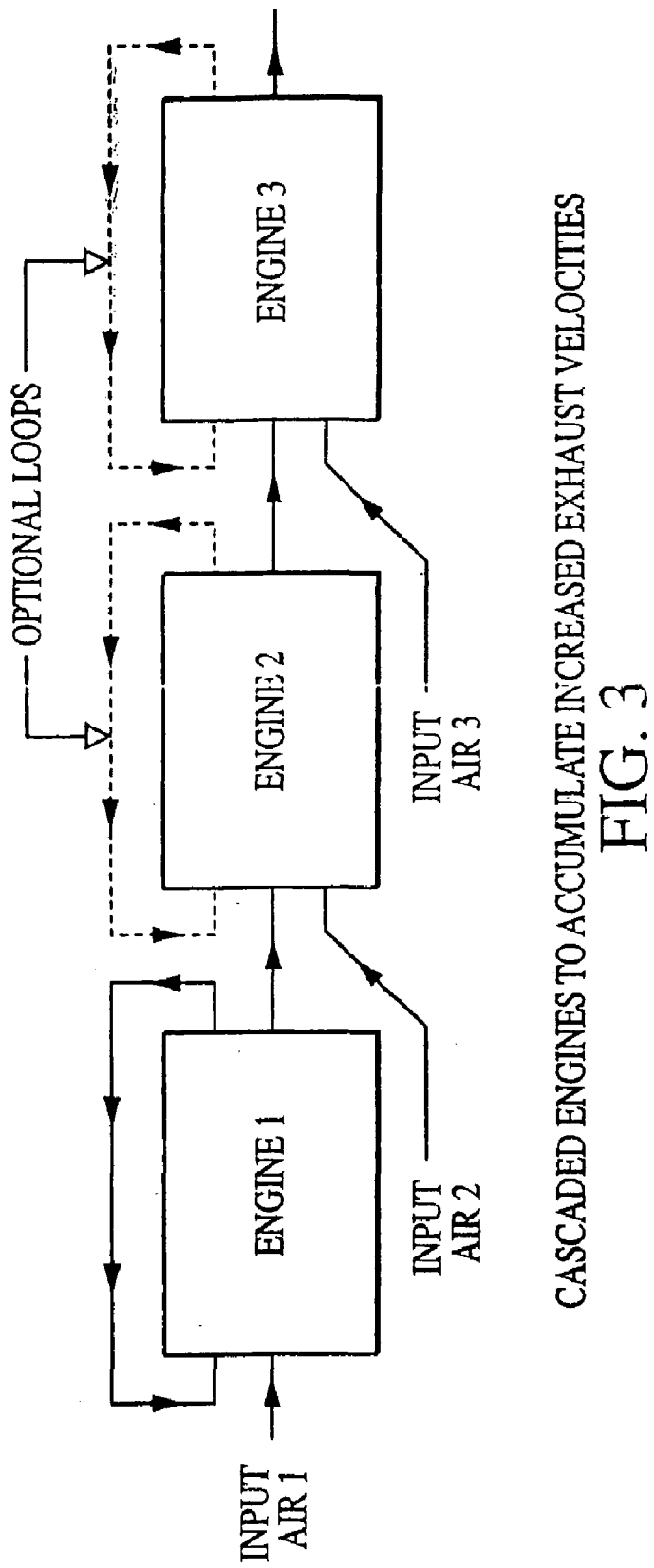
FIG. 3 is a Cascaded Engines to Accumulate Increased Exhaust Velocities.

A further implication of this claim is the possibility of cascading engines. FIG. 3. illustrates the method. Engine #1 is one of the engines as described, and is arranged to have a high pressure ratio and therefore a high exit velocity. After cooling the output air this engine is arranged to be the Injector for engine #2 which may or may not have a recirculation loop. The output of engine #2 is used to Inject engine #3, etc. Each engine has fixed input conditions and can be optimized. The output velocities can be arranged by suitable mass-flow ratios, to emerge at a higher speed than the previous engine in the chain. Such an arrangement is not possible with conventional engines because of the restriction on input velocity.

As the speed of an engine is raised to hypersonic, the requirement of the Injected gas velocity exceeding the input velocity could be relaxed, because the ram pressure ratio of the input air as the speed rises will eventually give sufficient pressure for the engine to operate on its own, i.e. the engine is now operating as a Ram-jet. It will be shown in Appendix 4, however, that for the same combustion temperature, the new engine is thermodynamically more efficient than a Ram-jet.

The preceeding discussions lead to another major claim of this patent application:

Injectors and Scoops Can Be Switched On and Off According to Requirements Determined By the Operating Conditions Of the Engine.

An engine can be constructed with Injectors and Scoops designed for optimum performance at differing input gas speeds and altitudes. For example, an obvious set of divisions on the basis of speed would be: Subsonic, zero to Mach 0.85; Trans-sonic, Mach 0.85 to Mach 1.4; Supersonic, Mach 1.4 to Mach 5.0, and Hypersonic Mach 5.0 and up. By the use of pneumatic rams operating semi-static valves or covering shields, each set of Injectors may suddenly or gradually be brought into play. Thus the recirculating mass, or energy flow in the loop can be adjusted according to the input conditions. Section 9 discusses an engine in which the thrust at 33,000 ft. and Mach 0.8 is the same as the static sea-level value.

The technique does not require new technology since engines currently have variable geometry for inlet or outlet ducts. An example is for after-burning in which the outlet nozzle is increased in area to avoid choking the output. The use of alternate Scoops, and/or ducts, and/or Injectors of different or variable geometry, gives the engine designer degrees of freedom to optimize characteristics over a wider range of operating conditions than had previously been possible.

Now under his control are:

| | |
|---|---|
| A) | Loop energy or mass-flow |
| B) | Injected gas velocity |
| C) | Combustion pressure, or compression ratio |
| D) | Combustion entry temperature |

This enables a suitably designed engine to more nearly follow curves of optimum performance, in regard to thermodynamic and propulsive efficiency.

These new degrees of freedom are unavailable in conventional engines. When a compression ratio has been fixed, then the parameters of the turbine have been fixed also. They are then invariant as it is not possible to increase the compression ratio, for example by altering the angle of attack of the compressor blades, (as is current practice with propellers). It is at the limit of technology to construct a compressor drum and prevent the blades from bursting loose from the rotor due to the large centrifugal forces. Furthermore, ideally in each stage the blades would need to be rotated through a different angle and have a different profile for a given angle of attack. Each spool of a given engine has its own operating conditions for different input conditions and the energy transfer is a function of the turbine and compressor characteristics. It is clear that it is not possible to vary the recirculating power by a factor of ten to one, for instance, whereas with the new engine such a radical change is feasible, by switching loops in and out of operation. The implications of varying the loop mass-flow are fully described in Appendices 4 and 5.

Before proceeding further, this section is devoted to illustrating the operation of the new engine in comparison to a regular gas turbine. The inlet parameters, compression-ratios and combustion temperatures are the same for each engine. I.e. for reasons of clarity, no advantage is taken of the ability of the new engine to operate at higher (or lower) temperatures. N.B. (see below). The nomenclature is delineated before the Appendices and the standard twin-spool jet engine is the one described on Pages 44 to 46 in the book by Richard T. C. Hannon titled 'Gas Turbine Engineering', John Wiley & Sons, 1981.

In the calculations that follow for this specific example no limitation to claims is intended. They are only performed for the purpose of illustrating trends, and improving understanding about the new engine. S.I. units are used in the calculations, with other units specified in brackets. Appendix 4 should be referred to for the general, rather than this specific case. Operating parameters for both engines are as follows:

| | |
|---|---|
| Overall Mass-Flow | $\dot{m}$ = 50 kg/s (110 lbs/s) |
| Inlet Temperature | $T_a$ = 288° K (15° C.) |
| Inlet Pressure | $P_a$ = 1 bar (14.7 lb/sq in) |
| Compression ratio (both spools) | Total = 12:1 |
| Combustion Temperature | $T_{oe}$ = 1,200° K (927° C.) |
| Combustion Pressure Loss | = 1% (giving $P_{oe}$ = 11.88 bar) |
| Specific Heat (cold) for Air | $C_{pa}$ = 1020 J/kgK |
| | $\delta$ = 1.3915 |
| Ratio of Specific Heats | Value = $\frac{\delta}{\delta - 1}$ = 3.554 |
| Specific Heat (hot) for Air | $C_{pe}$ = 1159 J/kgK |
| | $\delta$ = 1.326 |
| Ratio of Specific Heats | $\frac{\delta}{\delta - 1}$ = 4039 |

N.B. It will be shown later that the new engine with equivalent thrust and power output operates with $P_{oe}$=2.979 bar and $T_{oe}$=882°.

| For the Gas Turbine: | |
|---|---|
| Turbine Exit Pressure | $P_{oet}$ =2.979 bar |
| Turbine Exit Temperature | $T_{oet}$ = 882° K |
| Exit Velocity | $V_e$ = 698 m/s |
| Thrust | $F_e$ = ($\dot{m}V_e$) 35,210 N (7915 lbs. st.) |
| Power Output | = 12.18 MW |
| Efficiency | $\eta \tau j$ =37.77% |

| For the New Engine: | |
|---|---|
| Recirculating Mass-Flow = | $\dot{m}_r$ kg/s |
| Mass-Flow through Combustion System = | ($\dot{m}$ + $\dot{m}_r$) kg/s |

Assuming that the exit nozzle is unchoked, (i.e. of sufficiently large area), the static exit pressure will be slightly above atmospheric pressure, $P_e$=1.25 bar. Then for the nozzle the pressure ratio is given by:

$$\frac{P_{oe}}{P_e} = \frac{11.88}{1.25} = 9.50 \quad \text{and}$$

$$\frac{T_{oe}}{T_e} = \left(\frac{P_{oe}}{P_e}\right)^{\frac{\delta-1}{\delta}} \quad \text{where } T_{oe} = 1200^\circ \text{ K}$$

$$= 9.5^{\frac{1}{4.039}} = 1.746 \quad \text{therefore}$$

$$T_e = \frac{1200}{1.746} = 687^\circ \text{ K } (414^\circ \text{ C.})$$

i.e. the static temperature of the air at the nozzle exit is 687° K. At this point the Scoops, recycle $\dot{m}_r$ kg/s to the input Injectors. Let us now calculate the exit velocity, which will also be the Injected velocity, assuming that there is no aerodynamic shaping in the ducts connecting the Scoops to the Injectors, and no work is done in the connecting ducts.

$$V_e = \sqrt{2 \cdot C_p(T_{oe} - T_e)}$$

$$= (2 \times 1159 \times (1200 - 687))^{\frac{1}{2}}$$

$$= (2 \times 1159 \times 513)^{\frac{1}{2}}$$

$$= 1090 \text{ meters/sec } (3{,}544 \text{ ft/s or Mach } 3.375)$$

The output thrust is given by the mass-flow leaving the engine, and let us assume that the Scoops interfere with the exit flow producing turbulance reducing: the effective velocity and thrust by 5%.
Then:

$$(V_e \text{ effective} = 0.95 \times 1090$$

$$= 1035.5 \text{ m/s}$$

$$F_e = 0.95 \, \dot{m} V_c$$

$$= 0.95 \times 50 \times 1090$$

$$= 51{,}775 N \, (11{,}639 \text{ lbs st.})$$

This is the first interesting result. The thrust is higher than the gas turbine because the turbine reduces the pressure and temperature of all of its output air. In the new engine, the Scoops remove only a proportion of the output air, leaving the pressure and temperature of the exiting air unchanged. (Apart from the allowance made for turbulance losses). Consequently it has a higher exit velocity and thrust.
The increase in thrust is:

$$\frac{11{,}639}{7{,}915} = 1.47 \text{ or } 47\% \text{ more thrust.}$$

We now need to calculate the recirculating mass flow $\dot{m}_r$. For simplicity we are going to consider the process in separate steps. From Bernoulli's equation and the general equations of gas transport for compressible fluids, we find that the kinetic energies of the gases separately before mixing is equal to the kinetic energy of the combined gas after mixing.
Let V=velocity of the input gas; $V_r(=V_e)$ be velocity of the recirculating gas; and $V_1$=the velocity of the combined gases; then, $$\frac{1}{2}\dot{m}V^2 + \frac{1}{2}\dot{m}_r V^2_r = \frac{1}{2}(\dot{m} + \dot{m}_r)V^2_1$$

Assuming the inlet air is initially at rest,
Then $$V = O$$

So $\frac{1}{2}\dot{m}_r V^2_r = \frac{1}{2}(\dot{m}+\dot{m}_r)V^2_1$

And simplifying, gives:

$$\dot{m}_r = \frac{\dot{m}_r V^2 1}{V^2 r - V^2 1} \quad (1)$$

Now we know that the velocity of the combined gases must be sufficient to produce a pressure rise of 12 bar by the Ram effect. The Ram pressure ratio is given by:

$$\frac{P_{or}}{P_a} = \left(1 + \frac{\delta-1}{\delta}M^2\right)^{\frac{\delta}{\delta-1}}$$

where M is the Mach # velocity
Then $$\frac{12}{1} = (1 + 0.163 \, M^2) 4.039$$

using the higher value for $\delta$
For which M=2.30 and this therefore equals $V_1$
From the exit velocity, $V_r$ equals Mach 3.375.
Substituting in (1) to find $\dot{m}_r$:

$$\dot{m}_r = \frac{50 \times 2.3^2}{3.375^2 - 2.3^2} = \frac{264.5}{11.39 - 5.29}$$

$$\therefore \dot{m}_r = 43.3 \text{ kg/s } (95.4 \text{ lb/s})$$

So the recirculating mass-flow must be 43.4 kg/s to produce a Ram pressure rise of 12 atmospheres. If, due to turbulence in the mixing process, the required pressure of 12 bar is not obtained at the output of the diffuser, i.e., the process does not occur with the minimum increase in entropy, then $\dot{m}_r$ must be increased in value until the required pressure is obtained. It will be shown that from consideration of the stagnation Enthalpys in the process, the fuel supply is invariant to the value of $m_r$, and is only dependent on $T_a$, $T_{oe}$, $\dot{m}$ and specific heat.

For a gas velocity mach 2.3 we could calculate the combined gas temperature from the Ram Temperature Ratio which is given by:

$$\frac{T_{or}}{T_r} = 1 + \frac{\delta - 1}{\delta} M^2$$

$$= (1 + 0.163 \times 2.3^2)$$

$$= 1.86227$$

However; we have not derived a meaningful temperature for the combined recirculated and overall mass-flow before Compression, since the process is complex. But we know the Injected air has a stagnation temperature equal to the combustion temperature $T_{oe}$ of 1200° K, and it is mixed with the inlet air, whose stagnation temperature is 288° K. The combined and compressed temperature $T_{oc}$ is given by equating the enthalpy lost by the recirculating mass-flow to the enthalpy gained by the input mass-flow.

I.e. $\dot{m}_r C_{pe} (1200 - T_{oc}) = \dot{m} C_{pa} (T_{oc} - 288)$
Then $43.4 \times 1159 (1200 - T_c) = 50 \times 1020 (T_c - 288)$
$60,360,720 - 50,301 T_c = 51,0000 Tc - 14,688,000$
From which $T_c = 740.85°$ K (467.85° C.)

Now the fuel is required to raise the temperature of 93.4 kg/s of air by (1200–740.85) or 459.15° C.

Assuming 100% combustion efficiency, the fuel to air ratio is given by:

$$f/a = \frac{1.1(459.15 - 50)\left(1 = \frac{741}{3250}\right)}{42,000}$$

Where the LCV of the fuel is 42,000 kJ./kg.

∴ f/a=0.01316

The fuel flow is given by $(\dot{m}+\dot{M}_r)0.01316$ $\dot{m}_f$=1.229 kg/s

The power input to the engine is given by:

Fuel Flow × LCV = 1.229 × 42 Megawatts

= 51.62 MW

The power output is given by $$P_t = \frac{1}{2}\dot{m}V_e^2 (\text{or } (.95)_x^2 \dot{m} x C_{pe}(T_{oe} - T_e))$$

Where $V_e$ is the effective output velocity of 1035.5 m/s.

$P_{out}$=26.81 MW

The efficiency $$\eta = \frac{\text{power out}}{\text{fuel power in}}$$

$$= \frac{26.81}{51.62} = 51.94\%$$

This is an extremely important result, since the new engine is shown to be more efficient than the gas turbine by $$\frac{51.94}{37.77} = 1.375\%$$

or 37.5%

Now the Loop power for the gas turbine (both Spools) is 18.412 MW.

For the new engine, the Loop power is given by the energy-flow of the recirculating mass.

$P_{Loop}=\dot{m}_r C_{pe}(T_{oe}-T_c)$ which equals the recirculating mass-flow fuel energy input.

∴$P_{Loop}$=23.10 MW

It is higher than in the gas turbine because the recirculating power not only compresses the input gas, but also preheats it, (requiring more compressive power).

Comparing the gas turbine with the new engine we have the following parameters:

| Parameter | Gas Turbine | New Engine | Increase |
|---|---|---|---|
| Thrust lbs | 7,915 | 11,639 | 47% |
| Output power MW | 12.18 | 26.81 | 120% |
| Fuel kg/s | 0.708 | 1.229 | 60% |
| Efficiency % | 37.77 | 51.94 | 37.5% |
| Loop Power MW | 18.41 | 23.10 | 25.5% |
| Exit Velocity m/s | 698 | 1035.5 | 48.4% |

The engine uses more fuel per unit thrust than the gas turbine because the output power varies as $V_e^2$, while the thrust is proportional to $V_e$. Appendix 4 gives the operating parameters for engines in which the specific fuel consumption is shown to be less than this engine. This example is more suited for supersonic flight up to about Mach 2.5, without afterburning.

The thermodynamic efficiency of the new engine is greater than the theoretical efficiency of a gas turbine operating at 12 bar (which is ~50%), the new maximun theoretical efficiency with the given value of $\dot{m}_r$ will be shown to be about 66%. (Appendix 4).

As already explained, the increase in thrust is due to there being no turbine reducing the temperature and pressure of the whole of the output air after combustion. In the new engine the output air from the combustion system flows unimpeded to the outlet, although allowance has been made for the Scoops causing some interference with that flow.

It must be stated that the losses in the new engine have only been estimated and the overall efficiency should be regarded as approximate. The supersonic Injection and mixing processes may introduce different losses than those described, but they do not affect the efficiency for a given operating temperature ratio. The turbulence caused by the Scoops do reduce the output power, thrust and efficiency, since the output gas-flow contains rotational components of Velocity which produce no effective output power as opposed to the required linear components of velocity which do. However, the trends and degrees of freedom that this new engine format have to offer, including increased thrust and efficiency, are founded in the basic Thermodynamics of the new process. Appendix 1 gives the cycle diagrams of the engines.

Another way of looking at the new system, is to consider it as a self-Injected Ram-jet. It is well known that Ram-jets travelling at Mach 5 or 6, can have efficiencies of roughly 70%, or nearly twice that of current turbo-jets. What the new engine has to offer is that by means of self-Injection and recirculating mass-flow heat recovery, it is possible to achieve or exceed these levels of efficiency whilst the engine is stationary.

The next section discusses in more detail the advantages of the new system and produces some further important results.

In the new engine there are no major moving parts, other than the working gas itself, and minor auxilliary services. The direct advantages of this are:

It is roughly estimated that about 50% of the cost of conventional engines is devoted to the manufacture of compressors and turbines, and associated components. The new engines will therefore cost a fraction of current turbo-jets.

The moving parts in conventional engines account for a large proportion of the total weight. Very approximately it is estimated that the new engines would weigh 30 to 50% of current equivalent engines with the same thrust. This has important implications for the total weight or payload of an aircraft, since a useful rule of thumb is that for every 1 lb of engine weight saved, a further 5 lb of aircraft weight can be saved.

As an example, suppose the new engines were installed in a Boeing 747B having the same thrust as the Rolls Royce RB 211 524B4 type, which have a dry weight of 9,814 lb. Taking the new engine weight as 50% of this, or 4,907 lb, the total weight saving (four engines), would be 19,628 lb. The associated aircraft saving would be about. 98,140 lb giving a total weight reduction of 117,768 lb, or 58.9 tons. Since the max payload of the 747B is about 240,000 lb, the new value would be about 358,000 lb, with obvious economic benefits.

Current engines have high rotational moments of inertia due too, the total mass of the compressors and turbines spinning at typically 9,000 to 11,000 rpm. When an aircraft maneuvers gyroscopic forces are exerted on the engine mountings, requiring stiffer supports, wing and body structures, etc., to resist the twisting moments produced. Clearly gyroscopic effects are zero with the new engine. Mounting points need only take account of the regular inertial forces produced by maneuvers.

Conventional engines normally take 5 to 10 seconds to reach allowed maximum thrust after the fuel supply is suddenly increased at the maximum rate by the fuel supply servos. The limit on the build-up rate is caused by the rotational moment of inertia of the compressor and turbine assembly. A practical constraint of thrust build-up is more severe, and is due to the effects of heat. Care must be taken not to cause thermal shock to the turbines and blades, otherwise failure or seal wear can occur. Slow power build-up does not normally cause a problem, except, for example, in a particular event regarding aircraft safety. If an aircraft on a landing approach suddenly starts to stall due to wind shear or other reason, then a 10 second delay in achieving maximum thrust after a slam throttle opening may not be soon enough to save the aircraft from crashing.

With the new engine, the power build-up time is limited by the gases total loop-transit time, since the inertia of the air in the engine would be typically 400 to 2,000 times less than the rotational inertia of current engines. Thermal shock and expansion problems are virtually nonexistent as there would be fewer components with close mechanical tolerances. The body, Scoops, ducts and Injectors would rise in temperature at rates determined by their various heat capacities. Calculations show that the total transit time is estimated at 16.1 milliseconds at minimum thrust and 5.9 ms at maximum thrust. The thrust rise-time therefore, varies between 50.6 ms and 18.5 ms, or an average of about 35 ms, corresponding to a frequency of about 29 Hz. This result has important implications:

In the event of an aircraft landing, as described earlier, in which a sudden stall is obtained, slam opening of the throttles will give maximum thrust in about 35 milli-seconds. I.e. the engine reaction time will exceed the human reaction time by say—a factor of ten. This speed-of response could save a sudden critical situation from disaster with important implications for aircraft safety. With suitable stall sensors and electronics, the human reaction-time could also be eliminated, the engine being automatically controlled.

An engine could be designed with short transit times, which could be modulated between minimum and maximum thrust at a frequency of 60 Hz. The fuel supply would be arranged to vary sinusoidally at this frequency. A feedback arrangement could be used, in which a device sensitive to the output thrust, velocity or pressure is arranged to modulate the fuel supply, thus making the engine a thrust or power oscillator. If the output gas temperature, as is envisioned, can be raised sufficiently to produce electrically conductive plasmas, then the possibility of producing 60 Hz directly becomes a reality. This method uses two engines to cancel the average D.C. component generated by each engine, giving 60 Hz A.C. output only. Naturally such a system only becomes economic if the actual development of gas temperatures in the range of 5,000 to 7000° K proves practical.

To start the engine, air must be moved through the ducts, until the total losses, mostly caused by gas viscosity, are exceeded by the net engine work output. A separate method of propelling the air through the engine must be employed, and four methods are suggested.

There is an important difference, however, between the new engine and a regular gas turbine. As the gas velocity in the new engine tends to zero, then the frictional forces also tend to zero. Whereas with a gas turbine, as the gas velocity and turbine r.p.m. tend to zero, the frictional forces tend to a finite value, namely the value of the static friction. The new engine will, therefore, require less starting energy.

Because the transit time of the engine is low, a ground based compressed air source could be applied to the engine intake, or through an Injector, of high total volume but of short duration,—say—a few hundred milli-seconds. The fuel would be simultaneously turned on and ignited. The engine will then start immediately. Since the compressed air velocity will be relatively low, the transit time will be increased several times over the value calculated in the previous section.

An A.P.U. could be used, either mounted centrally in the engine duct, or to one side, depending on the engine layout. To keep the cost low, the A.P.U. should be a pulse jet, with no moving parts, (other than the vibrating valve in the combustion chamber). To meet some operating requirements, it is possible that a small gas turbine and the new engine are used as a combination engine.

An explosive cartridge could be used, mounted in a chamber directing the pro-ducts of the explosion through the engine. The explosion should be relatively slow acting, or be more like a fast-burn, lasting some 200 to 300 ms. Again simultaneous ignition of the fuel, will enable the engine to start before the production of gas has been completed.

A liquid gas could be carried in the aircraft, e.g. propane, butane, etc., and a burst of gas, from the liquid could be used to initiate the start. To give a sufficient volume of gas, the liquid would have to be electrically or chemically heated. In using a flammable gas, ignition of the kerosene will be assisted because this fuel has a low vapour pressure at normal temperatures.

If a flame-out occurs while the aircraft is in flight, in general reignition of the fuel is all that is required to re-establish engine operation. The detailed design of the engine must be organized to allow for low-speed flight re-starts.

The new maximum temperatures for the engine can be increased, as has already been stated. The casing, or body of the engine now causes the limit to the practical maximum operating, temperatures. However, this is not nearly as severe a limit as is produced by the turbine blades, for the following reasons:

A) No centrifugal forces are present. The only forces that are exerted on the body are those due to the axial gas load, pressure and drag. Turbine blades have to contend with these forces, in addition to the centrifugal ones.

B) No severe vibration modes will be present on the body, except those due to noise and turbulence. Turbine blades have critical design problems in this area, since they have a high stiffness to length ratio.

C) Ceramic linings can be used on the body structure; turbine blades cannot use ceramics at the present state of the art because even the use of single crystal fibre impregnation does not yield materials of sufficient strength. Ceramics lining the engine body can be bonded to metals of appropriate strength at relatively low temperatures to resist the required operating pressure.

D) The body of the engine is not fully immersed in the highest temperature point of the gas. Turbine blades are fully immersed. By the use of a temperature profile in the exiting gas, in which the center of the gas stream is hottest, and the boundary layer and outer circumference are relatively cool, there will be less heat conducting to the body surface. The new engines will in general have more heat radiating to the body structure rather than by conduction. To deal with this problem, two techniques can be used. One is current gas-turbine practice, and the other is normal practice in liquid fueled rockets.

As has been already mentioned, gas bleeds of relatively cool air taken from the output of the compressor, are used to cool critical areas like turbine blades. The same method can be used in the new engine, and cool air from the output of the diffuser can be used to form-a boundary layer on the ducts and exit nozzle. Such a process is not generally applicable to rockets since there is no cool gas available.

A common technique with rockets is to run the liquid fuel at high pressure through pipes bonded to the combustion chamber and exit nozzle. This method cannot be applied to turbine blades because of the difficulty of organizing the supply and recovery of the fuel to rotating components. Clearly it could be a powerful technique in the new engines. Combustion chamber shields, as well as Scoops and ducts could be cooled this way. A good point with this method is that the heat removed by the fuel is not lost, since the fuel is in effect preheated, and the final combustion temperature will be higher than if the fuel was burnt from cold. The energy is therefore recycled through the engine.

Figure 4:
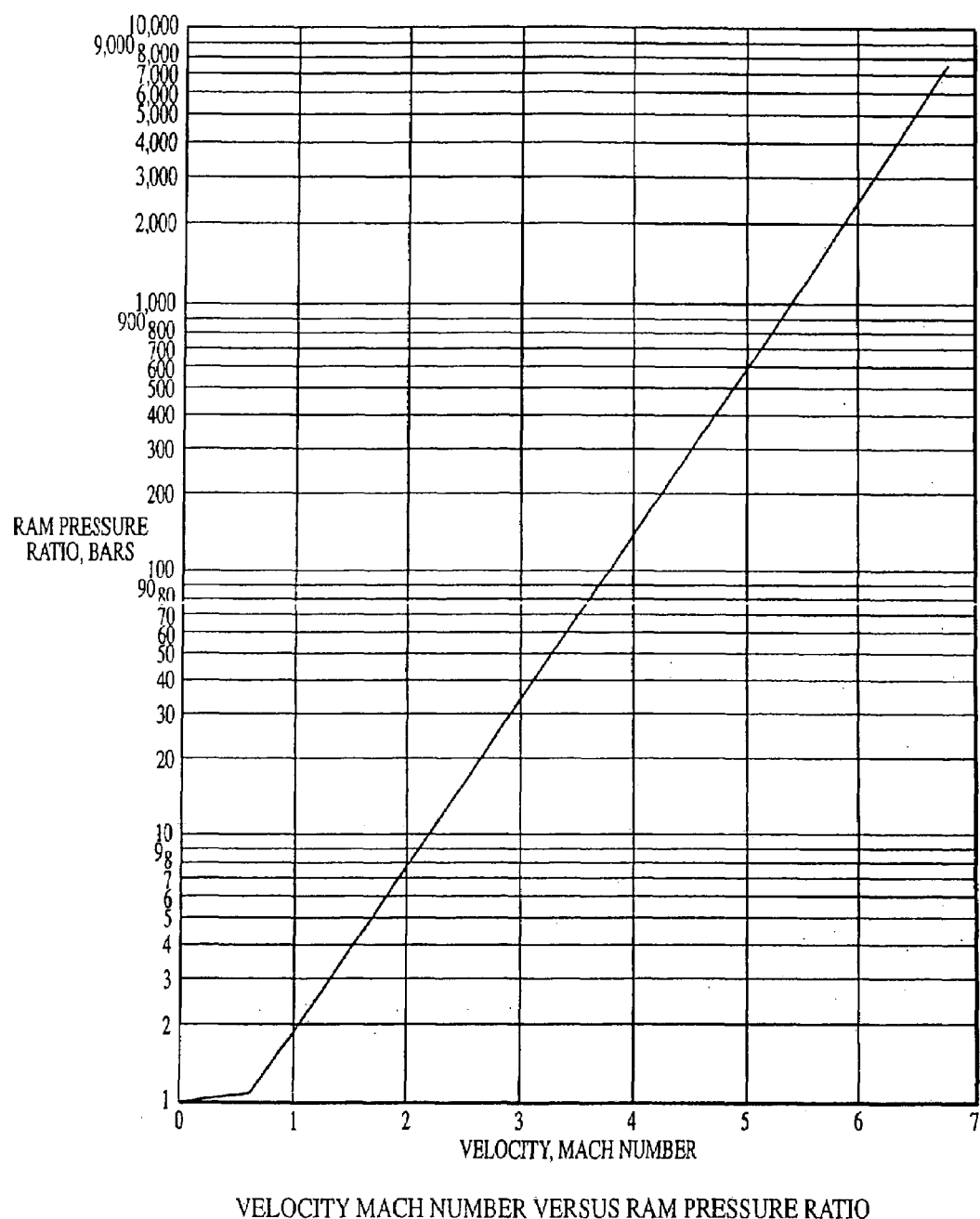
FIG. 4 is a Velocity Mach Number versus Ram Pressure Ratio.

FIG. 4, shows a graph of the Ram pressure ratio against the inlet gas velocity. The graph is derived from the equation:

$$R_{pr} = \left(1 + \frac{\delta - 1}{2}M^2\right)^{\frac{\delta}{\delta - 1}}$$

where $R_{pr}$ is the ratio of the pressure rise at velocity M, where M is the Mach number. The value for $\delta$ is taken as 1.3915.

It can be seen that to produce combustion pressures in the range of 10 to 50 bars at sea level, then the combined gas velocity, (derived from the input and recirculated gases, must be between M=2.2 to 3.2. It also shows the possibility of deriving combustion pressures of 100 or 1000 bar, which would give corresponding gains in thrust and efficiency. The mixed gas velocity would then be Mach 3.7 to Mach 5.5. Such high combustion pressures are impractical with compressors where current practice gives highest pressure ratios of about 25 to 33 to one. Appendix 4 discusses engines operating from 1.01 bar to 10,000 bar.

Figure 5:
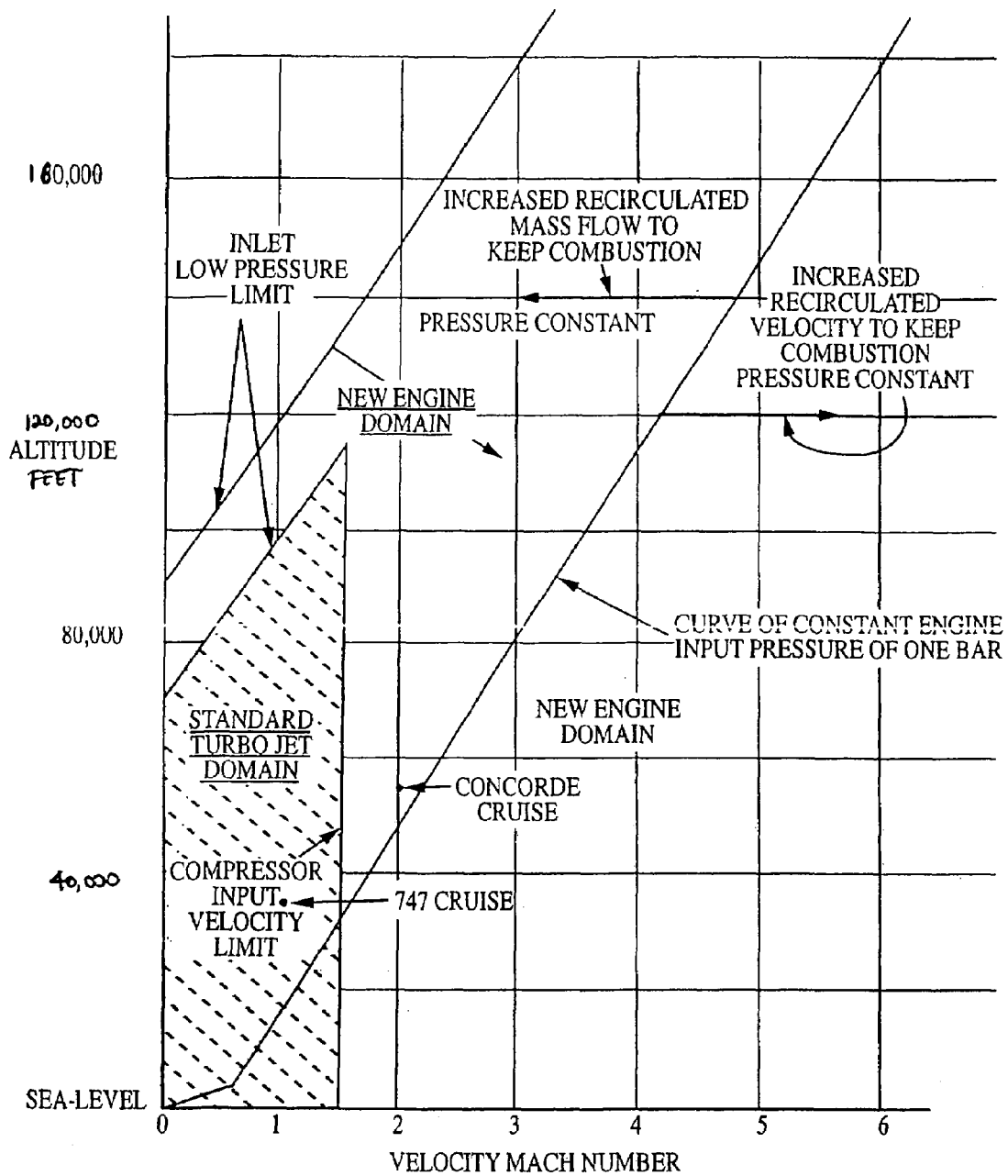
FIG. 5 is a Velocity Mach Number versus Altitude, Curve or Constant Input Pressure.

As is well known, atmospheric pressure falls with altitude, with a modified law whose principle was first calculated by Boltzman. However, if an aircraft is arranged to fly faster as it gains altitude, the Ram pressure ratio can be used to restore the inlet duct pressure to the value at sea level. FIG. 5, shows a graph of altitude versus velocity, on which a curve is plotted of constant input pressure equal to one bar. The values for $\delta$ and M are recalculated as the altitude is increased, from the atmospheric temperature and density, and are given in FIG. 14. With the new engine, velocities lower than this, i.e., to the left of the curve, need higher recirculating mass-flows to restore the combustion pressure back to the value at sea level. Velocities to the right of the curve require higher Injected gas velocities, to compensate for the small difference between the Injected velocity and the input velocity. It was pointed out that a major degree of freedom with the new engine was that mass-flows in the loop can be changed in flight, to give constant combustion pressures.

In practice it will be shown that to increase combustion pressure either; the recirculating mass-flow is increased for a given combustion temperature, or; the combustion temperature is increased for a given recirculating mass-flow. However it will be shown (Appendix 4) that these parameters are interelated, since for a given combustion temperature, increasing combustion pressure in-creases the recirculating mass-flow velocity, and for a given recirculating mass-flow increasing the combustion temperature also increases the velocity and hence the combustion pressure.

Also shown on the graph are the domains of operation of standard gas turbines, and the new engine, as a function of velocity and altitude. The standard turbo jet domain is shown hatched, and the limit caused by the maximum compressor input velocity is seen to be severe, although it has been pointed out that this limit can be raised by judicious use of inlet duct shaping. The much larger area of operation for the new engine is clearly seen. Subsonic and Concorde aircraft cruise points are indicated on the figure.

Figure 6:
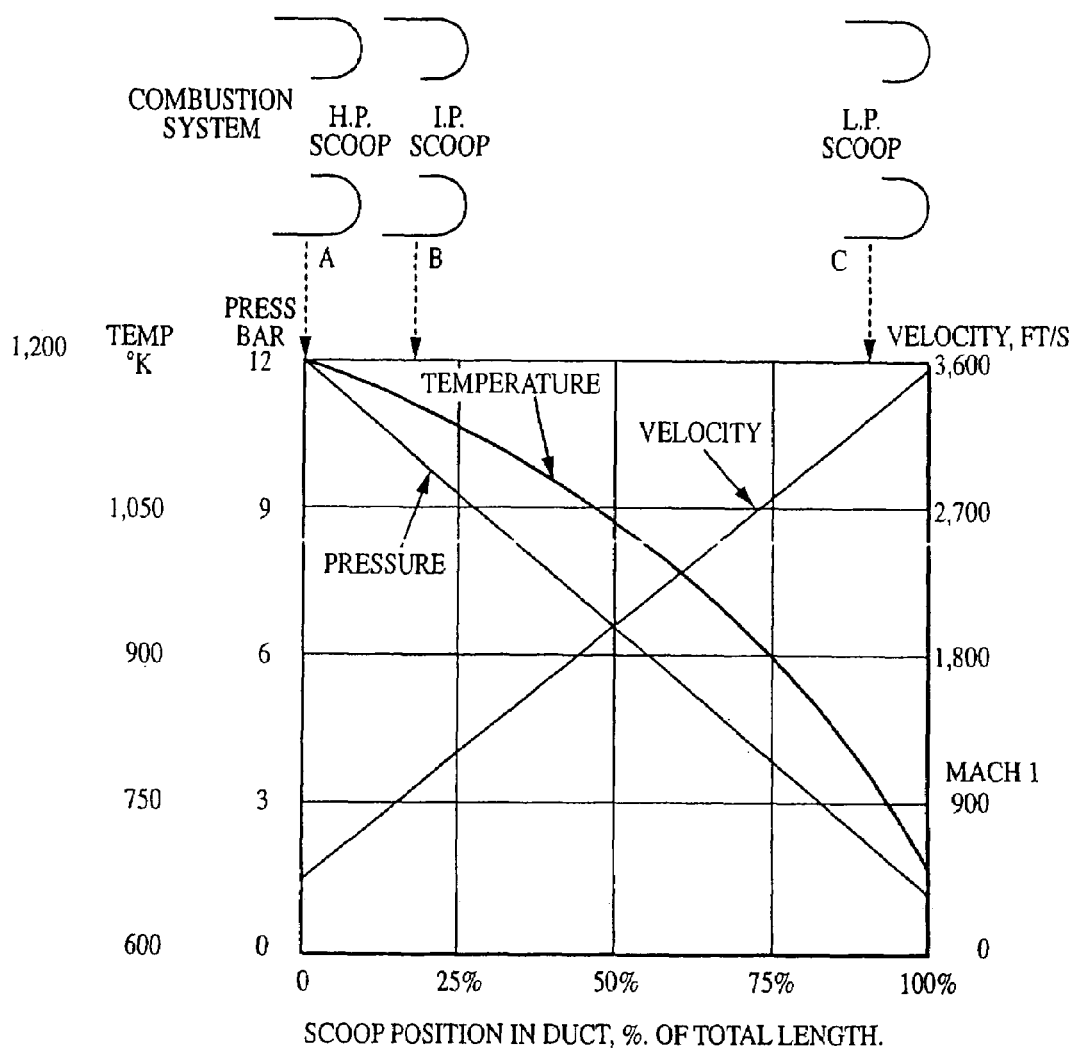
FIG. 6 is a Scoop Position in Outlet duct, and Relationship between Gas Pressure, Temperature and Velocity.

The position of the Scoops in the output nozzle of the engine will affect the temperature, velocity, and pressure of the gas which is picked up, and recycled. FIG. 6 shows the relationships for a Scoop which is placed just after the combustion system, some way down the nozzle, and at the output point. These examples are taken from the engine described in Section 6. If the connecting duct to the Injectors is of sufficiently large area, it is not 'choked', and the Injected gas velocity temperature and pressure will always be the same as if the Scoops were placed at the output point, (neglecting losses). This is due to the connecting ducts behaving, in effect, as the outlet duct of the engine, and the gas accelerates along the duct, in the same way as the outlet gas does in the exit nozzle. If, however, the connecting ducts are choked, then it is possible to Inject the gas at the input at different velocities and pressures. It can be seen that by placing the Scoops in position 'B', where the gas velocity is less than the local Mach 1 velocity, then supersonic shock waves will not be generated in the exit nozzle, and the Scoops will cause a minimum, of interference to the outlet gas. 180° reversals in the direction of flow of gases are within current technology. Several gas turbine designs employ this feature before and after combustion chambers. For example, the Avco Lyoming ALF502L and the Garrett Airesearch type ATF3-6, the latter having double flow-reversals.

Injector nozzles can be aerodynamically shaped, using a convergent-divergent profile, to alter the pressure, temperature and velocity of the Injected gas. For example, as an engine's forward speed rises, by using a convergent-divergent profile in the nozzle, the gas velocity can be raised, and even though the Injected gas pressure will fall, as will its temperature, the Ram pressure can be arranged to be approximately constant. By use of semi-static nozzle vanes, operated by pneumatic rams, changes to the Injected gas velocity can be made in flight. The area of the throat of a convergent-divergent nozzle determines the mass-flow in the Loop, which will be constant when the gas velocity in the throat has the maximum local value of Mach 1. To vary the mass-flow, the velocity of sound can be varied, by altering the local pressure, density or temperature of the gas, since:

$$c = \sqrt{\delta RT} = \sqrt{\frac{\delta P}{\rho}}$$

were c is the sonic velocity. The gas temperature T, and/or pressure p (and hence δ), upstream from the throat are functions of the combustion temperature and pressure, which is clearly under the control of the fuel supply.

Injectors may have multiple stages, analogous to multiple compressor stages, each stage optimized to produce a certain level of pressure increase, and after a diffuser, the gas can be subject to another stage of Injection. An. illustration of an arrangement is shown in FIG. 7, which indicates the equivalent of a triple spool Fan Jet. In this case the gas used to accelerate the bypass air, is discarded to the atmosphere, and the appropriate mass-flows are shown in the diagram. Fan jets are important because the Froude propulsive efficiency is high, the thrust from the fan falling with forward speed and altitude, until at normal cruise values, the thrust derived by the fan is almost zero. In the new engine the Injectors for the bypass path could be switched off when cruise conditions have been reached, thereby increasing engine propulsive efficiency. Later the optimum design of a Fan jet using the new engine format. It is shown that by regulation of the combustion paramets the Froude propulsive efficency can be kept approximately constant as an aircraft speed rises, and equal to the maximum value, from subsonic through supersonic aircraft speeds. This condition is obtained when:

$$V_a = \frac{V_e}{2}$$

where $V_a$ is the aircraft velocity.

It was stated that the diffuser following the injection and mixing process was required to reduce the velocity of the combined gas flow and recover the maximum possible pressure increase at the minimum increase of entropy. A subsonic diffuser can be embodied by a divergent duct, a supersonic diffuser is embodied by a convergent duct. In the latter case arrangements could be made to have a stationary shock wave at a downstream point in the throat of the diffuser. After the shock wave the static pressures and temperatures will be increased and the gas velocity is below the local Mach 1 value. A divergent duct can then be used to reduce the gas velocity further before the combustion process. It is not the purpose of this application to design diffusers in detail, indications of a few factors are given here. It should be noted that the entropy of a gas in a supersonic diffuser also has a complex description. Certain events occur isentropically, others occur with increased entropy. The object in design work should be to obtain compression of input gas with the minimum entropy increase.

Ducts, connecting the Scoops and Injectors, can be centrally or externally mounted in the engine, or both, according to whether the engine is arranged to have an annular or a circular combustion chamber. The choice in design will be largely influenced by the need to keep the gas viscosity losses to a minimum. Clearly there would be less loss in a circular pipe, than in an annulus of equal area, if the pressure, temperature, and velocity of the gas flows were equal. Calculations of the drag in the through and recirculated paths would indicate the best way to arrange the combustion system. In the new engine format, the surface area of the bounds to the gas flow, will be about half to one quarter of the surface areas of current engines, (because turbine and compressor blades account for a large area in contact with the gas). Careful design might reduce the values even more thus reducing losses from this cause considerably.

Services could be driven from a separate small turbine operated from a gas supply specially 'scooped' from the engine output duct. The gas from the turbine being exhausted rearwards from the engine. Another approach would be to run the services from electricity derived by the A.P.U. Auxilliary services not now required include oil pumps and coolers. Obviously fuel supply and pneumatic pumps, cool gas bleeds, and cabin pressurization feeds are still required.

Figure 8:
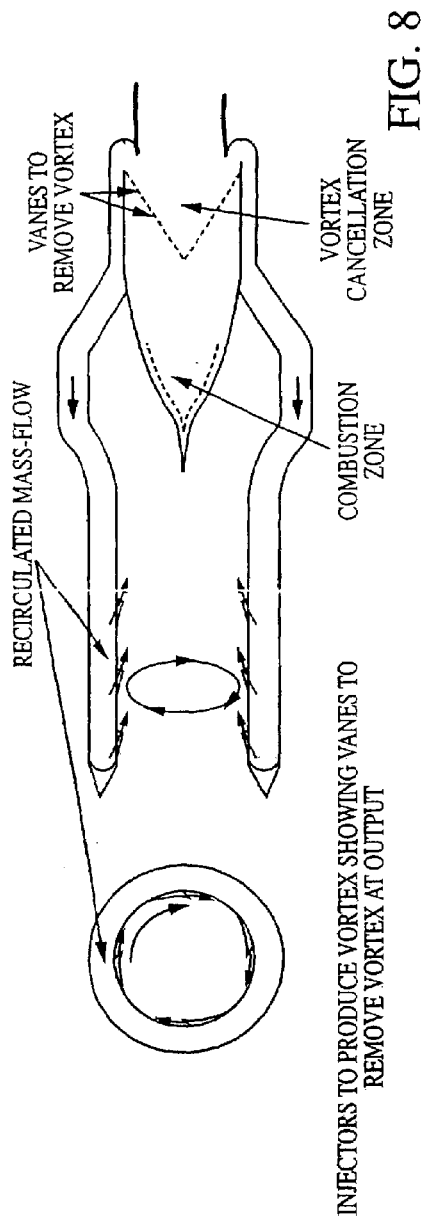
FIG. 8 is an Injectors to produce Vortex, Showing Vanes to Remove Vortex at Output.

Another degree of freedom, which has not been mentioned, is the use of the vortex in the design of an engine. The Injectors can be directed into the inlet duct, so that a swirl is induced in the inlet gas, in addition to the normal compression. FIG. 8 shows Injectors which are arranged with their axes directed to one side of the main axis of the engine, as well as inwards to the engine. Such a technique is not possible with conventional engines, because swirl is prevented by stator blades so that the turbines can operate on the gas correctly.

The interesting possibility is that a significant amount of energy can be stored by this means, in the form of the moment of inertia of the rotating gas, if the peripheral velocity has a significant Mach number. The Enthalpy H, or total heat energy of a gas per unit mass is normally given, by:

$$H = E + W + KE + PE \quad (2)$$

where E is the internal energy of the gas, W is the work done by the gas on its surroundings, KB is the kinetic energy due to its velocity, and PE is the potential energy due to altitude. Now, for a given, altitude, PE is constant, if heat energy dQ is added to the gas, differentiating (2) gives:

$$dH = dQ = dE + dW + \tfrac{1}{2} + dV^2 \quad (3)$$

The change in the internal energy dE is given by $C_v dT$ where $C_v$ is the specific heat of the gas at constant volume, and dT is the change in temperature. The change in work is given by pdv where p is the pressure and v the volume of the gas.

Now the first law of thermodynamics states that energy, heat and work may be interchanged, but the total energy of the system is conserved. If the gas is rotating at high angular velocity, w, then the gas has another means of storing energy, so we must add another term to the equation of Enthalpy. The rotational energy is given by, $\tfrac{1}{2} I w^2$ where I is the moment of inertia of a unit mass of gas. Equation (3) becomes:

$$dQ = C_v dT + pdv + \tfrac{1}{2} dV^2 + \tfrac{1}{2} dI w^2$$

and we have another degree of freedom to store energy in a gas, instead of, for example, temperature. We can therefore arrange to run the engine at a lower combustion temperature and release the energy after heat addition at the beginning of the outlet duct. The released energy would appear as heat, and more work output would be obtained.

Figure 9:
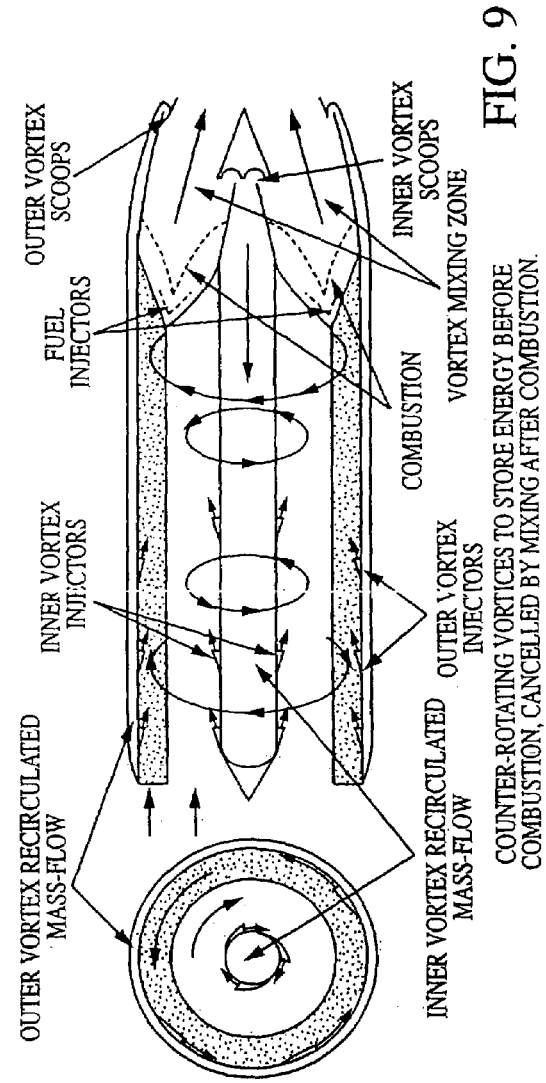
FIG. 9 is a Counter Rotating Vortices to Store Energy before Combustion, Canceled by Mixing.

One way to arrange the release of the energy is to construct an engine with two counter-rotating vortices whose net angular momentum is zero. FIG. 9 illustrates the method. The turning moment produced by one set of Injectors would be cancelled by the other set, there being no net moment acting on the engine. The gas in each vortex will be cooler than normally obtained by the compression process, so more heat could be added in the combustion process. After the addition of heat, the two anti-rotating gas streams are allowed to mix. Because of the centripetal acceleration acting on the gas, the stagnation pressure on the walls of the engine will exceed the flow pressure in the center of the gas streams. The inner vortex will therefore accelerate radially into the outer gas stream, and as the process continues, the angular momentum will be cancelled, resulting in the release of heat. Furthermore, the higher pressure at the walls will be transformed to an increase in the normal stagnation pressure of the gas, again resulting in a rise in temperature.

The whole point of this technique is that a higher final temperature can be achieved in the output of the engine, without requiring that temperature in the combustion chambers. A higher pressure ratio can be used, and so the engine's efficiency can be yet higher than the gains expected by the new engine in normal form. As an example, making the simple assumption that the gas is incompressible, the energy stored in one kg, (2.2 lb), of gas whose peripheral velocity is Mach 2.5, (2,650 ft/s), in a duct of diameter 1 meter, (39 ins), is equivalent to a temperature rise of 191° C. When the normal temperature is 288° K (15° C.), this represents a temperature ratio of 1.663. At combustion temperatures of 1200° K it will give 16% more energy for the same gas temperature. A full analysis for compressible fluids and taking into account shockwave production is beyond the scope of this application. It is hoped that this brief appraisal is sufficient to make this area of operation worthy of further study.

The technique described here is just another example of the degrees of freedom made available by the new method of energy transfer in this series of inventions. What was a problem to be avoided in conventional engines becomes a possible virtue in the new format.

Another important advantage for hypersonic flight is that the gas transit-time through the engine is increased by this method, thus easing combustion flame stability problems.

In this section the effect will be considered on the net engine thrust when an aircraft flies at typical cruise conditions of Mach 0.8 and 10,000 meters, (33,000 ft.). The engine will be used as an example (hereafter referred to as E6). It was pointed out that by incresing the recirculated mass-flow in the new engine, the combustion pressure, $P_{oe}$, can be restored to the value obtained at sea-level and the engine performance will be calculated with this condition. It will be shown that it is possible to arrange that the net thrust is the same as the sea-level static value.

There are normally two main reasons for engine thrust to be considerably reduced at altitude, compared to the static sea-level value:

(a) The overall mass-flow is lower as the input air has a density of about one third of the sea-level value.

(b) The net thrust is reduced because the engine has to increase the velocity of the input air to Mach 0.8, the net change in momentum of this air produces a rearwards force on the engine and subtracts from the momentum of the output mass-flow.

Against these effects, the Ram pressure rise at the engine input increases combustion pressure and thrust.

Gas turbines without afterburning yield net thrusts in the range of 27% to 33% of the sea-level static value, and Fan-jets about 20–22% of normal.

Due to reduced air density the net drag on the aircraft is also considerably reduced at altitude, and for subsonic applications, lower engine output generally is not a problem. For Supersonic use, however, the reduction in thrust causes difficulties because the wave drag at transonic velocities greatly exceeds the normal drag on the aircraft.

The Input conditions for the engine are as follows:

| Altitude | | 10,000 meters (33,000 ft.) |
|---|---|---|
| Flight Speed | $V_a =$ | Mach 0.8 (258 m/s) |
| Atmospheric Temperature | $T_a =$ | 223° K (50° C.) |
| Atmospheric Pressure | $P_a =$ | 0.265 bar (3.90 psi) |
| Ram Pressure Ratio | $R_{op} =$ | 1.524 |
| Ram Temperature Ratio | $R_{OT} =$ | 1.128 |

We need to find the air density, $\rho$, and assuming an ideal gas we have:

| pv = RT where | R = | 287 the gas constant J/kgk |
|---|---|---|
| and | v = | Volume m$^3$ |
| | p = | pressure N/m$^2$ |
| and | 1 bar = | 101,325 N/m$^2$ |

Now for a unit mass of gas:

$$\rho = \frac{1}{v}$$

$$\therefore \frac{P}{RT} = \rho$$

Substituting we have:

$$\rho = \frac{0.265 \times 101{,}325}{287 \times 223}$$

$$= 0.4195 \text{ kg/m}^3$$

For reference the density of air at sea-level is 1.226 kg/m³

Now for E6 with no change to the recirculated mass-flow ratio, the input combustion pressure would be given by:

$P_r = (R_{op} \times P_a) \times 12$ where is the Compression ratio.
$= 1.524 \times 0.265 \times 12$
$= 4.846$ bar
And $P_{oe} = 4.846 \times 0.99$ (assuming 1% Combustion Pressure Loss)
$= 4.797$ bar.

We are going to increase the recirculating mass-flow to restore $P_{oe}$ to 11.88 bar, the sea-level value. Following the same form of the calculations in Section 6 we, have:

$$\frac{P_{oe}}{P_a} = \frac{11.88}{0.265}$$

$$= 44.83$$

And $\frac{T_{oe}}{T_e} = 2.5639$     9.1

Before we can compute the thrust or the recirculating mass-flow, we must calculate the overall mass-flow, $\dot{m}$.

Now the static sea-level mass-flow is 50 kg/s. It can be shown that the inlet duct area, A, is 0.333 m² for an input gas velocity, V, of Mach 0.4.

The mass-flow is given by:

$\dot{m} = \rho A V$

At Altitude, $V=V_a$, the velocity of the aircraft, plus a velocity component caused by the reduced duct pressure at the inlet due to the downstream Injection Process. It can be shown that the maxim=velocity in the throat of a duct due to a downstream pressure reduction is when V=Mach 1 and-is obtained when the duct is 'choked'. To obtain higher mass-flows the throat area, A, must be increased.

The mass-flow in this condition is approximately:

$$\dot{m} = 0.4195 \times 0.333 \times 340$$

$$= 47.5 \text{ kg/s}$$

-continued (Where the sonic velocity $c = Mach1 = 340$ m/s)*

*The atmospheric value of $c$ at 10,000 m is 300 m/s, but the ram temperature ratio at the inlet increases the sonic velocity to approximately 340 m/s.

We can calculate the value of $V_e$ required to give the same net thrust as the sea-level static value. (i.e. 51,775N)

Assuming that the Scoops reduce the thrust by 5%,

Then:    $F_e = 0.95$ m$(V_e - V_a)$

And    $51{,}775 = 0.95 \times 47.5 (V_e - 258)$ $\therefore V_e = 1405$ m/s(Mach 4.133)

Now    $V_e = \sqrt{2C_p(T_{oe} - T_e)}$

And from    9.1, $T_{oe} = 2.5639 T_e$ $\therefore V_e = \sqrt{2C_p(2.5639 T_e - T_e)}$ $1405^2 = 2 \times 1159 \times T_e \times 1.5639$ $\therefore T_c = 544.54°$ K And    $T_{oe} = 1369°$ K The combustion temperature is higher than example E6 because the compression ratio is now 44.83 instead of 12. The value of $T_{oe}$ is increased by 196° C.

We are assuming that $V_e = V_r = $ M 4.133

The required Ram Pressure ratio derived by Injection is given by:

$$44.83 = (1 + 0.163 M^2)^{4.039}$$

From which M=3.1

We now need to calculate the recirculating mass-flow $\dot{m}_r$ to give a combustion entry pressure of 12 bar.

Using the former method of calculation:

$V_r = V_e = $ Mach 4.133

$V_l = $ Mach 3.1

And $V = $ Mach 1.0

$$\frac{1}{2}\dot{m}V^2 = \frac{1}{2}\dot{m}_r V_r^2 = \frac{1}{2}(\dot{m} + \dot{m}_r)V_l^2$$

Multiplying the terms by 2 we have:

$$47.5 \times 1^2 + \dot{m}_r 4.133^2 = 47.5 \times 3.1^2 + \dot{m}_r 3.1^2$$

From which $\dot{m}_r = 54.75$ kg/s

The ratio of recirculated to overall mass-flow, $\frac{\dot{m}_r}{\dot{m}}$ is: $\frac{1.15}{0.868} = 1.328$ Or a 32.8% higher mass-flow ratio.

This ratio would have been yet higher, if we did not have to increase the compustion temperature. As explained, the worked Example E6 was compared to a regular turbojet in which the combusion temperature was quite low compared to the latest designs.

Modern engines operate with a $T_{oe}$ of from 1500 to 1700° K, and no advantage was taken of the ability of the new engine to operate at even higher temperatures. We are now going to complete the engine calculations, and the results are briefly set-out below.

From consideration of the stagnation enthalpies, simplifying and assuming the specific heats are equal, $$47.5(T_{oc}-223)=54.75 (1396-T_{oc})$$

$$T_{oc}=851° K$$

The Fuel supply raises the temperature of 102.25 kg/s by (1396–851) or 545° C.

$$f/a = \frac{1.1(545-50)\left(1+\frac{851}{3250}\right)}{42,000}$$

$$= 0.016359$$

$$\therefore \dot{m}_f = 0.016359 \times 102.25$$

$$= 1.673 \text{ kg/s}$$

Fuel Power in = 1.673×42 MW.

= 70.25 MW.

Work Out = 46.88 MW.

Thermodynamic Efficiency = 66.73%

Theoretical maximum thermodynamic efficiency for the given value of $$\frac{\dot{m}_r}{\dot{m}}$$

$\eta_1$=79.0%

(Appendix 4)

Theoretical maximum thermodynamic efficiency of a gas turbine with a pressure ratio of 44.83

Recirculating Power $$\eta \tau J = 65.70\% \quad (\delta = 1.3915)$$

$$= 34.58 \text{ MW.}$$

Propulsive efficiency $$\eta_P = \frac{2}{1+V_e/V_a} = 31.\%$$

Although we have kept the thrust constant with altitude, the propulsive efficiency is well below the optimum value, which would be obtained when $V_e=2V_a$ 516 m/s. As already mentioned, engine E6 is more suited for supersonic aircraft, and a larger mass-flow with a lower value for $V_e$ would give much lower values of fuel consumption for the same net thrust. This would be achieved by using lower pressure and temperature ratios.

In Summary, when flying at 33,000 ft. altitude, we have shown that by increasing the Loop mass-flow ratio by 33%, we can maintain the combustion pressure constant and equal to the sea-level value. Because of the larger pressure and temperature ratios in the outlet nozzle, (atmospheric pressure is about one quarter of the sea-level value), the exhaust velocity $V_e$, goes up by (1405–1090) or 314 n/s. At Mach 0.8 the aircraft velocity is 258 m/s. So the increased exhaust velocity more than offsets the reduction of thrust caused by the momentum of the inlet air. Due to the increased Loop mass-flow, the increase in Loop energy-flow or power is about 50%. The fuel consumption increases by 36% and the thermodynamic efficiency by 28.5%.

Since it is not possible to increase the Loop energy-flow in gas turbines, none of the –degrees of freedom described here are possible.

By this means the new claimed engine has about 330% more net thrust than current gas turbines flying under the same conditions. This result is particularly important when considering engines of constant thrust, or propulsive efficiency, for a wide range of flight conditions and altitudes from subsonic to hypersonic.

The importance of varying the Loop Energy transfer, by increasing the re-circulating mass-flow was described. This example showed that by increasing the value of $\dot{m}_r/\dot{m}$ by 33% to keep the combustion pressure constant at an Altitude of 10,000 m and Mach 0.8 kept the thrust constant whereas the thrust from regular turbojets under the same conditions falls by about 70%.

In this Section we are going to describe an alternate engine Layout with two combustion systems, one system is conventional and is in the path of the overall mass-flow, and the other is in the path of the recirculating mass-flow. The Scoops are now placed after the diffusers and before the main overall mass-flow combustion system, instead of after. Separate fuel supplies feed each combustion system.

We are going to show that an increase in recycled energy by means of the recirculating mass-flow combustion system, has an equivalent effect to an increase in the recirculated mass-flow. The main path combustion pressure can be kept constant by increasing the fuel supply to the Loop combustion system. In certain circumstances, this may be easier to arrange than to switch-on additional Scoops, ducts and Injectors. By varying the fuel ratio to the Loop and main combustion systems, the required degree of freedom can be exercised. It has been pointed out that regular gas turbines have zero degrees of freedom in this area.

Figure 10:
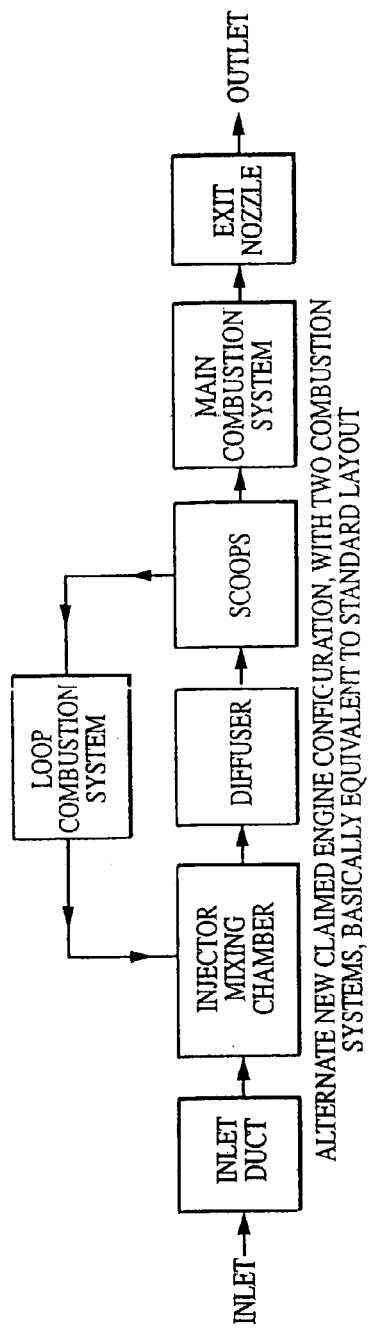
FIG. 10 is an Alternate Engine with Two Combustion Systems, Equivalent to Standard Layout.
Figure 11:
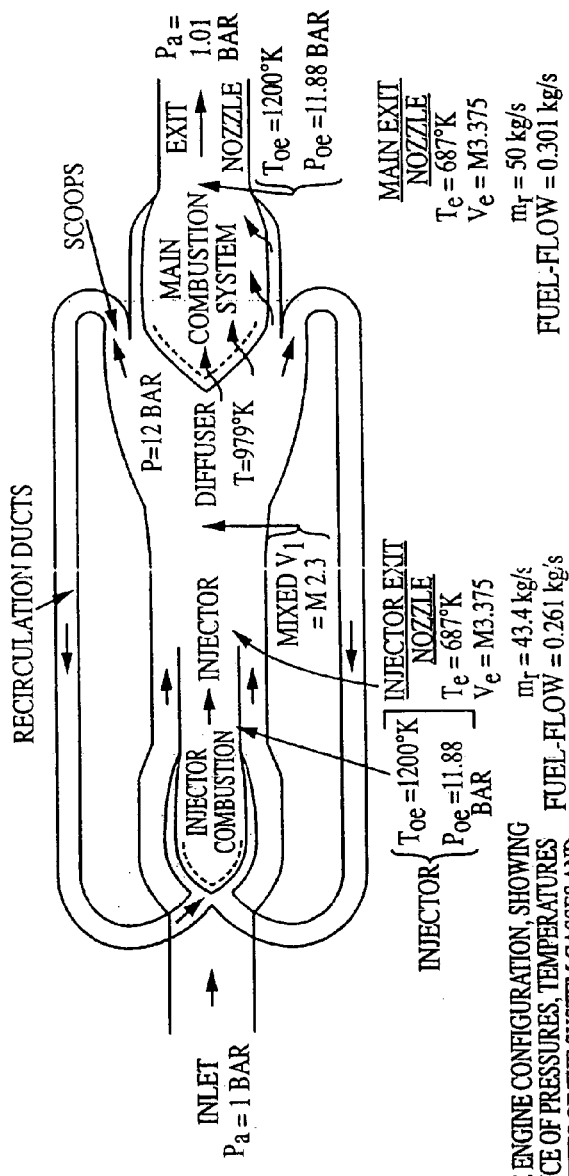
FIG. 11 is an Alternate Engine Showing Equivalence of Pressures, Temperature, Velocities and Fuel Flows.

We will consider, as a model, the new engine, E6, and we are going to re-arrange the engine to be an exact equivalent in every respect, except it has two combustion systems. The total fuel flow, mass-flows, temperatures, pressures, velocities, are identical with the worked example. The rearrangement is shown in FIGS. 10 and 11.

Before developing the equations for the variation of the Loop energy transfer by altering the Injector Combustion Temperature a few features of the alternate engine layout will be explained.

1. The Scoops are now after the diffuser and operate at High pressure, (12 bar), Low velocity and precombustion Temperatures (740° K).
2. Assuming no work is done in Ducts, the Injector Combustor operates at the same pressure and temperature as in point 1.

3. The Injector acts as the exit nozzle for the recirculation Loop in the same way as the exit nozzle does for the engine. The values of $P_{oe}$, $T_{oe}$, $T_e$, $V_e$, $P_e$, are all the same as for the main output nozzle. (Assuming no nozzle shaping).
4. Note that the one difference between this alternate engine Layout and that of the sample engine is that the Scoops do not interfere with the 50 kg/s main exit flow. Formerly allowance was made for this interference reducing the output thrust by 5%.

The new thrust is given by:

$$F_e(\text{new}) = F_e(\text{old})/0.95$$

$$= \frac{11.639}{0.95} = 12{,}252 \text{ lbs. st.}$$

The Scoops instead divert gas of low velocity (because of the diffuser) and will cause minimal interference with the gas flow.

Now the fuel flow to the Injector Combustor must be increased to compensate the loss of pressure due to the aircraft flying at Mach 0.8 and 10,000 m altitude (33,000 ft.). Following the calculations previously, to restore the combustion Pressure to 12 bar the combined recirculated and overall mass-flows must have a Ram Pressure ratio of 44.83 or a velocity of Mach 3.2. The engine exit velocity, $V_e$, will be Mach 4.03. We need to find er, the recirculating mass-flow velocity.

Assuming mass-flow $\dot{m}$ is 47.5 kg/s, and recirculating mass-flow has sea-level conditions due to the reduced air density, we shave:

$$\dot{m}_r = \frac{47.5}{50} \times 43.4$$

$$= 41.2 \text{ kg/s}$$

Therefore:

$$V_1 = M\ 3.2 \quad V = 0.8 \quad \dot{m} = 47.5 \quad \dot{m}_r = 41.2$$

$$\dot{m}V^2 + \dot{m}_r V_{er}^2 = (\dot{m}_r + \dot{m})V_1^2$$

$$47.5 \times 0.8^2 + 41.2 V_{er}^2 = 88.7 \times 3.2^2$$

$$30.4 + 41.2 V_{er}^2 = 908.3$$

$$\therefore V_{er} = 4.615$$

So recirculating Velocity must be Mach 4.615 or 1491 n/s. to give a Ram pressure ratio of 44.83, and restore the combustion entry Pressure to 12 bar.

Now: $\quad V^2 er = 2.Cp(Toer - Ter) \quad$ (3)

$$\therefore 1491^2 = 2 \times 1159 (T_{oer} - T_{er})^{\frac{1}{2}}$$

$$\therefore 959 = T_{oer} - T_{er}$$

Now: $\quad \dfrac{P_{oe}}{P_a} = \dfrac{44.83}{1.125} = 39.85$

And: $\quad \dfrac{T_{oer}}{T_{er}} = \dfrac{P_{oe}}{P_a}^{\frac{\delta-1}{\delta}}$ $$= 39.85^{\frac{1}{4.039}}$$

$$= 2.490$$

$$\therefore T_{oer} = 2.490 T_{er}$$

Substituting in (3) for $T_{oer}$ $$959 = 2.490 T_{er} - T_{er}$$

$$644 = T_{er}$$

And $\quad T_{oer} = 959 + T_{er}$ $$= 1603° \text{ K. } (1330° \text{ C.})$$

So the recirculating mass combustion temperature must be raised from 1220° K to 1603° K, or 403° K, then the Injected velocity is 1491 m/s (or Mach 4.615) and the combined recirculated and thrust mass-flow give a combustion entry pressure of 12 bar (or a pressure ratio of 44.83).

The combined gas temperature, $T_{oer}$, after compression is obtained, as before, by consideration of the stagnation enthalpy flows.

$$41.2\ (1603 - T_{oer}) = 47.5\ (T_{oer} - 223)$$

Assuming the specific heats are equal.

$$66{,}044 - 41.2T = 47.5 T_{oer} - 10{,}592$$

$$\therefore T_{oer} = 864° \text{ K}$$

The fuel supply for the Loop combustion mist raise the temperature of the Loop mass-flow, (41.2 kg/s) by $$1603 - 864 \text{ or } 739° \text{ C.}$$

And the fuel to air ratio is given by:—

$$f/a = \frac{1.1(739 - 50)\left(1 + \dfrac{739}{3250}\right)}{42{,}000}$$

Assuming 100% combustion efficiency.

$$\therefore f/a = 0.02215$$

And the fuel flow for the Loop $$\dot{m}_{fr} = 0.02215 \times 41.2$$

$$= 0.9125 \text{ kg/s}$$

The fuel supply for the main combustion system must raise the temperature of 47.5 kg/s by $1200 - 864 = 336°$ C.

$$\therefore f/a = \frac{0.99(336 - 10)\left(1 + \dfrac{336}{3250}\right)}{42{,}000}$$

$$= 0.008479$$

-continued

And Fuel flow $\dot{m}_{fm} = 0.008479 \times 47.5$ $= 0.4027$ kg/s.

The total fuel flow for the engine is given by the sum of the two fuel flows:

$\dot{m}_f(\text{total}) = 0.9125 + 0.4027$ $= 1.315$ kg/s

The total fuel Power input $= 1.315 \times 42$ MW
$= 55.23$ MW

The Power output $= 41.24$ MW

Thermodynamic efficiency $= 74.7\%$

Theoretical Maximum efficiency=80.7% for a pressure ratio of 44.83 (Appendix 4)

The Recirculating Power (Recirculating

Loop fuel power supply) $= 0.9125 \times 42$ $= 38.325$ MW

Propulsive efficiency $\eta_P = \dfrac{2}{1 + V_e/V_a}$ $= 32.7\%$

Note that the thermodynamic efficiency of this arrangement is improved because the main combustion temperature is lower than the engine described, and there is therefore less waste heat. Comparing the engine described with this engine we have the following parameters under the same flight conditions:

| Parameter | $\dot{m}_r/\dot{m}$ Increased | Increased Toer |
|---|---|---|
| Thrust | 51,775 N | 54,502 N |
| Exit Velocity | 4.133 M | 4.03 M |
| $\dot{m}_r/\dot{m}$ | 1.15 | 0.87 |
| Combustion Temperature | 1396° K | 1200° K |
| Loop Combustion Temperature | — | 1603° K |
| Fuel Flow (Total) | 1.673 kg/s | 1.315 kg/s |
| Output Power | 46.9 MW | 41.24 MW |
| Thermodynamic Efficiency | 66.7% | 74.7% |
| Max. Theoretical Efficiency | 79.0% | 80.7% |
| Propulsive Efficiency | 31.0% | 32.7% |
| Loop Power | 37.6 MW | 38.3 MW |

It was pointed out that there are better ways to arrange the engine parameters to improve the propulsive efficiency, (namely reducing $T_{oe}$, and $P_{oe}$, and increasing $\dot{m}_r/\dot{m}$ see Appendix 4, but it is convenient to illustrate common situations based on Engine E.6. so that trends may be compared. Remember that the efficiency of the three engines has only been estimated, practical engines will have values which may well be different.

In summary, we have shown that by arranging the engine to have two combustion systems, regulation of the pressure ratio can be achieved by the simple artifice of varying the fuel supply to the loop mass-flow burner, and hence control of the loop power. This simple method can be a powerful practical way of controlling engine parameters, under varying conditions of flight. In the example worked here the loop combustion temperature is considerably increased, over the static sea-level value, but Appendix 4, discusses methods whereby both main and loop combustion temperatures can be radically reduced, because of the fundamental thermodynamic properties of the new types of engine.

These discussions lead to another alternate form of engine which has a yet higher thermodynamic efficiency and only one combustion system, and it is described in the next Section.

Figure 12:
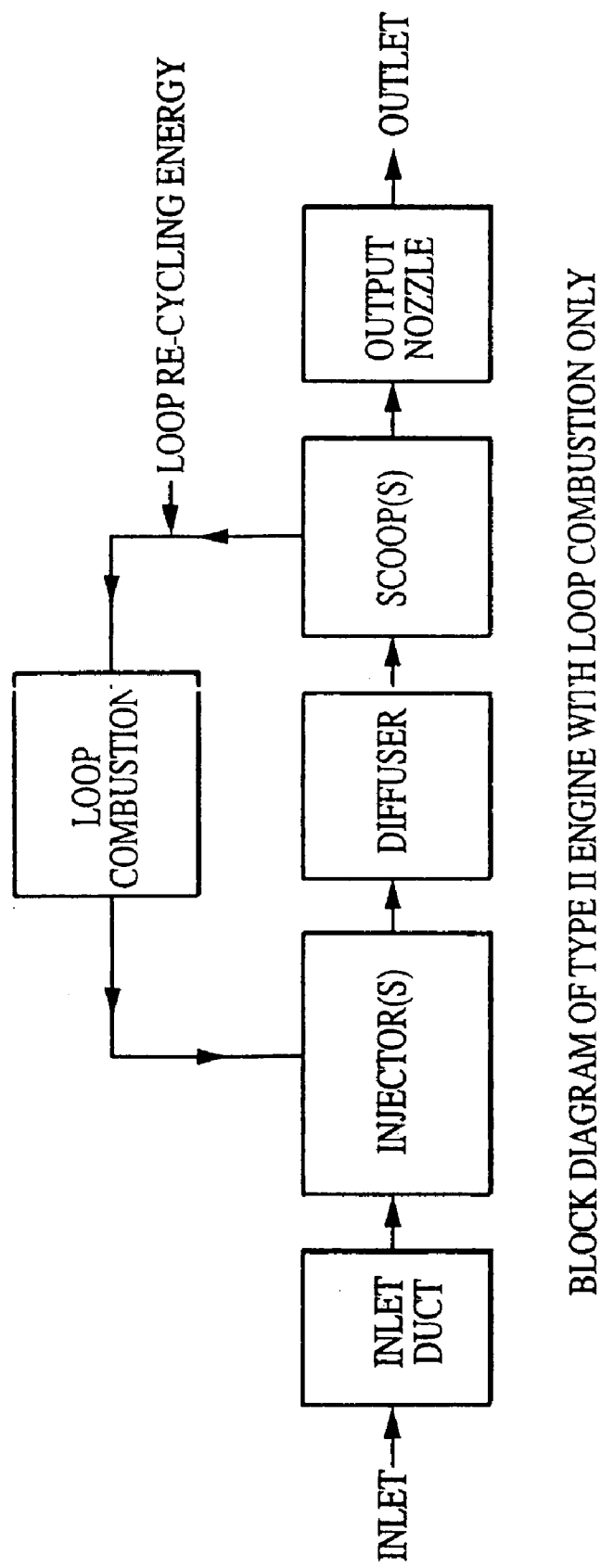
FIG. 12 is a Block Diagram of Type 2 Engine with Loop Combustion Only.
Figure 13:
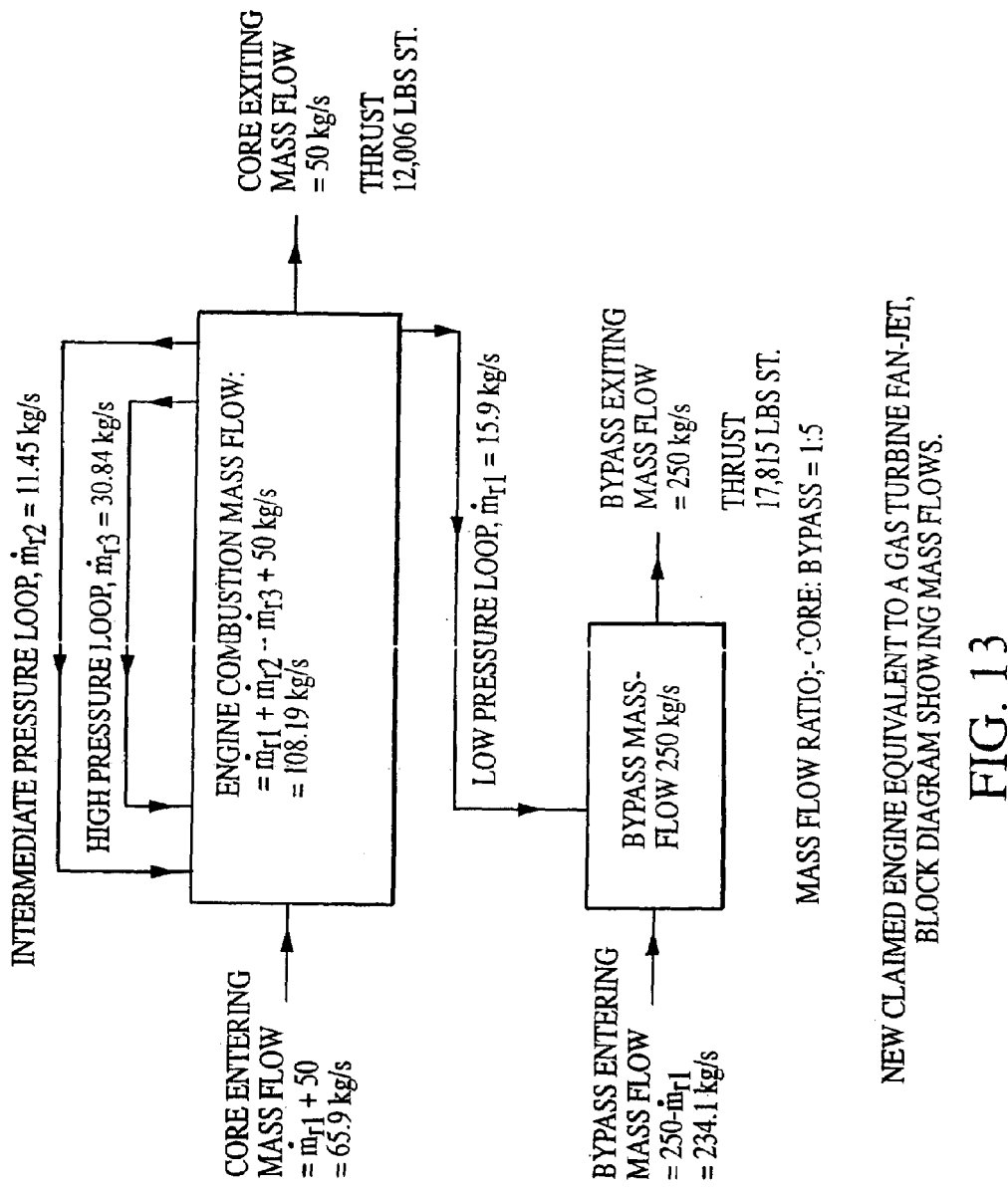
FIG. 13 is a Fan Jet Block Diagram Showing Calculated Mass-Flows.
Figure 30:
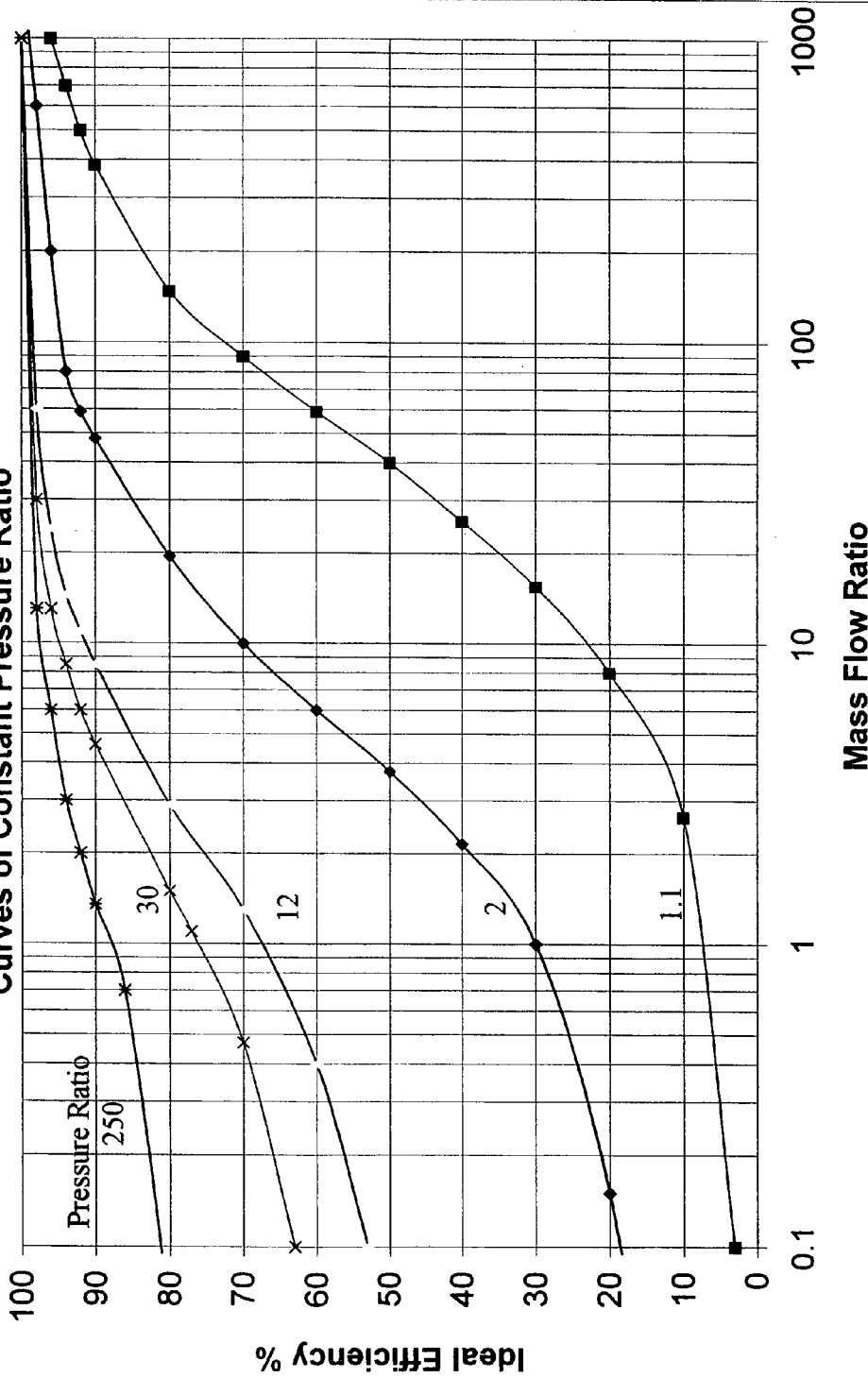
FIG. 30 is a Type 1 Engine Curves of Constant Pressure Ratio against Theoretical Efficiency.
Figure 31:
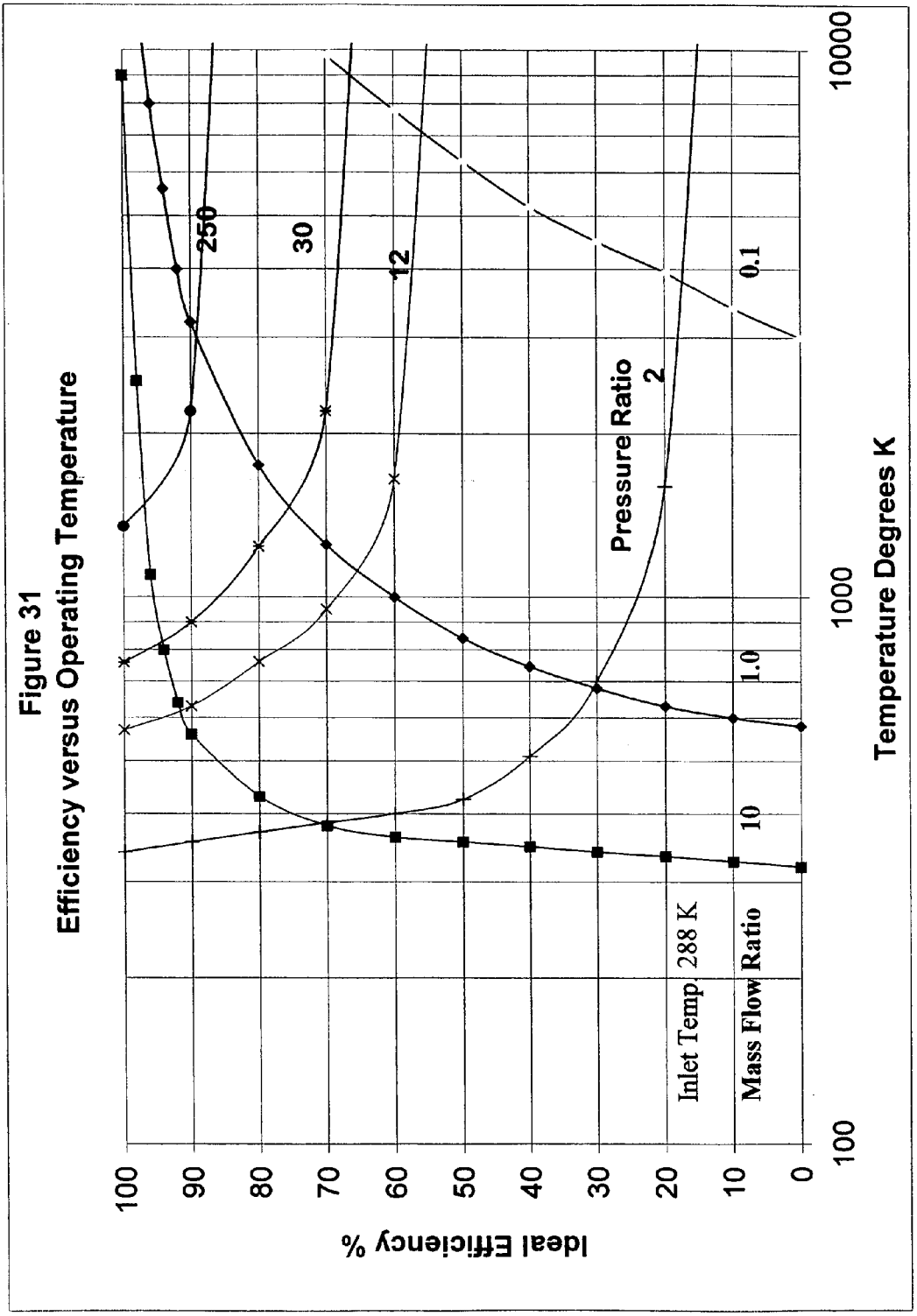
FIG. 31 is a Type 1 Engine Theoretical Efficiency Curves of Constant Pressure Ratio against Operating Temperature.
Figure 32:
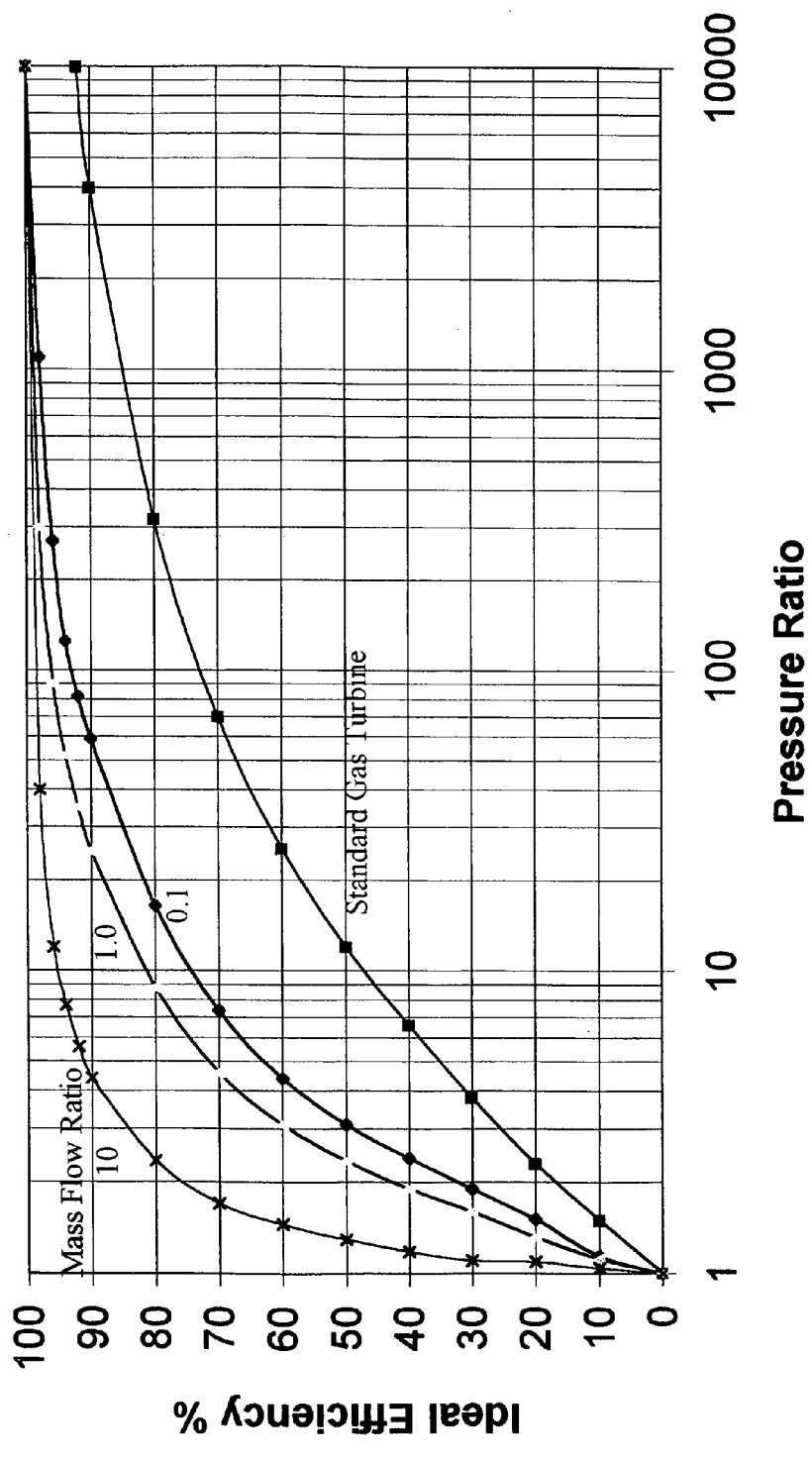
FIG. 32 is a Type 2 Engine, Efficiency as a function of Mass-Flow Ratios.
Figure 33:
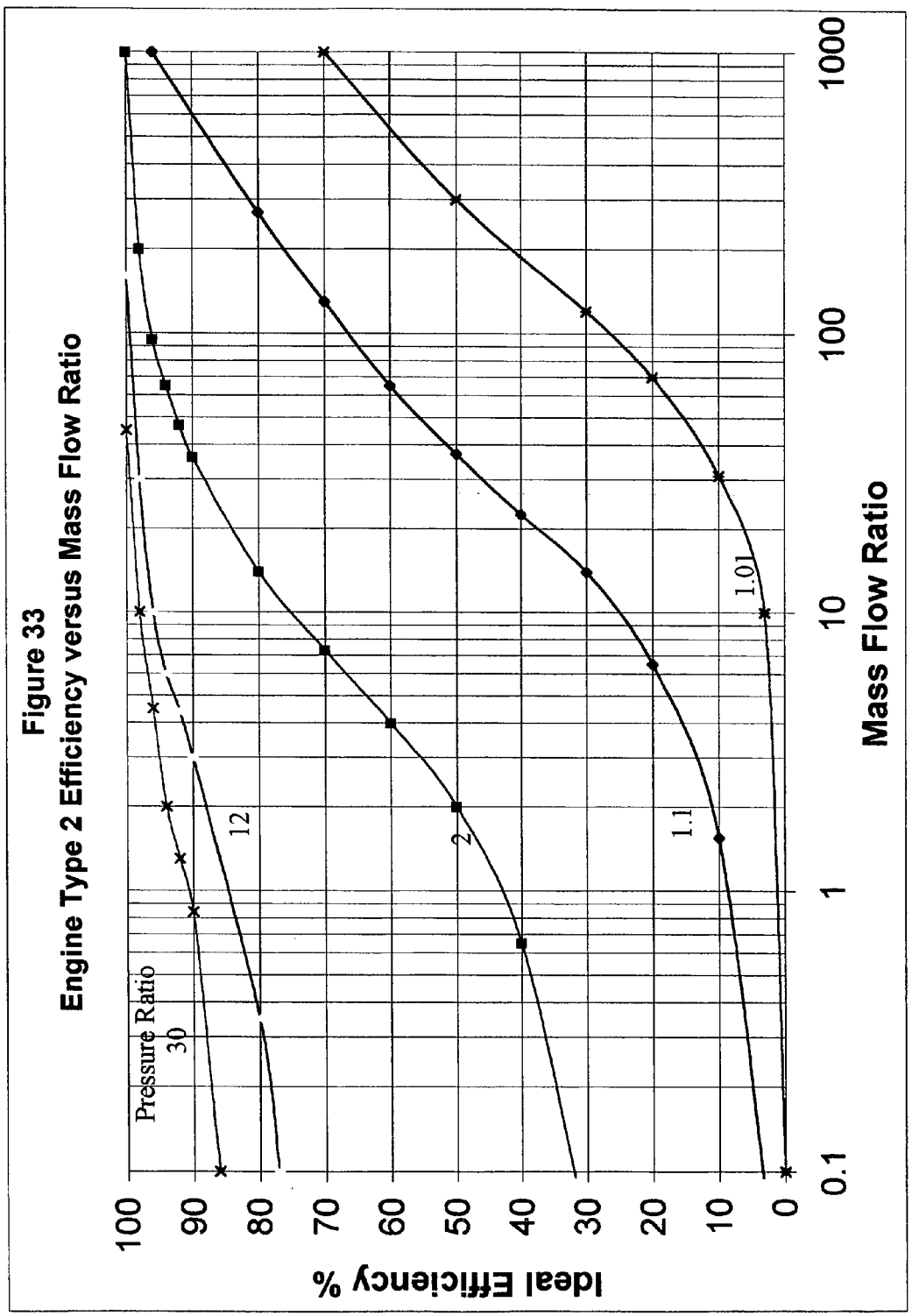
FIG. 33 is a Type 2 Engine, Curves of Constant Pressure Ratio against Theoretical Efficiency.
Figure 34:
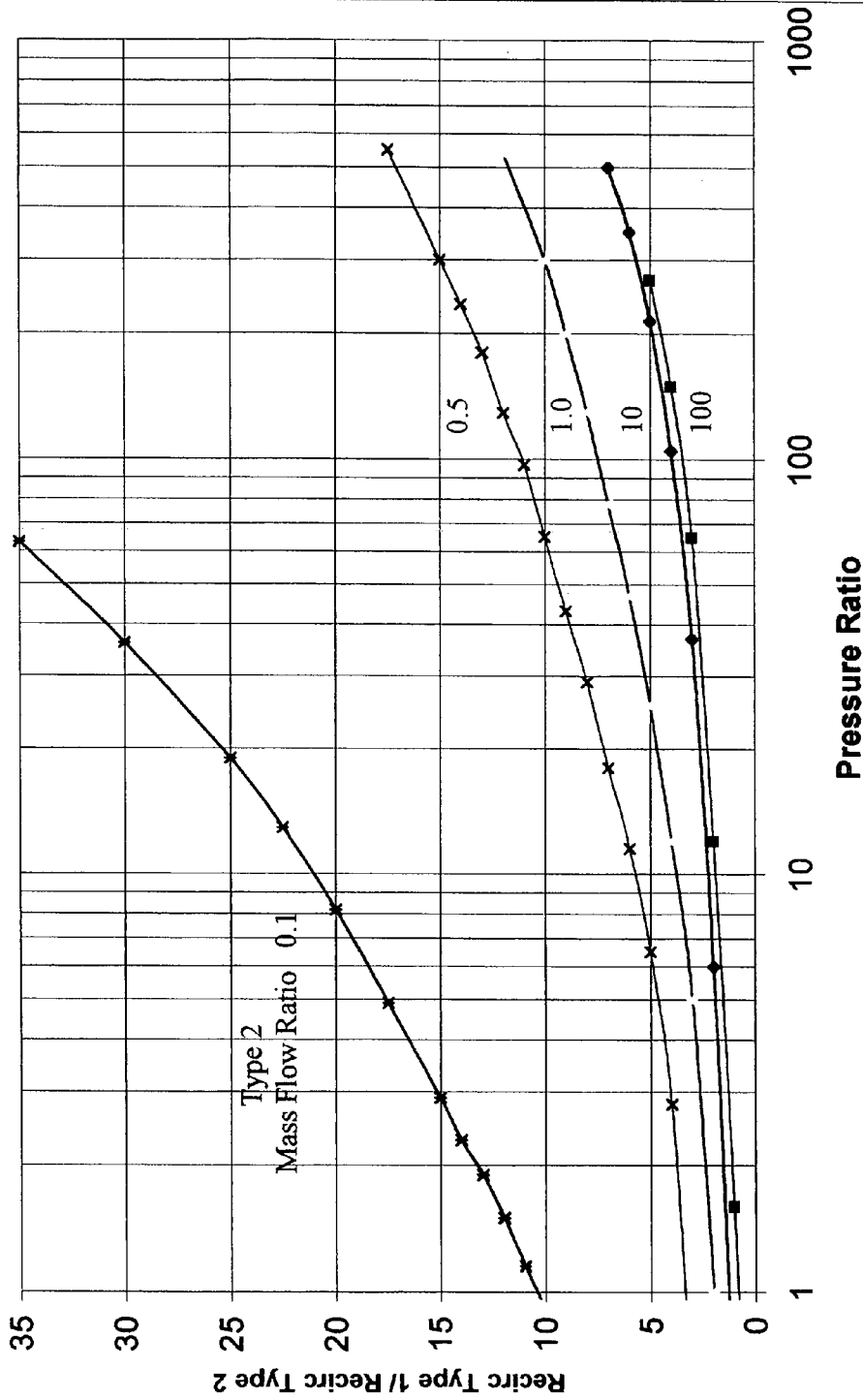
FIG. 34 is a Ratio of Recirculating Mass-Flows for a Type 1 of same Efficiency as a Type 2.

In the Previous Section it was shown that by providing separate combustion for the Loop and main mass-flows ($\dot{m}_r$ and it respectively), control of systems the engine operating parameters could be obtained simply by varying the loop fuel supply and hence the combustion temperature, $T_{oe}$, of the recirculating mass-flow. We are going to consider in this Section yet another alternate engine layout which completely dispenses with the main path combustion system. i.e. we have just one combustion system only, and it is placed in the loop-path. The layout of this engine is shown diagrammatically in FIG. 12.

The main overall mass-flow, in this case, is merely compressed by the loop mass-flow, and then allowed to expand through the exit nozzle of engine, producing the power output and thrust.

Since in only receives compression and heat addition from the loop, its output temperature, $T_{oe}$ will be lower, as will be its waste heat, so we might expect that this engine is thermodynamically more efficient than the engine discussed in Sections 6 or 10. Appendix 4 discusses the ideal theoretical efficiency of this engine (referred to as a type 2 engine) and shows that it indeed does have a higher efficiency at a given pressure ratio.

As before, we will use engine E6 as an example, and calculate the performance of the engine without a main combustion system.

For the overall mass-flow $T_{oe}$ is now equal $T_{oc}$, i.e. 741° K. (the compressed gas temperature). The loop combustion temperature is operating at 1200° K as before, in E6.

Now: $\quad \dfrac{P_{oe}}{P_e} = \dfrac{11.88}{1.25} = 9.50$

And: $\quad \dfrac{T_{oe}}{T_e} = 9.5^{\frac{1}{4.039}}$ $= 1.746$ $\therefore T_e = \dfrac{741}{1.746} = 424°$ K(151° C.)

$V_e = \sqrt{2.Cp(T_{oe} - T_e)}$ $= (2 \times 1159 \times (741 - 424))^{\frac{1}{2}}$ $= 857$ m/s.

Scoops do not interfere with this output mass-flow so there is no reduction in exit velocity from this cause.

$F_e = \dot{m}V_e$ $= 50 \times 857$

-continued $$= 42,850 N (9,633 \text{ lbs. st.})$$

The exit velocity and thrust is lower as we would expect with no heat addition to the mass-flow.

The thrust is reduced to:

$$\frac{9,633}{11,639} = 0.827 \text{ or } 17.3\%$$

$$\text{The output power} = \frac{1}{2} \dot{m} V_e^2 \text{ (or } \dot{m} C p_e (T_{oe} - T_e))$$
$$= 18.36 \text{ MW}$$

The fuel flow is reduced in the ratio of the recirculating mass-flow to total mass-flow through the combustion system in engine E6, which is 93.4 kg/s.

The fuel flow for E6 is 1.229 kg/s.

$$\therefore \dot{m}_{fr} = \frac{43.4}{50 + 43.4} \times 1.229$$
$$= 0.5711 \text{ kg/s.}$$

The power input is given by Fuel Flow × $LCV = 0.5711 \times 42$ MW
$$= 23.99 \text{ MW}$$

And this equals the loop power.

The efficiency $\eta_2$ is given by:

$$\eta_2 = \frac{\text{power out}}{\text{fuel power in}}$$
$$= \frac{18.36}{23.99}$$
$$= 76.53\%$$

The theoretical maximum efficiency of this engine is 82.3 (Appendix 4).

In Comparison with E6 we have:

| Parameter | Engine E6 | New Engine Type 2 | Increase |
|---|---|---|---|
| Thrust lbs st. | 11,639 | 9,633 | −17.3% |
| Output Power MW | 26.81 | 18.36 | −31.5% |
| Fuel kg/s | 1.229 | 0.5711 | −53.5% |
| Efficiency % | 51.94 | 76.53 | +47.3% |
| Exit Velocity m/x | 1035.5 | 857 | −17.3% |
| Loop Power MW | 23 | 23 | Invariant |

We can see that, as expected, the output power, thrust and fuel supply is reduced, but the efficiency is much increased. This engine requires less than half the fuel for a thrust which is reduced by only about 17% in comparison with the conventional engine layout. Recall that the efficiencies must be regarded as estimates; because practical engines may have different losses from those described, but assuming similar losses in each case (apart from Scoop turbulence losses which will be different) the ratio of the efficiencies gives a good measure of practical performance. Further conclusions about the advantages of this engine are described.

Figure 7A:
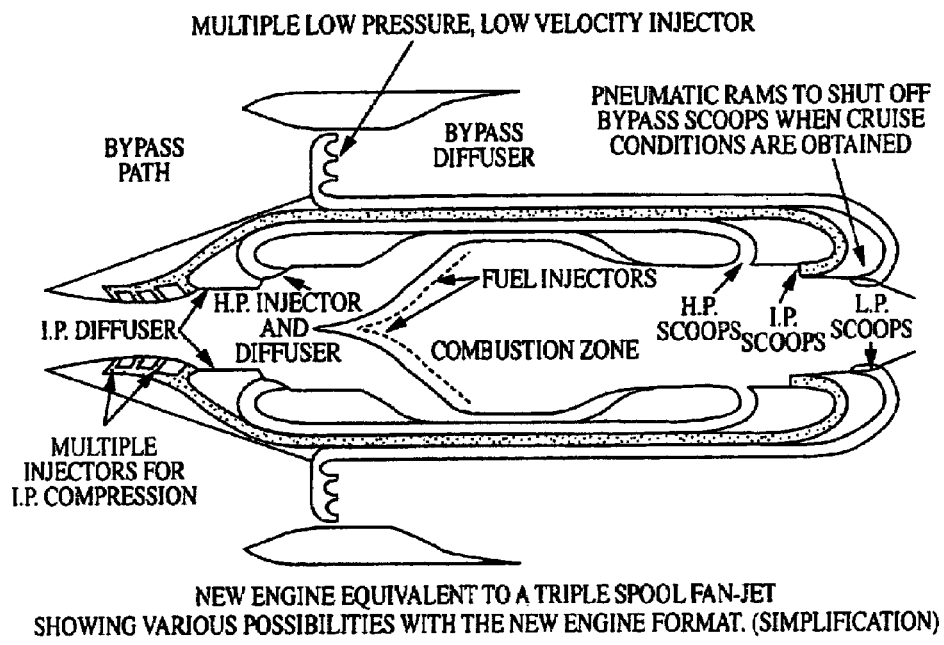
FIGS. 7(a) and (b) are New Engine Equivalent to a Triple Spool Fan Jet, Arrangement and Mass-Flows.
Figure 7B:
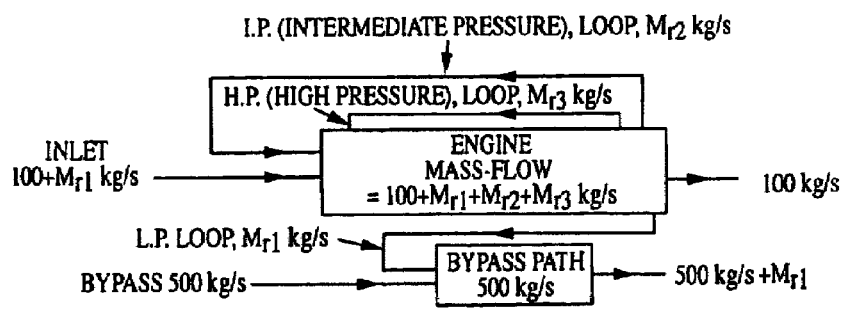

In this section, the new claimed engine equivalent to the Fan-jet is described. The block diagram is shown in FIG. 7(a) and the corresponding mass-flows in FIG. 7(b). The effects of flying at 10,000, and Mach 0.8 are also discussed. The engine core produces thrust with an exit mass-flow of 50 kg/s, as in all the previous examples. Notice that the "recirculating" mass-flow which is used to Pressurize and accelerate the Bypass mass-flow, is discarded to the atmosphere. The total bypass mass-flow is 250 kg/s (i.e. a bypass ratio of 5 to 1), which includes the contribution from the bypass Injectors. It was pointed out in Section 6 that the specific fuel combustion of this engine was high, because the propulsive efficiency was low, when flying at subsonic cruise conditions, due to a high outlet pressure ratio giving a high value for $V_e$ Bypass engines are important because they have the means of reducing $V_e$, by deriving power from the turbine driving the Fan and increasing the total mass-flow, $\dot{m} + \dot{m}_B$ thereby increasing the propulsive efficiency. In the new engine the bypass (Low Pressure) Injectors are to perform this function, so that the bypass air is pressurized by the following diffuser to a pressure-ratio of 1.6, a value commonly used in Fan-Jets. The Injectors will require multiple nozzles so that an efficient energy exchange occurs between the injected air and the bypass mass-flow.

A further innovation with this engine is that two stages of Injection for the core mass-flow is used. There are therefore two stages of diffussion. This method would have the practical advantage of reducing losses due to the production of shock waves, since the velocity and pressure ratios between the overall mass-flow, and the Injected mass-flow would be-reduced in each stage.

The basic parameters for the engine are as follows:

| | |
|---|---|
| Bypass mass-flow | $\dot{m}_B = 250$ kg/s |
| Bypass Injector mass-flow | $= \dot{m}_{r1}$ kg/s |
| Core outlet mass-flow | $\dot{m} = 50$ kg/s |
| Intermediate Pressure Injector mass-flow | $= \dot{m}_{r2}$ kg/s |
| High Pressure Injector mass-flow | $= \dot{m}_{r3}$ kg/s |
| | $\dot{m}:\dot{m}_B = 1:5$ |
| Bypass ratio, | $= 288°$ K |
| Input Temperature, core and Bypass | |
| Combustion Temperature, core | $T_{oe} = 1200°$ K |
| Compression ratio (core) | $= 12:1$ (giving 12 bar) |
| Compression ratio (Bypass) | $= 1.6:1$ (giving 1.6 bar) |
| Specific heat for core gas | $C_{pe} = 1159$ kJ/kgK |
| Specific heat for Bypass gas | $C_{pe} = 1020$ kJ/kgK |
| Atmospheric pressure | $P_a = 1.0125$ bar |

For the Bypass path we need to calculate the combined Injected and input gas velocity to produce a ram pressure rise of 1.6 bar. The ratio of the specific heats, $$\frac{\delta}{\delta - 1},$$

for the cold air is given by:

And $$\delta = 1.392$$

$$\frac{\delta}{\delta-1} = 3.550$$

$$\frac{P_{oe}}{P_a} = \frac{1.6}{1.0125} = 1:58$$

And the Ram Pressure rise is given by:

$$1.58 = (1+0.1958\, M^2)^{3.55}$$

Where M is the combined gas velocity Mach number. From which M=0.85 (275 m/s)

Now the recirculated mass-flow, $\dot{m}_{r1}$, derived by Scoops placed at the core engine nozzle exit has a velocity $V_{r1=Ve}$=Mach 3.375 (c.f. E.6.)

And assuming the inlet air is initially at rest, then:

$$\dot{m}_{r1} = \frac{(250 - m_{r1} \times 0.85^2)}{3.375^2 - 0.85^2}$$

$$\dot{m}_{r1} = 15.9 \text{ kg/s}$$

Thus 15.9 kg/s of gas at a total temperature of 1200° K is mixed with and cooled by 234.1 kg/s of gas at 288° K. The combined temperature $T_{oc}$, calculated as before is given by:

$$15.9\,(1200 - T_{oc}) = 234.1\,(T_{oc} - 288)$$

So $$T_{oc} = 346° \text{ K } (73° \text{ C.})$$

Since no fuel-derived heat is added to the bypass path.

$$T_{oc} = T_{oc}$$

$$\frac{T_{oe}}{T_e} = \frac{P_{oe}}{P_e}^{\frac{\gamma-1}{\gamma}}$$

$$= (1.58)^{\frac{1}{3.550}}$$

$$= 1.1375$$

Now: $T_e = \frac{346}{1.1375} = 304° K$ (31° C.)

By Bypass gas velocity $V_e$ is given by:

$$V_e = \sqrt{2 \times Cp \times (T_{oe} - T_e)}$$

$$= (2 \times 1020 \times (346 - 304))^{\frac{1}{2}}$$

$$= 317 \text{ m/s (Mach 0.98)}$$

And the Thrust from the Bypass path is given by:

$$Fe = \dot{m}_B V_e$$

$$= 250 \times 317$$

-continued $$= 79,250 \text{ N} \quad \text{or} \quad 17,815 \text{ lbs. st.}$$

The Bypass Output Power = K.E. of output gas/s.

$$= \frac{1}{2} \times (\dot{m}_B + \dot{m}_{r1}) \times 317^2$$

$$= \frac{1}{2} \times 250 \times 100,489$$

$$= 12.56 \text{ Megawatts}$$

This calculation can be handled a different way, giving the same result:

$$\text{Output Power} = (\dot{m}_B + \dot{m}_{r1})\ Cp(Toe - Te)$$

$$= 250 \times 1020 \times 49$$

$$= 12.50 \text{ Megawatts}$$

The mass-flow entering the engine core is $\dot{m}+\dot{m}_{r1}=65.9$ kg/s and is subject to two stages of compression, with pressure ratios of 3, then 4, giving a total combustion entry pressure of 3×4 or 12 bar.

The calculations are handled in the same way, but as a two stage Injection Compressor.

It is assumed that the inlet area is such that the input velocity is Mach 0.4 ($A_a$=0.439 m²)

First Stage $\dot{m}$=65.9 kg/s

V=129 m/s $V_r$=1090 m/s $V_1$=Mach 1.35=436 m/s $\dot{m}$=I.P. Injector mass-flow kg/s $$\frac{1}{2}(\dot{m} + \dot{m}_{r1})129^2 + \frac{1}{2}\dot{m}_{r2}1090^2 = \frac{1}{2}(\dot{m} + \dot{m}_{r1})436^2 + \frac{1}{2}\dot{m}_{r2}436^2$$

Multiplying by 2 gives:

$$1,097,000 + \dot{m}_{r2} \times 1,188,000 = 12,527,000 + \dot{m}_{r2} 190,096$$

$$\therefore \dot{m}_{r2} = 11.45 \text{ kg/s}$$

So recirculating mass is 11.45 kg/s to produce a 3 times Ram Pressure ratio.

Entering Diffuser 1 is:

$$\dot{m}+\dot{m}_{r1}+\dot{m}_{r2}=77.35 \text{ kg/s}$$

The Ram Temp. ratio at 90% $E_{r1}$=1.441
Mixed Temperature $T_{c1}$ given by:

$$11.45(687-T_1)=65.9(T_{c1}-288)$$

$$7866 - 11.45 T_{c1} = 65.9\, tc1 - 18979$$

$26,845 = 77.35_{c1}$ $347°\,K = T_{c1}$

Ram Temperature rise:

$347 \times 1.441 = 500°\,K$

For the second stage of Injection:

$T_e$ for H.P. Injector $= 840°\,K$ $V_e = 914\,m/s = V_{r2}$

Combined gas Velocity=Mach 1.55=500 m/s, to give pressure ratio of 4 (totaling 12 atmospheres), the injected mass-flow $\dot{m}_{r3} = 30.84$ kg/s. Combined Temperature=597° K Ram Temperature ratio=1.546

Combustion entry Temperature=923° K

Mass-flow for combustion $= \dot{m} + \dot{m}_{r1} + \dot{m}_{r2} + \dot{m}_{r3} = 108.19$ kg/s (238 lbs/s)

The fuel to air ratio is given by:

$f/a = 0.00735$

And fuel flow $= 108.19 \times 0.00735$
$= 0.7952$ kg/s

The core thrust, $F_e = 0.98\,\dot{m}V_e$
$= 0.98 \times 50 \times 1090$
$= 53,410$ N (12,006 lbs. st.)

Total Thrust $= 12,006 + 17,832$
$= 29,838$ lbs. st.

With the same overall and mass-flow ratio (1:5), a conventional Fan Jet gives 22,310 lbs. st. with fuel flow of 1.223 kg/s. i.e. this engine uses 35% less fuel and provides 34% more thrust. The total recirculating mass-flow is:

$\dot{m}_{r2} + \dot{m}_{r3} = 42.29$ kg/s and the Bypass gas accelerating mass-flow:

$\dot{m}_{r1} = 15.9$ kg/s

At cruise conditions of 33,000 ft. altitude and Mach 0.8 velocity assuming the mass-flows reduce in the ratio of air density and increase by the Ram Pressure ratio, the mass-flow ratio is:

$= \dfrac{0.4196}{1.226} \times 1.524$
$= 0.522$ $\therefore$ Core mass-flow $= 50 \times 0.522$
$= 26.1$ kg/s Bypass $= 250 \times 0.522$
$= 130.5$ kg/s At cruise conditions:

Core thrust $F_{eC} = 0.98 \times 26.1\;(V_e - V_a)$
$= 25.58\,(1090 - 258)$
$= 21,283$ N (4,784 lbs.)

Bypass thrust $F_{eB} = 130.5\,(317 - 258)$
$= 7699\,N$ (1,731 lbs)

Total Thrust $= 4,784 + 1,731$
$= 6,515$ lbs.

Ratio of thrust at altitude to that at sea-level:

$= \dfrac{6515}{29,838}$
$= 21.8\%$

If Bypass Scoops are switched off, then $\dot{m}_{r1}$ now exits engine core.

Core Exiting mass-flow is increased by:

$\dot{m}_{r1} \times 0.522$
$= 8.30$ kg/s. and totals 34.4 kg/s.

So core thrust $F_{ec} = 0.98 \times 34.4\,(1090 - 258)$
$= 28,048\,N$ (6,305 lbs)

This is about a 3% reduction relative to the condition where the bypass path remains operative. By similar calculations, however, it can be shown that at the same altitude, but flying at a velocity of Mach 0.95, switching the Bypass Scoops off, gives a net increase in thrust of 19%. The bypass path thrust falls to only about 294 lbs. in this condition.

With a Fan-jet it is not possible to switch off the Fan.

A 19% increase in thrust at Mach 0.95 is a very significant gain. If more thrust is not required, the fuel supply could be decreased, thus reducing the total fuel consumption.

In summary, a new-claimed engine has been described in the Fan-jet configuration. Similar gains in performance are obtained, as does Engine E6 relative to a regular twin-spool jet. Since Fans have a low pressure ratio and large diameter, it is not possible to translate these gains to an engine operating at supersonic velocities. The new engine would not have this limitation, and, higher bypass Loop mass-flows would be able to give similar gains in thrust and efficiency at trans-sonic or super-sonic flight speeds. Once again, a gas, as the means of recirculating energy, gives fundamental improvements to performance, without having the limits causes by conventional energy-transfer techniques.

Throughout most examples of gas turbines are given using air as the working gas, and organic fuels of low calorific value, (LCV), 42,000 kJ/kg, as the heat source. This is done for simplicity and clarity and is not intended as a restriction to the ideas described herein. The concepts claimed apply equally well to engines using any working fluid, and any alternative source of heat. For example, working fluids could be liquids or gasses of any composition, heat sources could be any convenient source, like, steam, electricity, lasers, nuclear, rocket fuels, etc.

Gas turbines are ideally described using the Joule or Brayton cycle, in which compression and expansion are performed at constant entropy, and heat addition and rejection are at constant pressure. Cycle diagrams are commonly plotted on a graph of temperature against entropy, or pressure against volume. A further valuable way of assessing performance is to investigate pressure ratios or temperature ratios, before and after each stage of the engine, and thus calculating the overall pressure and temperature ratios from input to output. From these ratios the net work output of the engine may be easily calculated.

The efficiencies stated here are typical of aircraft engines, which operate in open cycles. i.e. the output heat is wasted and dissipated in the atmosphere. Ground installations often operate in closed or partially closed cycles, or use a heat exchanger to recover output heat before combustion. Their efficiency is therefore higher, and overall efficiencies can exceed 50%.

The Enthalpy, or total energy content of gas, it discussed. An additional term to the normal equation is described.

| Nomenclature. | |
|---|---|
| c | Local Sonic Velocity. (m/s). |
| Cv | Specific Heat (Constant Volume) J/kgK |
| Cp | Specific Heat (Constant Pressure) J/kgK |
| P,p | Pressure (N/m$^2$) |
| P | Power (watts, kilowatts, Megawatts). |
| R | Ram (ratio) |
| R | Gas constant (J/kgK). |
| T | Temperature (° K) |
| V | Velocity (m/s) |
| v | Volume (m$^3$) |
| I | Moment of Inertia |
| $\delta, \gamma$ | Ratio of Specific Heats |
| $\dot{m}$ | Overall mass-flow (Input to Output) kg/s (dm/dt) |
| F | Force (Thrust) N |
| M | Mach Number |
| $\eta$ | Effective (Thermodynamics) |
| $\eta 1$ | Efficiency Engine type 1 |
| $\eta 2$ | Enthalpy |
| $\gamma$ | Density |
| H | Enthalpy |
| S | Entropy |
| Subscripts. | |
| a | Atmospheric |
| B | Bypass gas |
| c | Combined gas parameters |
| r | Recirculating |
| r | Ram (ratio) |
| o | Stagnation (total) |
| p | Propulsive |
| p | Pressure |
| T | Temperature |
| e | Gas exit contitions |
| 1–7 | Station Numbers (Appendix 4) |
| 1 | Engine type 1 |
| 2 | Engine type 2 |
| f | Fuel |
| TJ | Turbo-jet (Gas turbine) |
| RJ | Ram-jet |
| Superscripts. | |
| $^1$(Prime). | Intermediate station, after indicated station number. |
| • | First derivative with respect to time (per second). |

APPENDIX 1

Cycle Diagrams of Engines

Simplified and idealized cycles are drawn, of the standard gas turbine, FIG. 20, and of the new engine, Figure B, whose operation was calculated in Section 6. The diagrams are plots of temperature against entropy, on which curves of constant pressure are drawn, representing the inlet (atmospheric) and combustion pressures. For clarity the entropy scale shown is nonlinear so that the curves of constant pressure are drawn as straight lines.

The recycled energy, effected by the turbine and compressor is shown in 20, and that of the recirculated mass-flow of 43.4 Kg/s in FIG. 22. The effects of the losses in the compression and expansion processes are illustrated. In FIG. 22, the loop recovered heat is given by the inlet gas temperature-rise, after it is mixed with the recirculating mass-flow.

The increased work output of the new engine, relative to the standard, can be seen from the diagrams, and the effect of the recycled component of the output energy by the turbine, which reduces the remaining energy left to produce the useful work output of the standard gas turbine. The fuel heat input and waste heats are also shown.

The recirculating gas does work on the input gas, and because it has a stagnation Temperature of 1200° K, it also thermally raises its temperature. The turbine only does work on the input gas, and does so without reference to the turbine's operating temperature. This is the reason for the Loop heat recovery of the new engine, and why it is thermodynamically more efficient than a conventional engine working at the same temperature ratios.

APPENDIX 4

Theoretical Analysis of the New Engines

A.4.1 Introduction

The new engine exhibits properties which are fundamentally different from any other gas heat engine of any type devised to date. The physical reasons for this difference will become clear as the analysis unfolds. The most startling result is that the new engine is not only thermodynamically more efficient than any other engine for a given adiabatic compression ratio, but that also the thermodynamic efficiency is a function of the ratio of the recirculating mass-flow to the overall mass-flow, $\dot{m}_r/\dot{m}$, for any given pressure ratio. The alternate (type 2) engine layout will also be analyzed, and it will be shown that for values of $\dot{m}_r/\dot{m}<5$, the alternate engine is significantly more efficient than the normal (type 1) new engine.

A.4.2. Definitions.

The nomenclature is given at the beginning of the appendices, and S.I. units are used throughout, with other units in parenthesis. The basic new engine, e.g. as described in Section 6, is the type 1 engine (suffix 1) and the alternate engine layout without a main combustion system (i.e. loop combustion system only), as the type 2 (suffix 2), engine.

The working fluid proceeds through the engine and the properties of the gas at various points are identified by station numbers (subscripts). The stations are identified as below:

Station 1. Inlet conditions. (Maybe modified by Ram effect).
Station 2. Compression outlet (After diffuser.) Gas Velocity≈O.

Station 3. Combustion outlet
Station 4. Nozzle outlet conditions.

These stations apply to both gas turbine and new engine descriptions.

Stagnation conditions are indicated by subscript O. In Gas turbines, turbine outlet (Intermediate between stations 3 and 4), will be denoted by subscript 3, with a prime mark. (E.g. stagnation temperature $T_{o3}^{1}$).

For simplicity and clarity the cycle diagrams will be shown on a T,S diagram, where the Entropy (S) will be plotted on an unspecified non-linear scale, and further, the lines of constant pressure will be shown as straight lines. The idealized cycle diagram relating to station number is shown in Figure. A.4.2. and assume compression and expansion are insentropic.

The line $T_{o2}$–$T_{o3}$, is of constant pressure and represents the operating pressure for the engine.

The line $T_{o31}$–$T_{o1}$ is drawn parallel to line $T_{o2}$–$T_{o3}$ and gives the work demanded by the compressor, which is equal to the work extracted by the turbine after station 3. The useful output work from the engine is given by $(T_{o3}^{1}-T_{o4})$ and the Waste heat by $(T_{o4-To1})$.

In the new engine it is clearer if two cycles are drawn, one for the overall mass-flow m, (Figure A.4.3.), and one for the recirculating mass-flow $\dot{m}_r$, (Figure A.4.4.). They can be easily combined on one cycle diagram. Both diagrams apply to the new engines of type 1.

Two new stations, (5 and 6), are required to describe these cycles. Station 6 is where the working fluids enter the combustion process, and the velocity≈zero. $T_{o6} > T_{o2}$ because the recirculating mass not only supplies compressive power, through the interchange of its momentum to the combined gasses, but also preheats the input overall mass-flow. Station 5 is a "virtual station", and is defined as the station which the combined working fluids would have if they were allowed to expand isentropically from station 6. The significance of this station will be made clear in Engine type 2 diagram. Note that in the new engine station 2 is also a "virtual station", in that in its passage through the engine no fluid parameter can be identified with station 2. It is defined as the station which the overall mass-flow, $\dot{m}$, would be at, if it was isentropically compressed from station 1. (i.e. as if it were acting as an ideal gas turbine).

Note that we will assume in the analysis that the recirculating mass-flow operates in a closed reversible cycle (an ideal case), so that with each cycle performed by the gas, the fuel heat input equals the compressive work+preheating output. It will also be shown that $T_{o6}$ tends to $T_{o2}$ as $\dot{m}_r/\dot{m}$ increases and in the limit $T_{o6}=T_{o2}$ when $\dot{m}_r/\dot{m}=\infty$.

For Engine type 2, the diagram for the overall mass-flow m, is given in Figure A.4.5.

Note that there is NO direct fuel heat Input to the overall mass-flow in this cycle, both the heat and compressive work are supplied only, by the recirculating mass-flow. The diagram for the recirculating mass-flow, $\dot{m}_r$, is the same as is given in diagram A.4.4. Observe that the ratio of the network output to the waste heat is higher in this cycle, and this is the reason for its increased theoretical efficiency over a Type 1 engine. (Assuming that the recirculating mass-flow operates in an ideal reversible cycle).

For reasons of clarity the new engine cycles are shown on separate diagrams, but clearly they could be shown on one diagram, as illustrated in Figure A.4.6. for a Type 1 engine, mass-flows are also indicated.

Although the overall mass-flow m can be considered to operate in cycle, 1, 2, 3, 4, 1, in practice, in air breathing engines, new working fluid continuously enters station 1, from an infinite reservoir (the atmosphere) and discharges at station 4, to an infinite reservoir, (the atmosphere).

Clearly in a closed cycle engine, heat is given out by the overall mass-flow, $\dot{m}$, to an infinite heat reservoir between stations 4 and 1, and this is the waste heat which prevents all thermodynamic cycles from achieving an efficiency of 100%.

A.4.3. Thermodynamic Efficiency of Gas Turbines

In this Section the normal definition of the maximum theoretical thermodynamic efficiency of gas turbines $\eta TJ$ operating in the Brayton cycle will be calculated as a basis for the definition of the efficiencies of the new engines. The standard textbook method will be worked. This definition is calculated only as an example, and is not intended as a claim or for any purpose other than for clarity. Its importance relative to the new engine will become clear in the next Section.

Now the maximum theoretical efficiency is defined as:

$$\eta TJ = \frac{\text{Net Work Output}}{\text{Fuel Heat Input}}$$
$$= \frac{\text{Net Power Output}}{\text{Fuel Power Input}}$$
$$= \frac{\text{Total Output Power} - \text{Compressor Power}}{\text{Fuel Power Input}}$$
$$= \frac{\dot{m}_{34} c_{P34}(T_{o3} - T_{o4}) - \dot{m}_{12} c_{P12}(T_{o2} - T_{o1})}{\dot{m}_{23} c_{P23}(T_{o3} - T_{o2})}$$

Where Cp is the specific heat of the working fluid at constant pressure between the indicated station numbers, and subscript 0 is the stagnation (or total) temperatures at the indicated station number.

If $\dot{m}$ and Cp are taken as constant and the compression and expansion are performed at constant entropy, then for this simple ideal case, $$\eta TJ = \frac{T_{o3} - T_{o4} + T_{o1} - T_{o2}}{T_{o3} - T_{o2}} \qquad \text{A.4.3.1.}$$

An alternate way to define efficiency is as follows:—

$$\eta TJ = \frac{\text{Net Work Output}}{\text{Net Work Output} + \text{Waste Heat}} \qquad \text{A.4.3.2.}$$
$$= \frac{\text{Net Output Power}}{\text{Net Output Power} + \text{Waste Heat Power}}$$
$$= \frac{\text{Total Output Power} - \text{Compressor Power}}{\text{Net Output Power} + \text{Waste Heat Power}}$$
$$= \frac{T_{o3} - T_{o4} - (T_{o2} - T_{o1})}{T_{o3} - T_{o4} - (T_{o2} - T_{o1}) + T_{o4} - T_{o1}}$$
$$= \frac{T_{o3} - T_{o4} - (T_{o2} - T_{o1})}{T_{o3} - T_{o2}}$$

Equation A.4.3.2. is identical to Equation A.4.3.1. which validates the points of view from which they were derived and assists in the physical understanding of why the second law of thermodynamics requires that all heat engines are less than 100% efficient. i.e. with all engines there must be waste heat. The understanding of the physical significance of this fact becomes very important when the new engine is discussed in the next Section: To continue the analysis:—

Rearranging Equation A.4.3.1., we have:—

$$\eta TJ = \frac{(T_{o3} - T_{o2}) - (T_{o4} - T_{o1})}{T_{o3} - T_{o2}}$$

$$= 1 - \left(\frac{T_{o4} - T_{o1}}{T_{o3} - T_{o2}}\right)$$

Dividing the terms in parenthesis by $$\frac{T_{o1}}{T_{o2}},$$

$$\eta TJ = 1 - \left(\frac{\frac{T_{o4}}{T_{o1}} - 1}{\frac{T_{o3}}{T_{o2}} - 1}\right) \times \left(\frac{T_{o1}}{T_{o2}}\right) \qquad \text{A.4.3.3.}$$

Between lines of constant pressure the following temperature ratios apply, $$\frac{T_{o2}}{T_{o1}} = \frac{T_{o3}}{T_{o4}}$$

$$\therefore \frac{T_{o4}}{T_{o1}} = \frac{T_{o3}}{T_{o2}}$$

Substituting for $$\frac{T_{o3}}{T_{o2}}$$

in A.4.3.3.

$$\eta TJ = \left(\frac{\frac{T_{o4}}{T_{o1}} - 1}{\frac{T_{o4}}{T_{o1}} - 1}\right) \times \frac{T_{o1}}{T_{o2}}$$

$$\boxed{\therefore \eta TJ = 1 - \left(\frac{T_{o1}}{T_{o2}}\right)} \qquad \text{A.4.3.4.}$$

Now for adiabatic (isentropic) compression $$\frac{T_{o1}}{T_{o2}} = \left(\frac{P_{o1}}{P_{o2}}\right)^{\frac{\delta-1}{\delta}}$$

$$\boxed{\therefore \eta TJ = 1 - \left(\frac{P_{o1}}{P_{o2}}\right)^{\frac{\delta-1}{\delta}}} \qquad \text{A.4.3.5.}$$

Since $P_{o1}$ is the inlet (atmospheric) pressure, it can be seen that the maximum theoretical efficiency for the gas turbine increases as the input pressure ratio increases, i.e. as $P_{o2}$ increases in this ideal case. The limit is provided by the temperature $T_{o2}$ at the output of the compressor, since the combustion temperature $T_{o3}$ must be sufficiently above $T_{o2}$ to allow a significant addition of fuel power, and $T_{o3}$ is limited by the turbine materials technology.

Now it can be shown that for the maximum power, $P_{max}$ output as a function of Pressure and Corresponding temperature ratios is when:

$$\left(\frac{T_{o2}}{T_{o1}}\right)^2 = \frac{T_{o3}}{T_{o1}} \qquad \text{A.4.3.6.}$$

or when $$\frac{P_{o2}}{P_{o1}} = \left(\frac{T_{o3}}{T_{o1}}\right)^{\frac{\delta}{2(\delta-1)}} \qquad \text{A.4.3.6.}$$

These are standard results used in the texts on the Brayton cycle. In practice values for $T_{o3}$ are usually less than the maximum power value, because of the materials problem, but this theoretical result is used later when comparing the pressure and temperature ratios which are required for new engines of equivalent power output to gas turbines. (Section A.4.8.)

Table A.4.1. gives values of $$\left(\frac{P_{o1}}{P_{o2}}\right)^{\frac{\delta-1}{\delta}}$$

for a range of pressure ratios, $$\left(\frac{P_{o2}}{P_{o1}}\right)$$

from 1.01 to 10,000. $T_{o2}$ is also calculated, assuming normal inlet atmospheric conditions of $T_{o1}$=288° K (15° C.). The ratio of specific heats, δ, for air at S.T.P. is taken as 1.391543 giving $$\left(\frac{\delta}{\delta-1}\right)$$

equal to 3.5540. Figure A.4.6.1. shows a graph of efficiency for gas turbines against pressure ratio. It can be seen that the maximum possible theoretical efficiency assuming an ideal lossless engine, operating at 30 bar is about 61.6%.

A.4.4. Thermodynamic Efficiency of New claimed Engines

In this Section, the maximum theoretical efficiency of the new engines will be derived. Considering first the engine type 1, (cycle diagrams A.4.3. and A.4.4.), with a common combustion system heating the Loop and overall massflows. Using the same approach as with gas turbines we have:

$$\eta l = \frac{\text{Net Work Output}}{\text{Fuel Heat Input}}$$

$$= \frac{\text{Net Power Output}}{\text{Fuel Power Input}}$$

$$= \frac{\text{Total Power Output} - \text{Recirculating Power Output}}{\text{Fuel Power Input}}$$

$$= \frac{(\dot{m}_{34} + \dot{m}_r)Cp_{34}(T_{o3} - T_{o4}) - \dot{m}Cp_{34}(T_{o3} - T_{o4})}{(\dot{m}_{34} + \dot{m}r)Cp_{36}(T_{o3} - T_{o6})}$$

Now (as before) in the simple ideal case it is assumed that the specific heats and the overall mass-flow, $\dot{m}$, are constants, then, $$\eta_1 = \frac{\dot{m}(T_{o3} - T_{o4})}{(\dot{m} + \dot{m}_r)Cp_{36}(T_{o3} - T_{o6})} \quad \text{A.4.4.1.}$$

Now the fuel power input to the recirculating mass-flow is given by:

$$\text{Loop Fuel Power} = \dot{m}_r Cp_{36}(T_{o3} - T_{o6}) \quad \text{(A.4.4.2.)}$$

and since the recirculating mass-flow operates in a closed Loop, the mean Power input per cycle equals the mean power output, or $$\oint_T^q \langle \dot{m}_r Cp_r \Delta T \rangle = 0 \quad \text{A.4.4.3.}$$

Physically this must be true as otherwise for a constant value of $\dot{m}_r$ the Loop gas temperature would be continuously increasing if equation A.4.4.3. is greater than zero, or decreasing if less than zero. Clearly the mean Loop gas temperature would remain constant in steady-state conditions. This condition is similar to the condition describing the Loop energy flow in gas turbines. The power derived by the turbine from the working fluid, is reintroduced to the working fluid by the compressor. If the turbine derived too much power, the angular velocity would increase until centrifugal forces destroyed the rotors, if it derived too little power the engine would continuously run-down and eventually stop.

From the conditions set by equation A.4.4.3. we know that the power transferred to the overall mass-flow, must equal the power derived from the fuel supply to the Loop, in each complete cycle.

Now the power supplied to the overall mass-flow, $\dot{m}$, by the Loop, in compressing and heating it is given by:

$$\text{Overall mass-flow Power from Loop} = \dot{m}_{16}Cp_{16}(T_{o6} - T_{o1}) \quad \text{A.4.4.4.}$$

Since $\dot{m}$ only receives power from the Loop in reaching station 6.

Now Equation A.4.4.4. equals Equation A.4.4.2. (condition A.4.4.3.)

Therefore $\dot{m}_{16}Cp_{16}(T_{o6}-T_{o1}) = \dot{m}_r Cp_{36}(T_{o3}-T_{o6})$ Assuming the specific heats are constant, then for this simple ideal case $$\dot{m}(T_{o6}-T_{o1}) = \dot{m}_r(T_{o3}-T_{o6}) \quad \text{A.4.4.5.}$$

Substituting for $\dot{m}(T_{o3}-T_{o6})$ in equation A.4.4.1. we have:

$$\eta_1 = \frac{\dot{m}(T_{o3} - T_{o4})}{\dot{m}(T_{o3} - T_{o6}) + \dot{m}(T_{o6} - T_{o1})}$$

$$= \frac{\dot{m}(T_{o3} - T_{o4})}{\dot{m}(T_{o3} - T_{o6} + T_{o6} - T_{o1})}$$

$$\boxed{\therefore \eta_1 = \frac{(T_{o3} - T_{o4})}{(T_{o3} - T_{o1})}} \quad \text{**A.4.4.6.}$$

Before continuing the analysis, as in the Last Section, we can derive the same result by considering the output power and waste heat.

$$\eta_1 = \frac{\text{Net Output Power}}{\text{Net Output Power} + \text{Net Waste Heat Power}}$$

$$= \frac{\dot{m}_{34}Cp_{34}(T_{o3} - T_{o4})}{\dot{m}_{34}Cp_{34}(T_{o3} - T_{o4}) + \dot{m}_{41}Cp_{41}(T_{o4} - T_{o1})}$$

Assuming Cp and $\dot{m}$ are constant at all stations:

$$\eta_1 = \frac{(T_{o3} - T_{o4})}{T_{o3} - T_{o4} + T_{o4} - T_{o1}}$$

$$\therefore \eta_1 = \frac{(T_{o3} - T_{o4})}{(T_{o3} - T_{o1})} \quad \text{**A.4.4.7.}$$

Equation A.4.4.7. is identical to A.4.4.6.
Continuing the analysis,
Dividing all the terms in Equation A.4.4.6. by $T_{o3}$ $$1 = \frac{1 - \dfrac{T_{o4}}{T_{o3}}}{1 - \dfrac{T_{o1}}{T_{o3}}} \quad \text{**A.4.4.8.}$$

But between lines of constant Pressure we have $$\frac{T_{o4}}{T_{o3}} = \frac{T_{o1}}{T_{o2}}$$

Substituting for $$\frac{T_{o4}}{T_{o3}}$$

in A.4.4.8.
We have $$\boxed{\eta_1 = \frac{1 - \dfrac{T_{o1}}{T_{o2}}}{1 - \dfrac{T_{o1}}{T_{o3}}}} \quad \text{**A.4.4.9.}$$

Since the efficiency of the gas turbine equals the numerator in A.4.4.9. We have $$\boxed{\eta_1 = \frac{\eta TJ}{1 - \frac{T_{o1}}{T_{o3}}}} \quad **\text{A.4.4.10.}$$

Equations A.4.4.9. and 10. are extremely important results. Since $T_{o3}$ is always greater than $T_{o2}$ or $T_{o1}$, i.e.

$$T_{o3} > T_{o2} > T_{o1}$$

The ratio $$\frac{T_{o1}}{T_{o3}} < 1$$

$\therefore$ the denominator term $1 - \frac{T_{o1}}{T_{o3}}$ is always less than 1.

$$\therefore \boxed{\eta_1 > \eta_{TJ}} \quad **\text{A.4.4.11.}$$

The new engine is always more efficient than the equivalent pressure ratio gas turbine for any value of $T_{o3}$, the combustion temperature.

Furthermore as $T_{o3}$ is reduced, the new engine efficiency is increased, for a given pressure ratio.

Gas turbine efficiency is independent of $T_{o3}$, and is only dependent on $T_{o1}/T_{o2}$, i.e. the given pressure ratio, $$\frac{P_{o1}}{P_{o2}}^{\frac{\gamma-1}{\gamma}}.$$

Notice that for a given pressure ratio and combustion temperature the efficiency is independent of the value of $\dot{m}_r/\dot{m}$. We will shortly show how $T_{o3}$ can be regulated by the chosen ratio $\dot{m}_r/\dot{m}$ and that this value therefore affects the efficiency.

Let us work one example as illustration.

Suppose we have a gas turbine whose pressure ratio, $$\frac{P_{o2}}{P_{o1}} \text{ is 12.}$$

$T_{o1}=288°$ K and say $T_{o3}=4 \times T_{o1}=1152°$ K, the value for optimum gas turbine power output at this pressure ratio.

Then from Table A.4.1. for an ideal engine, $$\frac{P_{o2}}{P_{o1}}^{\frac{\gamma-1}{\gamma}} = \frac{T_{o1}}{T_{o2}} = 0.496989$$

$$\eta_{TJ} = 1 - 0.496989$$

$$= 0.503011$$

$\therefore$ Maximum Gas Turbine Efficiency = 50.3011%

For the new engine operating at identical pressures and temperatures.

$$\eta_1 = \frac{0.503011}{1 - \frac{288}{1152}}$$

$$= \frac{0.503011}{1 - 0.25} = \frac{0.503011}{0.75}$$

$$= 0.670681$$

$\therefore$ Maximum New Engine Efficiency = 67.0681%

This improvement is substantial, and equals $\frac{67.0681}{50.3011} - 1$ or 33%.

Two more important things to notice;—
(A) By definition, $T_{o3}$ is greater than $T_{o6}$, which is greater than $T_{o2}$.
i.e. $T_{o3} > T_{o6} > T_{o2}$.

Now as $T_{o3}$ tends to $T_{o6}$, $T_{o6}$ tends to $T_{o2}$. From equation A.4.4.9, Therefore as $T_{o3}$ tends to $T_{o2}$ $\eta_1$ tends to 100%.

This is another very important conclusion.

The new engine can be made as near to 100% efficient as is desired, by allowing $$T_{o3} \rightleftarrows T_{o2}, \text{ For any given value of pressure ratio: } \frac{P_{o1}}{P_{o2}}^{\frac{\gamma-1}{\gamma}}$$

We will shortly discuss how this is arranged in practice.
(B) The equation A.4.4.10. is obtained without recourse to any description of the interchange of momentum between overall and re-circulated mass-flows, or the Ram pressure ratio of the mixed gases, or the efficiency of these processes. The result obtained is independent of these factors, since however inefficient they are the total energy-flow in the Loop will be the same, and the overall engine efficiency is therefore invariant to these factors for given values of $$\frac{P_{o2}}{P_{o1}}^{\frac{\gamma-1}{\gamma}}$$

and $T_{o3}$. In practice the operating, or chosen value of $T_{o3}$ is dependent on the efficiency of these processes as will become clear when we consider how $T_{o3}$ depends on $\dot{m}_r/\dot{m}$.

By following similar methods to the previous calculations we will now calculate the maximum ideal efficiency of the type 2 engine. I.e. the engine with combustion occurring only in Loop. (Cycle.diagram A.4.5.)

$$\eta_2 = \frac{\text{Net Output Power}}{\text{Net Output Power} + \text{Net Waste Heat Power}} \quad **\text{A.4.4.12}$$

$$= \frac{\text{Net Output Power}}{\text{Fuel Power Input}}$$

$$= \frac{m_{65} Cp_{36}(T_{o6} - T_{o5})}{m_r Cp_{36}(T_{o3} - T_{o6})}.$$

From A.4.4.5. we know that $$\dot{m}_r Cp_{36}(T_{o3}-T_{o6}) = \dot{m}_{16} Cp_{16}(T_{o6}-T_{o1}) \quad \text{A.4.4.13.}$$

Assuming the simple ideal case of the mass-flows and specific heats constant, and substituting from A.4.4.13. in A.4.4.12. we have $$\eta_2 = \frac{\dot{m}Cp(T_{o6}-T_{o5})}{\dot{m}Cp(T_{o6}-T_{o1})}$$

$$\text{or } \eta_2 = \frac{(T_{o6}-T_{o5})}{(T_{o6}-T_{o1})}$$

Dividing every term by $T_{o6}$ $$\eta_2 = \frac{1-\frac{T_{o5}}{T_{o6}}}{1-\frac{T_{o1}}{T_{o6}}} \quad \text{**A.4.4.14.}$$

Now between lines of constant Pressure, $$\frac{T_{o1}}{T_{o2}} = \frac{T_{o4}}{T_{o3}} = \frac{T_{o5}}{T_{o6}}$$

Substituting $$\frac{T_{o1}}{T_{o2}} \text{ for } \frac{T_{o5}}{T_{o6}}$$

in A.4.4.14

$$\boxed{\eta_2 = \frac{1-\frac{T_{o1}}{T_{o2}}}{1-\frac{T_{o1}}{T_{o6}}}} \quad \text{or} \quad \text{**A.4.4.15.}$$

$$\boxed{\eta_2 = \frac{\eta TJ}{1-\frac{T_{o1}}{T_{o6}}}} \quad \text{**A.4.4.16.}$$

Therefore the type 2 engine is always more efficient then the gas turbine, for any given value of pressure ratio, $$\left(\frac{P_{o1}}{P_{o2}}\right)^{\frac{\gamma-1}{\gamma}}.$$

Furthermore since by definition, $T_{o3} > T_{o6} > T_{o2}$ and therefore $$1-\frac{T_{o1}}{T_{o6}} < 1-\frac{T_{o1}}{T_{o3}} < 1$$

The type 2 engine is always more efficient than a type 1 engine, (for a given pressure ratio). Furthermore, as $T_{o6}$ tends to $T_{o2}$; $\eta_2$ tends to 100%.

Note that the efficiency of an ideal type 2 engine is independent of the Loop combustion temperature $T_{o3}$, for a given value of $T_{o6}$. We will shortly investigate how $T_{o6}$ depends on $\dot{m}_r/\dot{m}$ and on $T_{o3}$.

Let us now work an example using the parameters used earlier in this Section. Recalling that $$\frac{P_{o2}}{P_{o1}} = 12, T_{o1} = 288° \text{ K}.$$

$T_{o3} = 1152°$ K. Now $T_{o2} = 579.490°$ K (from Table A.4.1.). A reasonable value for $T_{o6}$ under the same conditions is $720°$ K(corresponding to a value of $\dot{m}_r/\dot{m}$ of about unity).

So we have:

$$\eta_2 = \frac{1-0.496989}{1-\frac{288}{720}}$$

$$\therefore \eta_2 = \frac{0.503011}{1-0.4}$$

$$= \frac{0.503011}{0.6}$$

$$\therefore \eta_2 = 0.838352$$

$\therefore$ Maximum Theoretical Efficiency $\eta_2 = 83.8352\%$

Summarizing the results for this particular illustrative example,

| Maximum ideal Efficiency | Gas Turbine | New Engine Type 1 |
|---|---|---|
| | 50.3011% | 67.0681% |

| New Engine Type 2 |
|---|
| 83.8352% |

All these engines are operating under an equivalent (identical), set of conditions.

These conditions are not unique for the given pressure ratio, as will be shown later (Section A.4.7.). It can be seen that as $T_{o3 \to To6 \to To2}$ then $$\eta_1 \to \eta_2 \to 100\%$$

So that the efficiency of the type 1 engine tends towards the efficiency of the type 2 engine as the combustion temperature, $T_{o3}$, is reduced, and both tend to an ideal efficiency of 100%.

A.4.5. Physical Discussion of Results.

Since no other open cycle gas heat engine, of any type, has an ideal efficiency dependent on parameters other than the operating pressure ratio, it is important that a complete understanding of the physical reasons for the fundamental difference exhibited by these new engines should be completely understood. The purpose of this Section is to explain, in physical terms, the reasons for this remarkable result.

The first important point is that, the second law of thermodynamics is not violated. The new engines type 1 or 2 can never exceed a theoretical efficiency of 100%, since neither $T_{o3}$ nor $T_{o6}$ can be less than $T_{o2}$, for the given pressure ratio, $$\left(\frac{P_{o1}}{P_{o2}}\right)^{\frac{\gamma-1}{\gamma}}.$$

Inspection of equations A.4.4.9. and A.4.4.15. show that the efficiency is always less than 100%, for values of $T_{o3}$ or $T_{o6}$ which by definition must exceed the value of $T_{o2}$. Reference to the cycle diagrams A.4.3. and A.4.5. will show that it is not possible for the working fluid to operate in a cycle if $T_{o3}$ or $T_{o6}$ is less than $T_{o2}$. (N.B. Negative pressure engines, i.e. with $P_{o1} > P_{o2}$, operating on this principle are feasible. However different efficiency equations apply, and analysis indicates that the second law of thermodynamics is not violated.)

The second point is that with gas turbines inspection of cycle diagram A.4.2. reveals that the ratio of net work output, to the waste heat, $$\frac{T_{o3}^1 - T_{o4}}{T_{o4} - T_{o1}},$$

is constant as $T_{o3}$ tends towards $T_{o2}$.

This is because of the disposition of the triangles $T_{o1}$, $T_{o3}^1$, $T_{o4}$ and $T_{o1}$, $T_{o41}$. In practice with the gas turbine a point is reached when $T_{o3} = T_{o2} + AT_{o2}$ which gives a fuel power input equal to the practical losses arising in the engine, and it ceases to produce any net output power. Below this value of $T_{o3}$ the engine will not even work.

With the new engines the ratio of the net work output to waste heat tends to an infinite value, as $T_{o3}$ is reduced. Inspection of cycle diagram A.4.3. shows that as $T_{o3} \rightarrow T_{o2}$ the waste heat $(T_{o4} - T_{o1})$ zero, but the output power tends to a value proportional to $(T_{o2} - T_{o1})$, a finite and a significant value. Practical new engines with losses, reduce this net power, but since it has a significant value, the engine will not cease to operate as readily as does a gas turbine.

Another way of considering the physical properties of the engines is to investigate the waste heat component of the Loop power. In the gas turbine the energy derived by the turbine, $\dot{m}Cp_l(T_{o3} - T_{o3}^1)$, results in a gas, after the useful work output of $\dot{m}Cp(T_{o3}^1 - T_{o4})$ whose temperature at the exit nozzle, $T_{o4}$, is always greater than $T_{o1}$. There is always waste heat power $\dot{m}Cp(T_{o4} - T_{o1})$ which is dumped to the atmosphere. With the new engines, the output Loop power $\dot{m}_r Cp_1(T_{o3} - T_{o1})$ is recirculated, but the component which could be considered as 'waste heat', $\dot{m}_r Cp_1(T_{o4} - T_{o1})$, is not lost, but is recycled and recovered by the engine, since this gas is not dumped to the atmosphere, but reintroduced at the engine input. The new engines therefore have TOTAL LOOP POWER HEAT RECOVERY. In gas turbines, the unusuable Loop power heat is DUMPED. Therefore gas turbines always produce more waste heat than the new engines (types 1 and 2) and are therefore Always less efficient, for ANY given operating conditions.

A.4.6. Thermodynamic Efficiency of the Ram Jet

In this section the efficiency of the ideal Ram Jet will be compared to that of the New Engine. The Ram Jet has no recirculating or Loop power. Compression of the input gases is effected by the change in momentum of the input air relative to the engine. The compressive power is therefore derived from the overall propulsive power output, thus the net propulsive power output is reduced. In this section, howeve4r, we are first going to consider the thermodynamic efficiency of the engine, relative to a set of coordinates traveling parallel to, and at the same velocity as, the Ram Jet. We will therefore exclude consideration of the net power output in this analysis.

We assume the ideal case in which the input gas is compressed isentropically. The Ram pressure ratio, $R_{pr}$ is given by:

$$R_{pr} = \left(1 + \frac{\gamma-1}{2}M^2\right)\frac{\gamma}{\gamma-1}$$

where M is the Mach number.

The cycle diagram is as follows on FIG. 25.

$T_{o1}^1$ is the temperature of the gas after isentropic Ram Compression, and is equivalent to $T_{o2}$ in the gas turbine cycle.

The Ram jet, by inspection of the diagram, clearly has a similar cycle to the type 1 engine, Fig. A.4.3., for the overall mass-flow, $\dot{m}$. Assuming the mass-flow and specific heats are constant it can be shown that:

$$\eta_{RJ} = \frac{T_{o3} - T_{o4}}{T_{o3} - T_{o1}} \qquad **A.4.6.1.$$

where $\eta RJ$ is the efficiency.

Equation A.4.6.1. is identical to Equation A.4.4.7.

$$\therefore \eta_{RJ} = \frac{1 - \frac{T_{o1}}{T_{o1}}1}{1 - \frac{T_{o1}}{T_{o3}}}$$

$$= \frac{\eta_{TJ}}{1 - \frac{T_{o1}}{T_{o3}}}$$

Where the gas turbine is operating at a Pressure ratio equivalent to $$\frac{T_{o1}}{T_{o1}}1$$

this result is essentially similar as for a type 1 engine, and shows that a Ram Jet is thermodynamically more efficient than a gas turbine operating at the same pressure-ratio. However, if we now consider a type 1 engine traveling at the same velocity as a Ram-Jet, we can clearly arrange that the Ram Pressure ratio in the inlet duct is the same as for the Ram Jet. The recirculating mass-flow, produces a further increase in pressure so that at a given velocity and Ram pressure ratio, the combustion pressure for a type 1 or 2 engine will be higher than that of the Ram-Jet under the same conditions.

The cycle diagram for the overall mass-flow is shown in Figure A.4.8.

$(T_{o1}^{-T}{}_{o1})$ represents the Ram-Temperature ratio caused by the input Ram pressure rise, and $(T_{o2} - T_{o1}^1)$ the additional temperature ratio caused by the compression from the recirculating mass-flow. We have chosen the same value for $T_{o3}$, the combustion temperature, in both cycles. The recirculating mass-flow cycle is given in Figure A.4.9.

It can be seen that the effect of the recirculating mass is to increase the operating pressure of the engine to value higher than in the case of a regular Ram Jet.

Now from Diagram A.4.8. we see that the efficiency of the new engine type 1, is given as follows:

$$\eta_1 = \frac{\text{Net Output Power}}{\text{Net Output Power} + \text{Waste Heat Power}} \quad **A.4.6.2.$$

$$= \frac{T_{o3} - T_{o4}}{T_{o4} - T_{o1}}$$

And as before:

$$\eta_1 = \frac{1 - \frac{T_{o1}}{T_{o2}}}{1 - \frac{T_{o1}}{T_{o3}}} \quad **A.4.6.3.$$

Now by definition, $T_{o2} > T_{o1}{}^1$ therefore the numerator term $$1 - \frac{T_{o1}}{T_{o2}} > 1 - \frac{T_{o1}}{T_{o3}1}$$

So for the same inlet temperature, $T_{o1}$ and combustion temperature, $T_{o3}$, The new engine, type 1, is always more efficient than a Ram Jet for a given inlet Ram Pressure ratio. By similar arguments, it can be seen that a type 2 engine is again more efficient than a type 1 engine, (because the waste heat component is reduced), and is therefore also more efficient than a Ram Jet, for given values of $T_{o1}$ and $T_{o3}$. This result was mentioned in the discussions towards the end of Section A.4.5. The physical explanation of the result is simply that increased efficiency is obtained with increased pressure ratio the standard result for all Brayton, Otto and Carnot heat engines.

So far in the discussions we have only considered the thermodynamic efficiency of the engines in relation to a set of coordinates traveling with the engine. We will now consider the net propulsive efficiency or net-work output of the engine relative to a stationary set of coordinates. (i.e. the coordinates are at rest relative to the atmosphere.)

Now from standard texts the propulsive efficiency $\eta p$ is given by:—

$$\eta_P = \frac{2}{1 + \frac{V_e}{V_a}} \quad **A.6.4.$$

where $V_e$ is the gas exit velocity relative to the engine, and $V_a$ is the velocity of the engine in the atmosphere. The gas exit velocity is given by:—

$$V_e = \sqrt{2.Cp34(T_{o3} - T_{o4})} \quad **A.6.5.$$

for an unchoked nozzle.

Now $$\frac{P_{o3}}{P_{o4}}^{\frac{\gamma-1}{\gamma}} = \frac{T_{o3}}{T_{o4}}$$

assuming insentropic expansion where $$\frac{P_{o3}}{P_{o4}} = \frac{P_{o2}}{P_{o1}}$$

the pressure ratio.

Since the pressure ratio is higher for the new engine operating under the same conditions as a Ram Jet, $$\left(\frac{T_{o3}}{T_{o4}}\right) \text{New Engine} \rangle \left(\frac{T_{o3}}{T_{o4}}\right) \text{Ram Jet}$$

$$\therefore (T_{o3} - T_{o4}) \text{ New Engine} \rangle (T_{o3} - T_{o4}) \text{ Rat Jet}$$

$$\therefore V_e \text{ New Engine} \rangle V_e \text{ Ram Jet.}$$

This result is obvious, since for the same combustion temperature, $T_{o3}$, a higher pressure ratio in the outlet nozzle would yield a higher exit velocity, $V_e$.

From Equation A.6.4. the denominator is:

$$\left(1 + \frac{V_e}{V_a}\right)$$

so for a higher value of $V_e$, the term has a larger value for a given value of $V_a$. ($V_e > V_a$).

The net thrust falls to zero when $V_e = V_a$, so the ideal of $\eta p = 100\%$ is meaningless.

For a given value of $T_{o3}$, the propulsive efficiency of the new engine is reduced relative to the Ram Jet. But in the new engine we can restore the value of $\eta p$ to that of the Ram Jet by reducing the value of $T_{o3}$, and hence $V_e$. We therefore come to an important conclusion:—

For a given propulsive efficiency at a given velocity, the combustion temperature of the new engine is lower than that of the Ram Jet. This is a very important result since the high temperature materials problem is reduced in the new engine.

Another important result is that since $V_e$ is higher in the new engine for a given value of $T_{o3}$, the new engine will give a useful output net thrust, $F_e = \dot{m}(V_e - V_a)$, at a higher engine velocity than would the equivalent Ram Jet. The implications of this result are discussed further in Appendix 5.

A.4.7. New Engine Mass-Flow Ratio and Thermodynamic Efficiency

In this Section we are going to investigate the parameters which determine the mass-flow ratio, $\dot{m}_r/\dot{m}$, for the new engines type 1 and 2.

The recirculating mass-flow, $\dot{m}_r$, has just one basic function to perform. It must compress the overall mass-flow, $\dot{m}$, and itself, to a pressure equal to the combustion entry pressure. (i.e. the operating pressure of the engine). This function is achieved, for example, by allowing the heated recirculated mass-flows to mix. In the mixing process the momentum of the recirculated mass-flow is exchanged such that both $\dot{m}$, and $\dot{m}_r$ have the same velocity. The stagnation pressure is recovered from the mixed gases by means of diffusers. Since the momentum flow of a gas is proportional to its mass-flow, and its velocity squared, we should arrange that the velocity component of $\dot{m}_r$, is as high as possible. For subsonic gas streams this is arranged by a convergent nozzle. For supersonic flow, by a convergent-divergent nozzle. But whatever design of Injector nozzle(s), Inlet duct(s) and diffuser(s) are used, we know from the law of conservation of energy that the total Energy or Enthalpy flow of the gases before and after the processes is constant. The same is shown to be true in standard fluid mechanics texts before and after shock waves or any other compressible or incompressible process.

In fluid mechanicals, the three equations which must be satisfied between the initial and final states of any process are those of continuity, momentum and energy. These complex equations are simplified by consideration of quasi one dimensional flow and the equations we will use are as follows:

Continuity Equation    $\dot{m} + \dot{m}_r = (\dot{m} + \dot{m}_r)$    **A.4.7.1.

Monumentum Equation    $\dot{m}V^2 + \dot{m}_r V$    **A.4.7.2.

Energy Equation    $\dot{H}_{om} + \dot{H}_{or} = \dot{H}_{o(m+r)}$    **A.4.7.3.

Although the momentum equation used here is further simplified, provided we impose the restriction given by Equation A.4.7.3. we will not encounter large errors when determining values for $\dot{m}_r/\dot{m}$.

Now the stagnation Enthalpy flow of the mass-flow entering the engine is given by:

$$\dot{H}_{om} = \dot{m}\left(C_p T + \frac{V^2}{2}\right)$$

We have from A.4.7.3.

$$\dot{m}\left(C_p T_{o1} + \frac{V^2}{2}\right) + \dot{m}_r\left(C_p T_{o4} + \frac{V_r^2}{2}\right) = (\dot{m} + \dot{m}_r)\left(C_p T_{o5} + \frac{V_1^2}{2}\right) \quad A.4.7.4$$

If the inlet air is initially at rest, V=0

$$\therefore \dot{m}\left(C_p T_{o1} + \frac{V^2}{2}\right) = \dot{m} C_p T_{o1}$$

And $\dot{m}_r\left(C_p T_{o4} + \frac{V_r^2}{2}\right) = \dot{m}_r C_p T_{o3}$

And $(\dot{m} + \dot{m}_r)\left(C_p T_{o5} + \frac{V_1^2}{2}\right) = (\dot{m} + \dot{m}_r) C_p T_{o6}$ Combining these results in Equation A.4.7.4.
We have:

$$\dot{m} C_p{}^T{}_{o1} + \dot{m}_r C_p T_{o3} = (\dot{m} + \dot{m}_r) C_p T_{o6}$$

Rearranging, $$\dot{m}_r C_p (T_{o3-To6}) = \dot{m} C_p (T_{o6} - T_{o1}) \quad A.4.7.5.$$

This is the result we derived in Section A.4.4. from consideration of the loop energy flow and is identical to Equation A.4.4.5. (assuming the specific heats are constant).

Now there are two variables which we can regulate so that the recirculating mass-flow has the required momentum when a certain given value of pressure-ratio is specified.

We can either:

(A) Increase the velocity component, $V_r$, and reduce the mass-flow ratio, $\dot{m}_r/\dot{m}$, or (B) Increase the mass-flow ratio, $\dot{m}_r/\dot{m}$, and reduce the velocity $V_r$.

The velocity component is increased by raising $T_{o3}$ the combustion temperature, since $$V_r^2 = 2 \times C_{p34} \times (T_{o3-T4})(=V_e^2) \quad A.4.7.6.$$

where for isentropic expansion: (inviscid flow: i.e. no work done in the duct):

$$\frac{T_{o3}}{T_4} = \frac{P_{o3}}{P_4}^{\frac{\gamma-1}{\gamma}} = \frac{P_{o2}}{P_1}^{\frac{\gamma-1}{\gamma}} \quad **A.4.7.7.$$

$$\therefore T_{o3} = T_4 \frac{P_{o2}}{P_1}^{\frac{\gamma-1}{\gamma}} \quad **A.4.7.8.$$

(assuming no Combustion pressure loss)

The minimum compressive power that must be supplied to the overall mass-flow, $\dot{m}$, is when:—

Minimum Compressive Power=$\dot{m} C_{p_{21}} (T_{o2} - T_{o1})$.

The corresponding velocity of the overall mass-flow derived from the momentum exchange from the recirculating mass-flow is given by:

$$V^2 = 2 C_p (T_{o2} - T_1) \quad A.4.7.9.$$

and the corresponding Ram-pressure ratio for compressible Fluids, (at subsonic or supersonic velocities) is given by:

$$\frac{P_{o2}}{P_1} = \left(1 + \frac{\gamma-1}{2} M^2\right)^{\frac{\gamma}{\gamma-1}} \quad **A.4.7.10.$$

where M=V/c or V=cM, c being the local sonic velocity of the combined gases. From the momentum equation, A.4.7.1. assuming the inlet gas is initially at rest, $$\dot{m}_r (2 C_{p34}(T_{o3} - T_4)) = (\dot{m} + \dot{m})(2 C_{p21}(T_{o2} - T_1)) \quad A.4.7.11.$$

Assuming the ideal case of the specific heats constant.

$$\therefore \frac{\dot{m}_r}{\dot{m} + \dot{m}_r} = \frac{T_{o2} - T_1}{T_{o3} - T_4} \quad **A.4.7.12.$$

But $$T_{o3} = T_4 \frac{P_{o2}}{P_1}^{\frac{\gamma-1}{\gamma}}$$

from A.4.7.8.

And similarly $$T_{o2} = T_1 \frac{P_{o2}}{P_1}^{\frac{\gamma-1}{\gamma}}$$

Substituting in A.4.7.12.

$$\frac{\dot{m}_r}{\dot{m}+\dot{m}_r} = \frac{T_1 \frac{P_{o2}}{P_1}^{\frac{\gamma-1}{\gamma}} - 1}{T_4 \frac{P_{o2}}{P_1}^{\frac{\gamma-1}{\gamma}} - 1} = \frac{T_1}{T_4} \qquad **A.4.7.13.$$

Between the lines of constant pressure, $$\frac{T_1}{T_4} = \frac{T_2}{T_3}$$

and if we account for the velocity components, and assume no energy is lost when the gas accelerated from stagnation conditions, then:—

$$\frac{T_{o1}}{T_{o4}} = \frac{T_{o2}}{T_{o3}} \qquad **A.4.7.14.$$

A result we have already used in previous Sections of this Appendix. Substituting in A.4.7.13. we find:—

$$\boxed{\frac{\dot{m}_r}{\dot{m}+\dot{m}_r} = \frac{T_{o2}}{T_{o3}}} \qquad **A.4.7.15.$$

This extremely important result describes the ideal minimum value for the recirculating mass-flow which we can use, at a given pressure ratio, in terms of the combustion temperature $T_{o3}$.

This result assumes:—
1. That the recirculating mass-flow operates in an ideal reversible cycle.
2. That we have Isentropic compression, and zero turbulence mixing, to recover the maximum value of the stagnation pressure of the mixed gas stream.
3. That we have no combustion=pressure loss.
4. That the design of the Injector Nozzle profile has been optimized, to isentropically Maximize the velocity of the recirculating mass-flow.

Remember Equation A.4.7.15. determines the minimum value for $\dot{m}_r$, but does not limit us to this value if practical nonisentropic losses prevent us from achieving the required pressure ratio: In this practical case, $\dot{m}_r$ will be increased from that obtained in A.4.7.15.

Remember also, that the final stagnation temperature of the mixed gases, $T_{o6}$, is given by the Energy Equation, A.4.7.3. and its derivative A.4.7.5. These equations apply, whether the processes occur ideally or not.

We must calculate how $\dot{m}_r/\dot{m}$ varies for given values of $\dot{m}_r/(\dot{m}+\dot{m}_r)$ and A.4.2. tabulates values. Graph A.4.10. gives a plot of the results.

Notice that for a given value of pressure ratio, (i.e. $T_{o2}$ is constant) if $\dot{m}_r/\dot{m}$ is increased, $T_{o3}$ is reduced, and in the limit when $\dot{m}_r/\dot{m} \to \infty$, $\dot{m}_r/(\dot{m}+\dot{m}_r) \to 1$ and $T_{o3}$ and $T_{o2}$.

Physically we expect this result, since we have already shown that the velocity and mass-flow of the recirculating mass for a given compressive power are interrelated, higher mass-flow ratios require less velocity, and therefore less combustion temperature.

Another way of looking at this important point, is to consider, the reversible process of a gas expanding from a pressure $P_{o2}$ and a temperature, $T_{o2}$ in a duct, until it has a velocity such that at the nozzle exit, the static values are $P_1$ and $T_1$. If the gas were to be reversed back into the duct with the same values for velocity, static pressure and temperature, and the velocity in the duct is then reduced to zero, the total gas parameters would be $P_{o2}$, $T_{o2}$ again. This is the definition of stagnation and holds for a reversible (isentropic) situation. Clearly, if the gas with this given velocity entered the duct and has a mass-flow $\dot{m}_r$, and was then mixed with an uncompressed mass-flow $\dot{m}$, such that $\dot{m}_r/\dot{m}=\infty$, then the final pressure and temperature would still be clearly $P_{o2}$, $T_{o2}$. Consequently under these conditions we need exactly the velocity for the recirculating mass which is provided by a Combustion temperature $T_{o3}=T_{o2}$. However, the fuel power supplied to the engine does not fall to zero as $T_{o3}$ tends to $T_{o2}$, since recall that the fuel power for a type 1 engine is given by:—

Fuel Power In=$(\dot{m}+\dot{m}_r)C_{p36}(T_{o3}-T_{o6})$

As $T_{o3} \to T_{o6} \to T_{o2}$, $(T_{o3}-T_{o6}) \to$ zero. i.e. the fuel power contribution to the overall mass-flow $\dot{m}$, (a constant value), tends to zero.

But the fuel power to the recirculating mass-flow=$\dot{m}_r C_{p36}(T_{o3}-T_{o6})$ and from A.4.4.5.

$\dot{m}_r C_{p36}(T_{o3}-T_{o6}) = \dot{m}C_{p61}(T_{o6}-T_{o1})$

In this case when $T_{o3} \to T_{o6} \to T_{o2}$, $(T_{o3}-T_{o6}) \to$ zero, but as $\dot{m}_r \to \infty$, $\dot{m}_r(T_{o3}-T_{o6})$ tends to a finite value. This finite value for the fuel power is derived as follows: we see that when $T_{o6} \to T_{o2}, (T_{o6}-T_{o1}) \to (T_{o2}-T_{o1})$.

∴ as $\dot{m}_r \to$ infinity, the fuel Power supply $\to \dot{m}C_{p21}(T_{o2}-T_{o1})$ Note that this is just sufficient power to isentropically compress the overall mass-flow, $\dot{m}$, from $P_{o1}$ to $P_{o2}$. In other words, the fuel power does not increase the temperature of the infinite recirculating mass-flow, but supplies power which exactly equals the transfer of power from the infinite recirculating mass-flow to the overall mass-flow $\dot{m}$, in each complete cycle.

The result is completely different from that of the gas turbine. As $T_{o3}$ is reduced in the limit, when $T_{o3}=T_{o2}$ no power is added and none extracted, i.e. the engine ceases operating. In the new engines, as $T_{o3} \to T_{o2}$, $\dot{m}_r/\dot{m} \to \infty$, and the fuel power added $\to \dot{m}C_{p21}(T_{o2}-T_{o1})$. In theory the engine is still able to work, and it gives a useful and significant output power of $\dot{m}C_{p21}(T_{o2}-T_{o1})$ which is exactly equal to the fuel power input. It is the condition obtained when the engine is 100% efficient and generates no waste heat.

Practical engines will clearly have losses, and not have $\dot{m}_r/\dot{m}=\infty$, and so more than the fuel power minimum will be required to ensure that the engine can operate successfully, consequently η1 will be less than 100%.

We are now going to calculate how the ideal efficiency varies with the parameter $\dot{m}_r/\dot{m}$.

Recall from A.4.4.9.

$$\eta_1 = \frac{1 - \frac{T_{o1}}{T_{o2}}}{1 - \frac{T_{o1}}{T_{o3}}}$$  A.4.4.9.

And from A.4:7.15.

$$\frac{\dot{m}_r}{\dot{m} + \dot{m}_r} = \frac{T_{o2}}{T_{o3}}$$  A.4.7.15.

Now:

$$\frac{T_{o1}}{T_{o3}} = \frac{T_{o2}}{T_{o3}} \times \frac{T_{o1}}{T_{o2}}$$

$$= \frac{\dot{m}_r}{\dot{m} + \dot{m}_r} \cdot \frac{T_{o1}}{T_{o2}}$$

Substituting for $$\frac{T_{o1}}{T_{o3}}$$

in A.4.4.9.

$$\boxed{\eta_1 = \frac{1 - \frac{T_{o1}}{T_{o2}}}{1 - \frac{\dot{m}_r}{\dot{m} + \dot{m}_r} \cdot \frac{T_{o1}}{T_{o2}}}}$$  A.4.7.16.

And since for isentropic compression:

$$\frac{T_{o1}}{T_{o2}} = \left(\frac{P_{o1}}{P_{o2}}\right)^{\frac{\delta-1}{\delta}}$$

$$\boxed{\eta_1 = \frac{1 - \left(\frac{P_{o1}}{P_{o2}}\right)^{\frac{\delta-1}{\delta}}}{1 - \frac{\dot{m}_r}{\dot{m}} \cdot \left(\frac{P_{o1}}{P_{o2}}\right)^{\frac{\delta-1}{\delta}}}}$$  A.4.7.17.

Using Tables A.4.1. and 2, we can plot thermodynamic efficiency against pressure ratio for various values of $\dot{m}_r/\dot{m}$.

Graph A.4.11. gives the results for values of $\dot{m}_r/\dot{m}$ of 0.1, 1, 5, 100, 1000. Note that at any given pressure ratio, as $\dot{m}_r/\dot{m} \to \infty$, $\eta_1 \to 100\%$. We have already obtained and explained this result. Equations A.4.7.16, and 17, show how efficiency varies as a function of this critical and important parameter, $\dot{m}_r/\dot{m}$. For reference the curve of the efficiency of the gas turbine is shown on the graph.

Graph A.4.11. plots values of $\dot{m}_r/\dot{m}$ from 0.1 to 1000 against efficiency, and shows curves of constant Pressure ratio from 1.01 through 10,000 It shows that even a 1.01 bar engine can have an ideal theoretical efficiency of 73.71% for an $\dot{m}_r/\dot{m}$ value of 1000. The equivalent theoretical efficiency of the gas turbine is only 0.2796%.

If we tabulate values for from A.4.7.17., we can show how the combustion temperature, $T_{o3}$ varies as a function of efficiency, by rearranging equation A.4.4.9.

$$\eta_1 = \frac{1 - \frac{T_{o1}}{T_{o2}}}{1 - \frac{T_{o1}}{T_{o3}}}$$

$$\therefore \eta_1 - \eta_1 \cdot \frac{T_{o1}}{T_{o3}} = 1 - \frac{T_{o1}}{T_{o2}}$$

Solving for $T_{o3}$: $\eta_1 \frac{T_{o1}}{T_{o3}} = \frac{T_{o1}}{T_{o2}} - 1 + \eta_1$ $$\boxed{\therefore T_{o3} = \frac{\eta_1 T_{o1}}{\left(\frac{T_{o1}}{T_{o2}}\right) + \eta_1 - 1}}$$  A.4.7.18.

Graph A. 4.13. Plots curves of constant Pressure ratio against efficiency and $T_{o3}$. Note that for a given pressure ratio, the thermodynamic efficiency increases as $T_{o3}$ is reduced. In the limit $\eta_1 = 100\%$ when $T_{o3} = T_{o2}$. We have already explained this result. The dashed curves on the same graph are curves of constant $\dot{m}_r/\dot{m}$, and show that as $T_{o3}$ is reduced $\dot{m}_r/\dot{m}$ increases. Note that with $\dot{m}_r/\dot{m}=10$, even a 250 bar engine has a theoretical combustion temperature of 1498° K, a very practical value and well below current gas turbine technology. Furthermore a 1000 bar engine has a combustion temperature below maximum present-day rocket combustion temperatures, in this case $T_{o3}=2,213°$ K. The corresponding values for $\eta_1$, are 97.62% and 99.27% respectively.

From A.4.4.9. we have:

$$\dot{m} C_{p61}(T_{o6} - T_{o1}) = \dot{m}_r C_{p36}(T_{o3} - T_{o6})$$

Assuming the Specific heats are constant, and solving for $T_{o6}$, $$(\dot{m} + \dot{m}_r) T_{o6} = \dot{m} T_{o1} + \dot{m}_r T_{o3}$$

$$\therefore T_{o6} = \frac{\dot{m}}{\dot{m} + \dot{m}_r} T_{o1} + \frac{\dot{m}_r}{\dot{m} + \dot{m}_r} \times T_{o3}$$  A.4.7.18.

dividing by $T_{o1}$, $$\frac{T_{o6}}{T_{o1}} = \frac{\dot{m}}{\dot{m} + \dot{m}_r} + \frac{\dot{m}}{\dot{m} + \dot{m}_r} \times \frac{T_{o3}}{T_{o1}}$$  A.4.7.19.

Recall from A.4.7.15.

$$\frac{\dot{m}_r}{\dot{m} + \dot{m}_r} = \frac{T_{o2}}{T_{o3}}$$

$$\therefore \frac{T_{o1}}{T_{o3}} = \frac{\dot{m}_r}{\dot{m} + \dot{m}_r} \times \frac{T_{o1}}{T_{o2}}$$

Invert $$\frac{T_{o1}}{T_{o3}}$$

and substitute in A.4.7.19.

$$\frac{T_{o6}}{T_{o1}} = \frac{\dot{m}_r}{\dot{m} + \dot{m}_r} = \frac{T_{o2}}{T_{o1}} \qquad \text{A.4.7.20.}$$

and $$\frac{T_{o1}}{T_{o6}} = \frac{1}{\frac{\dot{m}_r}{\dot{m} + \dot{m}_r}} = \frac{T_{o2}}{T_{o1}} \qquad \text{A.4.7.21.}$$

Multiply each term of the RHS of A.4.7.21. by $$\frac{T_{o1}}{T_{o2}},$$

$$\frac{T_{o1}}{T_{o6}} = \frac{\frac{T_{o1}}{T_{o2}}}{\frac{\dot{m}_r}{\dot{m} + \dot{m}_r} + \frac{T_{o1}}{T_{o2}} + 1} \qquad \text{A.4.7.22.}$$

Recall from A.4.4.15. that the efficiency of a type 2 engine is given by:

$$\eta_2 = \frac{1 - \frac{T_{o1}}{T_{o2}}}{1 - \frac{T_{o1}}{T_{o6}}}$$

Substitute for $$\frac{T_{o1}}{T_{o6}}$$

from A.4.7.22. then:

$$\eta_2 = \frac{1 - \frac{T_{o1}}{T_{o2}}}{1 - \frac{T_{o1}/T_{o2}}{\left(\frac{\dot{m}}{\dot{m} + \dot{m}_r}\right)\frac{T_{o1}}{T_{o2}} + 1}} \qquad \text{A.4.7.22.}$$

or in terms of Pressure ratio:

$$\eta_2 = \frac{1 - (P_{o1}/P_{o2})^{\frac{\delta-1}{\delta}}}{1 - \left[\frac{(P_{o1}/P_{o2})^{\frac{\delta-1}{\delta}}}{\frac{\dot{m}}{\dot{m}+\dot{m}_r}(P_{o1}/P_{o2})^{\frac{\delta-1}{\delta}} + 1}\right]}$$

Using tables A.4.1.2., we can plot curves of maximum ideal efficiency against pressure ratio, $$\frac{P_{o2}}{P_{o1}},$$

for various values of $\dot{m}_r/\dot{m}$. From the result we have already discussed, note that as $$\dot{m}_r/\dot{m} \to \infty, \left(\frac{\dot{m}}{\dot{m} + \dot{m}_r}\right) \to \text{zero},$$

and the denominator of A.4.7.24. tends to $$1 - (P_{o1}/P_{o2})^{\frac{\delta-1}{\delta}}$$

The efficiency therefore tends to 100%, for any given value of pressure ratio.

Graph A.4.14. gives the results for values of $\dot{m}_r/\dot{m}$ of 0.1, 1, 5, 10, 100 and 1000. Note the market improvement in efficiency for values of $\dot{m}_r/\dot{m}$ of 0.1, 1, 5, compared to those of a type 1 engine, (Graph A.4.11.). At higher values of $\dot{m}_r/\dot{m}$ remember that we have explained that $\eta_2 \to \eta_1$, so there is less advantage to be gained in the efficiency of a type 2 over a type 1 engine. Figure A.4.15 plots curves of constant pressure ratio on a graph of $\dot{m}_r/\dot{m}$ as a function of efficiency. Using the examples quoted for a type 1 engine, if $\dot{m}_r/\dot{m}=10$, 250 and 1000 bar type 2 engines have ideal efficiencies of 99.49% and 99.79% respectively.

As a type 2 engine is more efficient than a type 1 engine for a given mass-flow ratio, it is of interest to investigate how much more recirculating mass-flow must be used in a type 1 engine so that it has the same efficiency as the type 2 engine. The lower we can keep the value of the recirculating mass-flow, the smaller will be the physical dimensions of the Scoops ducts and Injectors, and so this investigation has an important practical implication regarding engine size and weight. For the following analysis we shall use the notation that $\dot{m}_{r_2}$ (suffix 2) is the recirculating mass-flow for a type 2 engine and $\dot{m}_{r_1}$ (suffix 1) is the value of the recirculating mass-flow for a type 1 engine of equivalent efficiency. Now we know that for all values of $\dot{m}_{r_2}/\dot{m}$ then $\dot{m}_{r_2} < \dot{m}m_{r_1}$. We an obtain the required relationship by equating the efficiencies of both engines at a given pressure ratio:

i.e. $\eta_1 = \eta_2$

From equations A.4.7.15 and A.4.7.23.

$$\frac{1-\frac{T_{o1}}{T_{o2}}}{1-\frac{\dot{m}_r}{\dot{m}+\dot{m}_r}\cdot\frac{T_{o1}}{T_{o2}}}=\frac{1-\frac{T_{o1}}{T_{o2}}}{1-\left[\frac{\frac{T_{o1}}{T_{o2}}}{\frac{\dot{m}_r}{\dot{m}+\dot{m}_r}\cdot\frac{T_{o1}}{T_{o2}}}+1\right]}$$

$$\therefore 1-\frac{\dot{m}_{r_1}}{\dot{m}+\dot{m}_{r_1}}\cdot\frac{T_{o1}}{T_{o2}}=1-\left[\frac{\frac{T_{o1}}{T_{o2}}}{\frac{\dot{m}_r}{\dot{m}+\dot{m}_r}\cdot\frac{T_{o1}}{T_{o2}}}+1\right]$$

$$\therefore \frac{\dot{m}_{r_1}}{\dot{m}+\dot{m}_{r_1}}=\frac{1}{\frac{\dot{m}_r}{\dot{m}+\dot{m}_r}\cdot\frac{T_{o1}}{T_{o2}}+1}$$

Finally we have:

$$\frac{\dot{m}}{\dot{m}+\dot{m}_{r_2}}\cdot\frac{T_{o1}}{T_{o2}}+1=\frac{\dot{m}+\dot{m}_{r_1}}{\dot{m}_{r_1}} \quad \text{A.4.7.}$$

From Table A.4.3. we can tabulate values of $\dot{m}_{r_1}/\dot{m}$ of, 0.1, 0.5, 1, 5, 10, and 100 against values of $\dot{m}_{r_1}/\dot{m}$ at given pressure ratios of 2, 12, 30 and 250. (The temperature ratios equivalent to these pressure ratios are taken from Table A.4.1.). We wish to now how much more recirculating mass-flow is required by a type 1 engine to be equivalent to a given mass-flow ratio of the type 2 engine i.e. we require the value of:

$$\frac{\dot{m}_{r_1}/\dot{m}}{\dot{m}_{r_2}/\dot{m}}=\frac{\dot{m}_{r_1}}{\dot{m}_{r_2}}$$

Table. A.4. tabulates the results, and graph A.4.1.6. plots $\dot{m}_{r_2}/\dot{m}$ against pressure ratio and shows curves of constant $\dot{m}_{r_2}/\dot{m}$ Whose values are 0.1, 0.5, 1, 10, 100. Now we expert that we would require a much larger value of $\dot{m}_{r_2}/\dot{m}_{r_2}$ for a type 1 engine to have equivalent efficiency when $m_{r_2}$ has a low value, and $$\frac{m_{r_1}^*}{m_{r_2}^*}$$

would have a much smaller value when $m_{r_2}$ is large. (Recall as $\eta_1\,\eta_2\,\dot{m}_{r_2}\to\infty$) (So, for example, from the curves we see that when $\dot{m}_{r_2/\dot{m}=}0.1$, for a 30-bar engine, $\dot{m}_{r_1}$ is 28.6 times larger than $\dot{m}_{r_2}$.

On the other hand when $\dot{m}_{r_2}=100$, $\dot{m}_{r_1}$, is only 2.63 times larger than $\dot{m}_{r_2}$, for an engine of the same efficiency. In practical terms, a reduction of 2.63 times in recirculating mass-flow ratio to achieve the same efficiency means a very significant reduction in engine bulk and hence weight. We therefore come to an important conclusion:

The engine type 2 is an extremely important means of achieving high efficiency at minimum weight.

Philosophically the engine type 2 also has important general implications, namely that it is better to do work on a gas by means of a reversible recirculating gas loop, than it is to do work on the gas directly. I.e. it is better to apply heat to a gas loop and let the gas loop exchange energy to the working overall gas, than it is to apply heat directly to the working gas. This is a general philosophical conclusion which applies to All Heat Engines, not only to ones operating in a Brayton cycle. This general philosophy is discussed further in Section 12.

Finally table A.4.3. and graph A.4.16 contain a surprise. Name that as $\dot{m}_{r_2}/\dot{m}$ does NOT tend to $$\dot{m}_{r_2}/\dot{m}r_2 \text{ One, } \dot{m}_{r_2}/m_{r_2}\to(\dot{m}_{r_2}/\dot{m}_{r_2})\,(T_{o2}/T_{o1}).$$

That is, for the same efficiency, a type 1 engine must always have more recirculating \mass-flow relative to a type 2 engine and in approaching the limit as $\dot{m}_{r_2}/\dot{m}\to\infty$, the same efficiency is achieved when a type 1 engine has $(T_{o2}/T_{o1})$ times the recirculating mass-flow. I.e., as the pressure ratio increases, a type 1 engine requires an increasing value of $\dot{m}_r/\dot{m}$ to have an efficiency equivalent to a type 2 engine. In practice since the efficiencies of both engines are above 95%, for pressure ratios exceeding 50 bar when $\dot{m}_r/\dot{m}$ is above 10, this result is not so significant, as the one obtained when $\dot{m}_r/\dot{m}$ is in the range of 0.5 through 5.0, which is in the more practical range of mass-flow ratios.

Summarizing the results in this Section, we have shown that the value of the parameter $\dot{m}_r/\dot{m}$ provides an extremely powerful means of resulting the efficiency of both types of new engine.

We will discuss later factors which affect the practical values that can be used and also the effects of non-ideal compression in relation to efficiency. One of the most fundamentally important results obtained is that the efficiency increases, and combustion temperature decreases as the value of $\dot{m}_r/\dot{m}$ is raised.

Therefore the high temperature materials problem can be considerably reduced, and engines operating at 250 bar or more now become a practical possibility. Such engines, with a suitable mass-flow ratio, would have an ideal thermodynamic efficiency which exceeds 97%. Current high temperature materials technology with gas turbines limit the maximum value of the pressure ratio to about 33 are, which would give an ideal efficiency for this type of engine of about 62.6%.

A.4.8. Power Output, Thrust and Fuel Consumption.

In this section we are going to compute the remaining parameters for the new engines and also relate them to the equivalent gas turbines, assuming that there are no losses in each case. If we assume the outlet nozzle is unchokes, then the gas exit velocity is computed using standard equations. For the new engine type 1, by definition, $$\frac{T_{oe}}{T_e}=\frac{T_{o3}}{T_4}$$

and $$\frac{T_{o3}}{T_4}=\frac{P_{o3}}{P_4}^{\frac{\delta-1}{\delta}}$$

assuming isentropic expansion.

but $$\frac{P_{o3}}{P_4} = \frac{P_{o3}}{P_{o1}}$$

assuming no combustion pressure loss.

$$V_{e_1} = \sqrt{2C_{P_{34}}(T_{o3} - T_4)} \quad \text{A.4.8.1.}$$

The power output is given by $$P_{out1} = 1;2\dot{m}V_{e_i}^2 \quad \text{A.4.8.2.}$$

Alternatively $$P_{out1} = \dot{m}C_p(T_{o3} - T_4) \quad \text{A.4.8.3.}$$

where $P_{out1}$ is in watts.
The thrust is given by, $$F_{e_1} = \dot{m}V_{e_1} \quad \text{A.4.8.4.}$$

(assuming no thrust reduction due to the Scoops).

The Fuel consumption is calculated assuming 100% combustion efficiency using a fuel (e.g. kerosene) which as an LCV of 42,000 KJ/kg. The fuel mass-flow is given by, $$\dot{m}_{f_1} = \frac{P_{out}1}{\eta_1 \times 42,000,000} \quad \text{A.4.8.5.}$$

Where $\dot{m}_{f_1}$ units are in kg/s. (For example, a 50% efficient engine with an output power of 42 megawatts requires a fuel supply of 2 kg/s.).

For the new engine the corresponding equations are:—

$$\frac{T_{o6}}{T_5} = \left(\frac{P_{o2}}{P_{o1}}\right)^{\frac{\delta-1}{\delta}}$$

$$V_{e_2} = 2 \cdot CP \cdot (T_{o6} - T_5)$$

$$P_{out2} = 1/2\, \dot{m}V_{e2}^2$$

$$F_{e_2} = \dot{m}V_{e_2}$$

and $$\dot{m}_{f_2} = \frac{P_{out2}}{\eta_2 \times 42,000,000}$$

Tables A.4.4., A, B an dC give efficiencies and values for these parameters for pressure ratios of 1.01, 1.1, 2, 12, 30, 250, 1000, and 10,000, at values for $\dot{m}_r/\dot{m}$ from 0.1 through 10,000. Also shown are the temperatures $T_{o3}$ and $T_{o6}$. The thrust is given in Newtons and pounds st. and the output power is in the indicated kilowatts or Megawatts. All results are for mass-flow, $\dot{m}$, of 50 kg/s, (110 lbs/s). Also given in the tables are the values of $P_{out}$, Fuel consumption and mass-flow, $\dot{m}$, for engines of 44,484 N Thrust. (10,000 lbs.), in every case.

Figure 35:
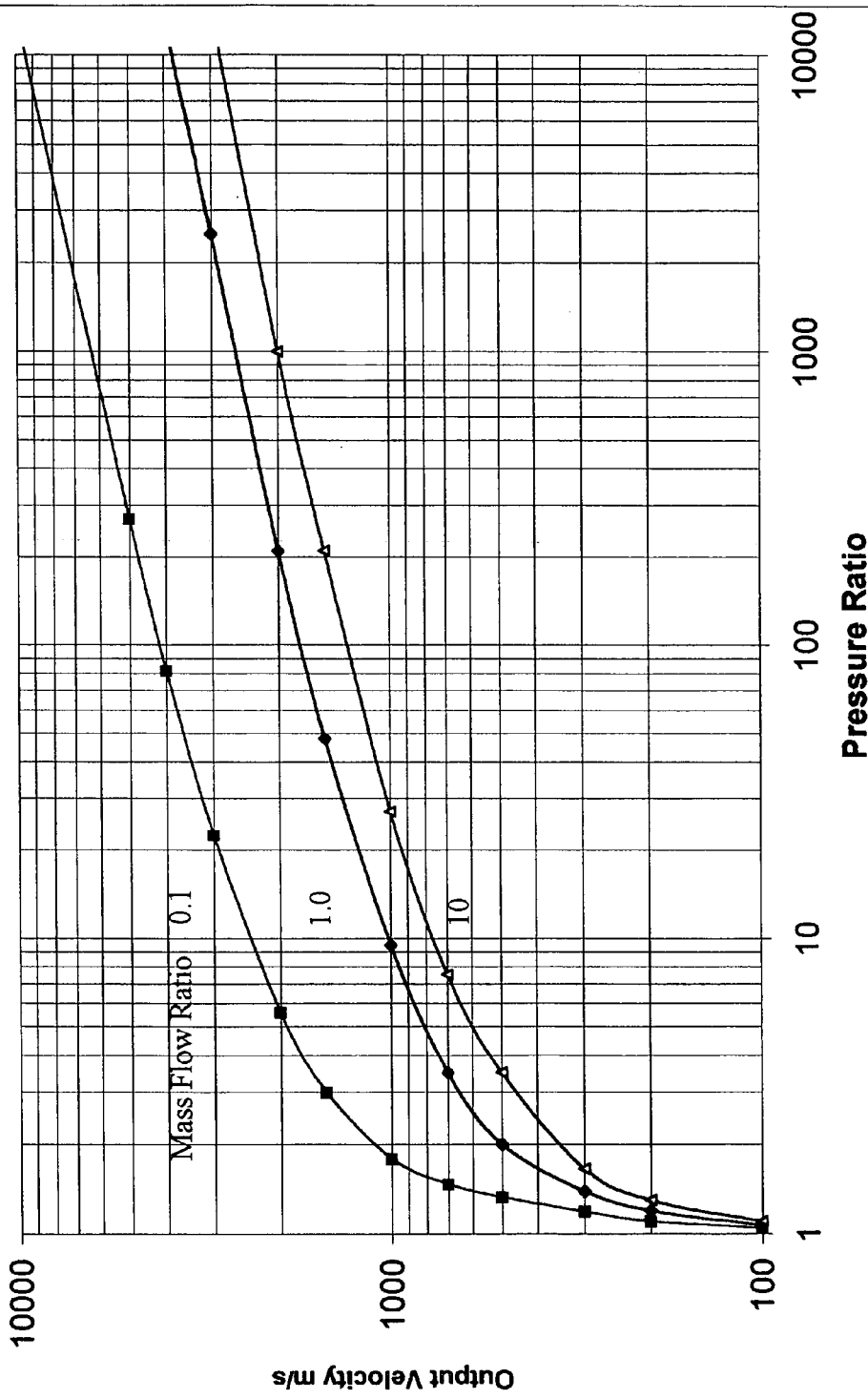
FIG. 35 is an Exhaust Velocity as a Function of Recirculating Mass Flow Ratio and Pressure Ratios.

FIG. 35. plots $V_{e_1}$ against pressure ratio for various indicated values of $\dot{m}_r/\dot{m}$ from 0.1 through 100.

Figure 36:
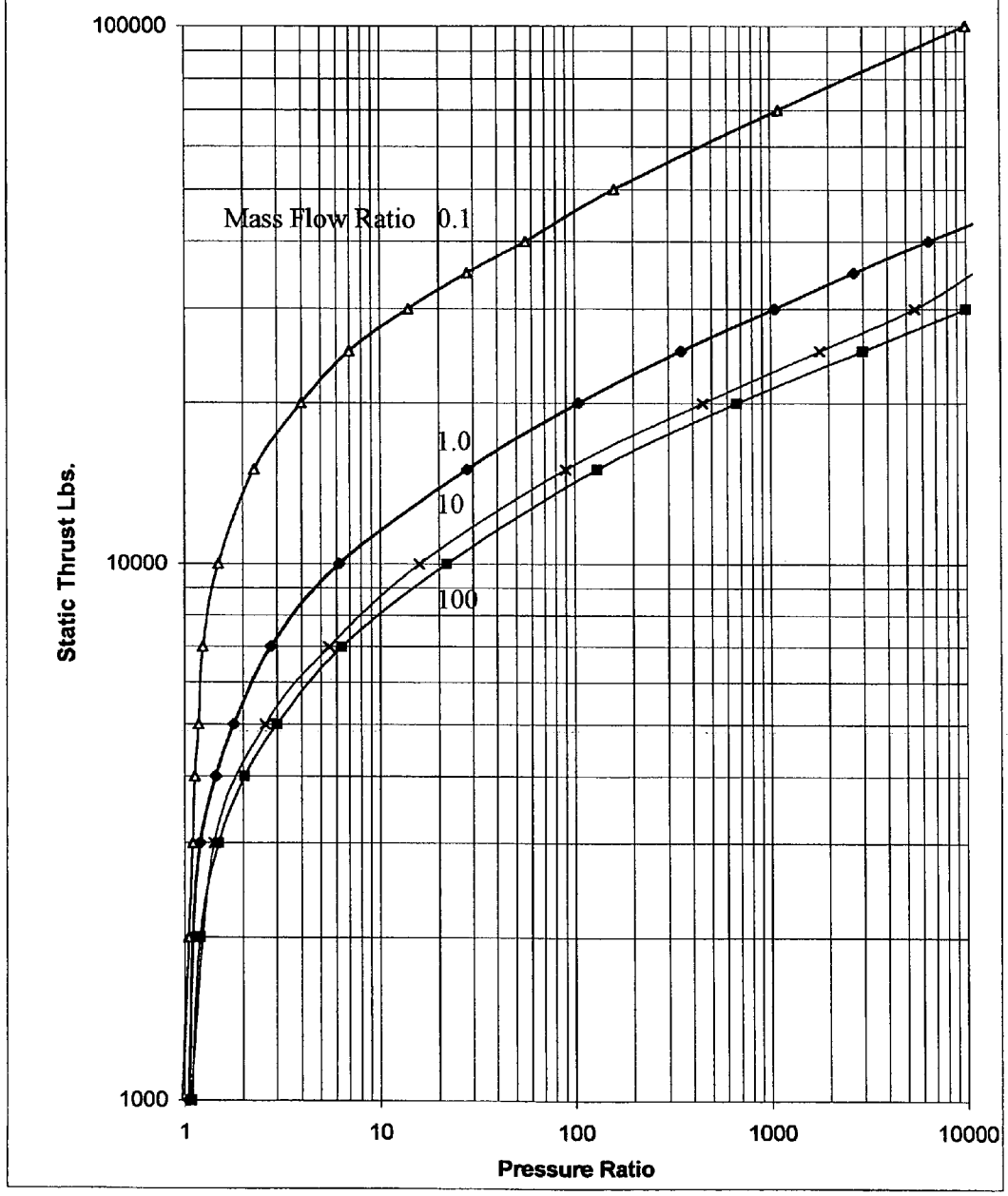
FIG. 36 is Thrust as a Function of Recirculating Mass Flow Ratio and Operating Pressure Ratio.
Figure 37:
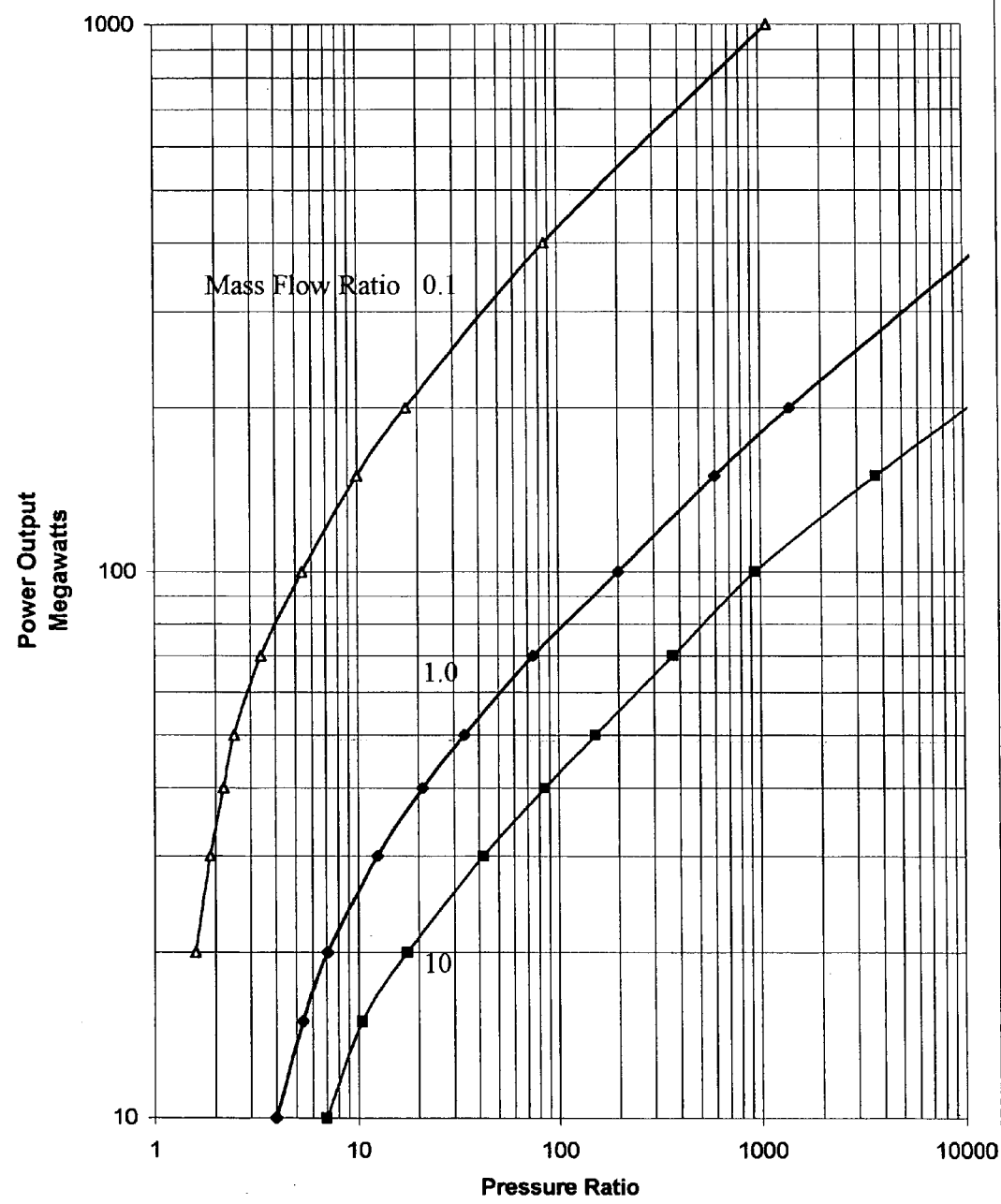
FIG. 37 is a Power Output as a Function of Recirculating Mass-Flow Ratio and Operating Pressure Ratio.
Figure 38:
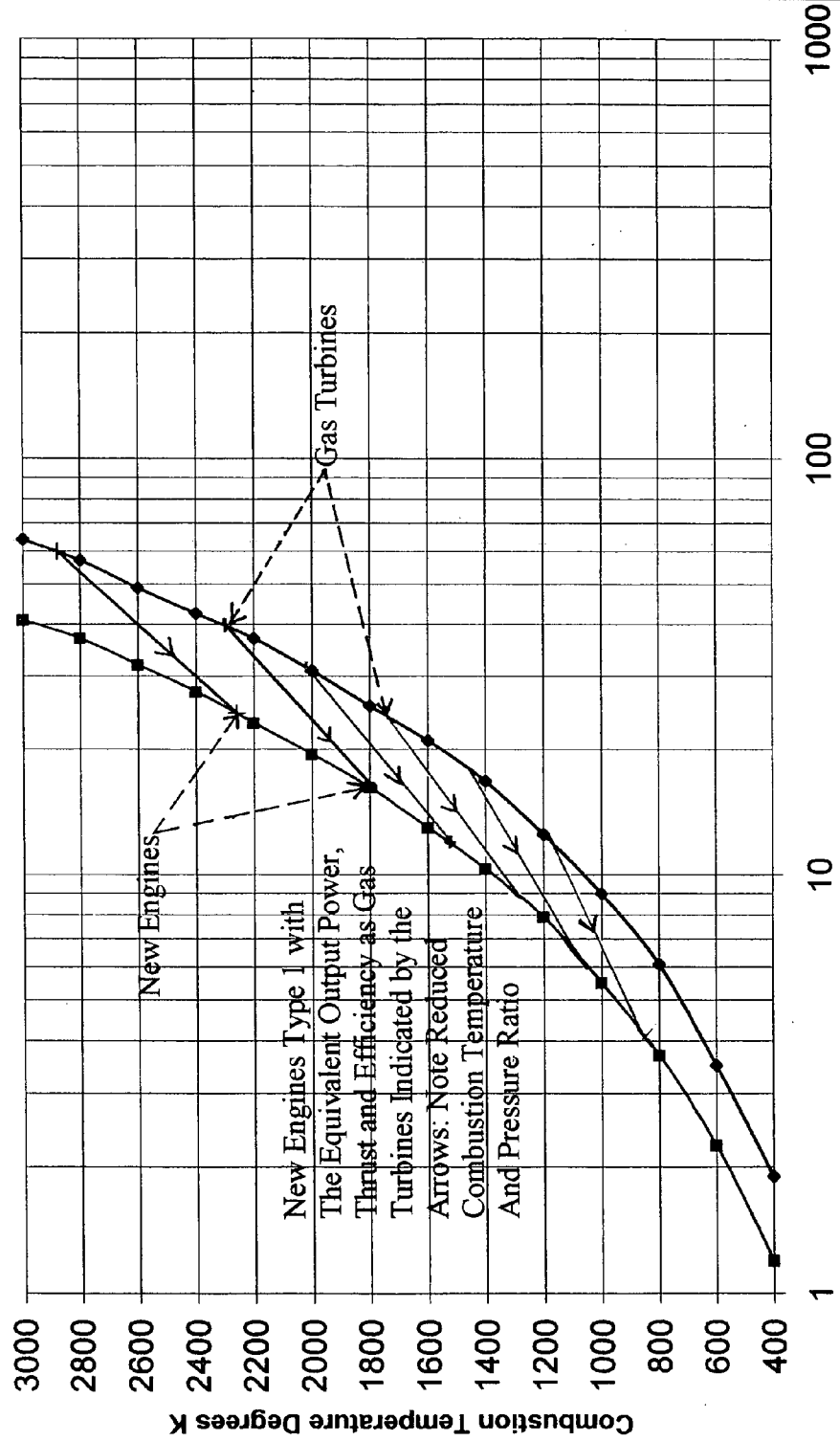
FIG. 38 is a New Engine of Equivalent Power Output to Gas Turbine.
Figure 39:
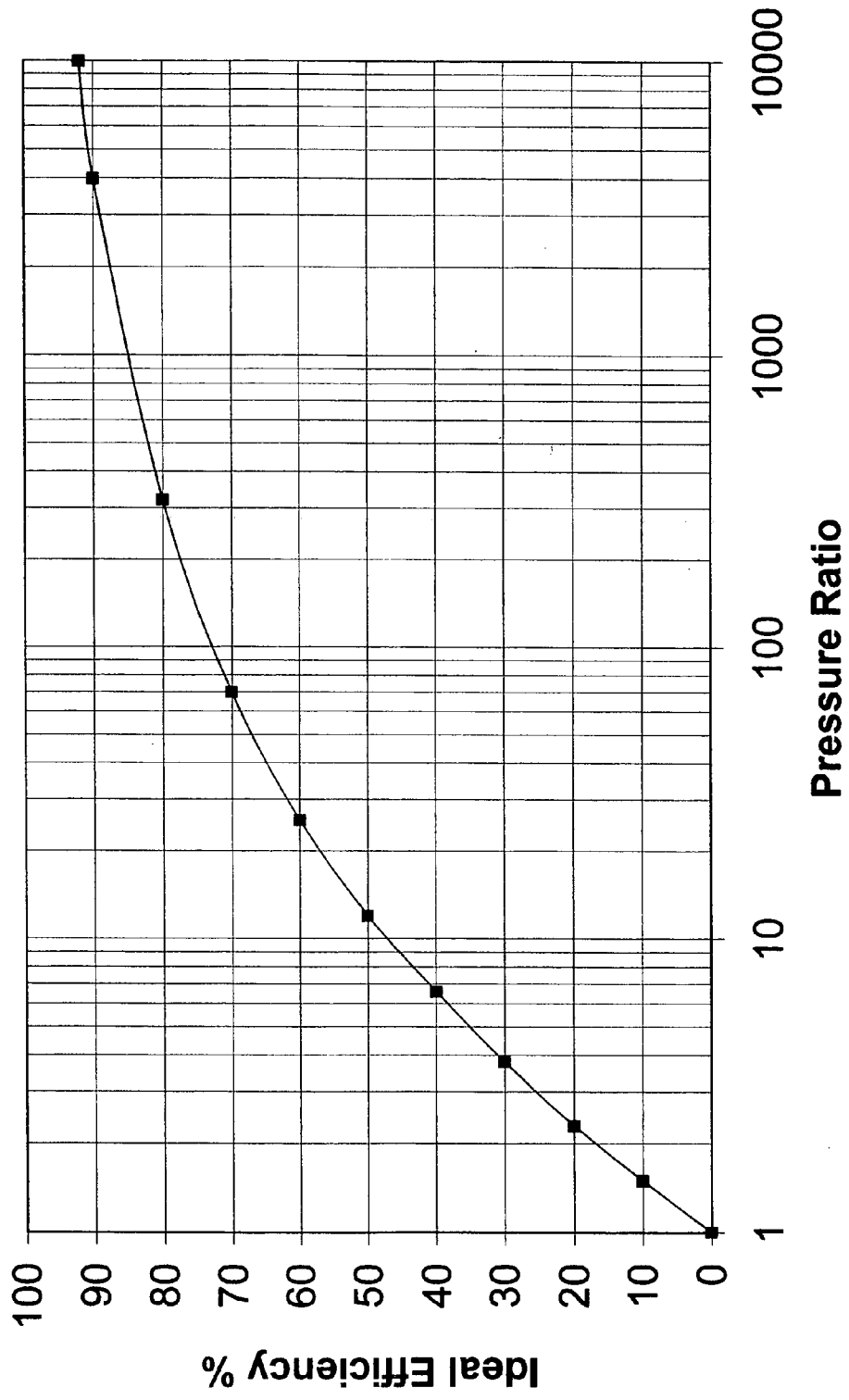
FIG. 39 is a Gas Turbine Efficiency as a Function of Pressure Ratio.

FIG. 36. gives the thrust against pressure ratio for curves of constant pressure and ratio FIG. 37. the output power. Also shown on A.4.18. are combustion temperatures $T_{o3}(T_{oe})$ and efficiencies at various points derived from the tables. In all cases it is assumed that $T_{o1}=288°$ K, $8=1.3915427$ and $P_{o1}=101,325$ N, i.e. standard sea-level atmospheric conditions.

Note that the gas exit velocity, power output and thrust all decrease as $T_{o3}$ decrease. We would expect this from any regular thermodynamic analysis. From our knowledge of the enw engine we expect these parameters to decrease as $\dot{m}_r/\dot{m}$ m and the efficiency increase. However, the significant result is that the fuel consumption reduces as $\dot{m}_r/\dot{m}$ increases. Also note that as $\dot{m}_r/\dot{m}$ ∞ the Power output approaches the value of $\dot{m}C_{p_{21}}(T_{o2}-T_{o1})$ result we have already extensively discussed. Recall that it was stated that this minimum value of power output has a significant value. For example the 12 bar twin Spool gas turbine discussed.

(Engine. E-6) has a power output of 12.18 MW. With $\dot{m}_r/\dot{m}=1000$, the equivalent engine type 1 has an ideal output power of 14.75 MW. Assuming practical losses reduce this theoretical result by 20% the type 1 engine's output is 11.8 MW. A value almost identical to that of the gas turbine. However recall that the gas turbine's efficiency was 37.8%, the new engine has $\eta_1=99.9\times0.8$ i.e. $\eta_1=79.9\%$ (assuming practical losses are 20%). The new engine is more efficient by:

$$\frac{79.9}{37.8} - 1 \text{ or } 111\%.$$

The results for the power output, exit velocity, thrust, fuel consumption for 44, 484 $\dot{m}_r/\dot{m}$ all for a type 2 engine are plotted on graphs A.4.13, 14, 15, 16 respectively. The results follow similar curves to those obtained for a type 1 engine, except that at a given value for the pressure ratio and $\dot{m}_r/\dot{m}$, all parameters are lower, including the fuel consumption. (since $\eta_2 > \eta_1$). From the foregoing discussions all these results would be expected and require no further amplification here.

Finally, the comparison between a gas turbine and the new engine is analyzed. There are obviously many different possible ways a comparison could be made, but a particularly important practical way is to consider engines which have an equivalent gas exit velocity, thrust and output power.

For a given value of $\dot{m}$, if we have a new engine type 1, we will achieve equivalent exit velocity, thrust and power, if the engine operates with $T_{oe}$ and $P_{oe}$ equal to the turbine exit temperature and Pressure of the gas turbine. i.e. we must set, $T_{o3}$ (new engine)=$T_{o3}^1$ (gas turbine) and $P_{o2}$, $P_{o3}$ (new engine)=$P_{o3}^1$ (gas turbine).

Recall the definitions of $T_{o3}^1$, $P_{o3}^1$ from the cycle diagram A.4.1.

Now we have indicated that the optimum power output of the gas turbine is when: (Section A.4.2.)

$$\frac{T_{o3}}{T_{o1}} = \left(\frac{T_{o2}}{T_{o1}}\right)^2$$

New Engine of Equivalent Power Output to Gas Turbine

Line $T_{o7} T_{o3}^1$ is of constant Pressure, where $T_{o7}$ is the new adiabatically Compressed gas temperature.

$$T_{o3}^1 = T_{o3} - (T_{o2} - T_{o1}) = T_{o3} + (T_{o1} - T_{o2}) \qquad \text{A.4.8.1.}$$

but for isentropic compression $$\frac{T_{o2}}{T_{o1}} = \left(\frac{P_{o2}}{P_{o1}}\right)^{\frac{\delta-1}{\delta}}$$

$$\therefore T = T_{o1}\left(\frac{P_{o2}}{P_{o1}}\right)^{\frac{\delta-1}{\delta}}$$

Substituting in A.4.8.1. and dividing by $T_{o1}$, we have:

$$T_{o3}\left(1 - \left(\frac{P_{o1}}{P_{o2}}\right)^{\frac{\delta-1}{\delta}}\right) + T_{o3} + T_{o1}\left(1 - \left(\frac{P_{o2}}{P_{o1}}\right)^{\frac{\delta-1}{\delta}}\right)$$

For the gas turbine the relative work output is given by:

$$T_{o3} - (T_{o2} - T_{o1}) - T_{o4} = T_{o3} - (T_{o2} - T_{o1}) - T_{o4}$$

$$T_{o3}\left(1 - \left(\frac{P_{o1}}{P_{o2}}\right)^{\frac{\delta-1}{\delta}}\right) + T_{o1}\left(1 - \left(\frac{P_{o2}}{P_{o1}}\right)^{\frac{\delta-1}{\delta}}\right) = \frac{T_{o3}^1 - T_{o4}}{T_{o3}^1\left[1 - \left(\frac{P_{o1}}{P_{o7}}\right)^{\frac{\delta-1}{\delta}}\right]}$$

The New engine type 1 relative work output is given by:

$$T_{o3}^1 - T_{o4} = T_{o3}^1\left[1 - \left(\frac{P_{o1}}{P_{o7}}\right)^{\frac{\delta-1}{\delta}}\right]$$

From A.4.8.1. and dividing by $T_{o1}$, we have:

$$\frac{T_{o3}^1}{T_{o1}} = \frac{T_{o3}}{T_{o1}} - \frac{T_{o2}}{T_{o1}} + 1 \qquad \text{A.4.8.2.}$$

But for the gas turbine maximum power occurs when:

$$\frac{T_{o3}^1}{T_{o1}} = \left(\frac{T_{o2}}{T_{o1}}\right)^2$$

Substituting in A.4.8.2.

$$\frac{T_{o3}^1}{T_{o1}} = \left(\frac{T_{o2}}{T_{o1}}\right)^2 - \frac{T_{o2}}{T_{o1}} + 1 \qquad \text{A.4.8.3.}$$

Remember:

$$\frac{P_{o3}^1}{P_{o3}} = \frac{P_{o7}}{P_{o2}} \qquad \text{A.4.8.4}$$

$$\therefore \left(\frac{T_{o3}^1}{T_{o3}}\right)^{\frac{\delta-1}{\delta}} = \frac{P_{o7}}{P_{o2}}$$

$$\therefore P_{o7} = P_{o2}\left(\frac{T_{o3}^1}{T_{o3}}\right)^{\frac{\delta-1}{\delta}}$$

If we tabulate values of $T_{o3}/T_{o1}$ from 2 through 16, we can calculate the temperature ratios $T_{o2}/T_{o1}$ hence (assuming $\delta=1.394175$). Values for $T_{o3}^1/T_{o1}$ hence $P_{o2}/P_{o1}$ (assuming $\delta=1.394175$). Values for $T_{o3}^1 T/T_{o1}$ are derived from Equation A.4.8.3. and $T_{o3}/T_{o3}^1$ assuming $T_{o1}=288°$ K. The ratio $T_{o3}^1/T_{o1}$ is then computed and from Equation A.4.8.4. the values of $P_{o7}/P_{o2}$ hence $P_{o7}$. The results are tabulated in Tale A.4.5.

As an example if $T_{o3}/T_{o1}=7$, for a gas turbine the temperature ratio $T_{o2}/T_{o1}=2.6\,46$ and the pressure ratio is 31.75. The combustion temperature would be 2,016_K. For the new engine of equivalent output power, the combustion temperature $T_{o3}^1$ is 1,542° K, and the pressure ratio, $P_{o7}/P_{o1}$ 12.254. Note that the reduction in pressure ratio, $P_{o7}/P_{o2}$ 12.254. Note that the reduction in pressure ratio is given by $P_{o7}/P_{o2}$, and in Combustion Temperature by $$(P_{o7}/P_{o2})\frac{\delta-1}{\delta},$$

in the new engine. In this example the pressure ratio is reduced by 0.386, and the maximum temperature by 0.765, both are considerable savings, and enable new engines of equivalent output power to have much reduced pressure and temperature ratios. Graph A.4.21. plots the results, of combustion temperature against pressure ratio. The points on the RMS curve are gas turbines and the connecting arrows indicate the equivalent pressure and temperature of the new engine.

Finally observe that since the ratio of the work output, to work output plus waste heat, is the same for both the gas turbine and new engine, the efficiency is also the same for each pair of engines.

For example the 31.75 bar gas turbine quoted above has an ideal efficiency of:

$$\eta_{TJ} = 1 - \frac{T_{o1}}{T_{o2}}$$

$$= 1 - 0.37796$$

$$\therefore \eta_{TJ} = 0.6220 \text{ or } 62.20\%.$$

For the new engine, operating at 12.254 bar and $T_{o3}=1,542°$ K.

$$\eta_1 = \frac{1 - T_{o1}/T_{o2}}{1 - T_{o1}/T_{o3}}$$

-continued $$= \frac{1 - \frac{0.49407}{288}}{1 - \frac{288}{1542}}$$

$$= \frac{0.50593}{1 - 0.18677}$$

$$\therefore \eta_1 = 0.6221 \text{ or } 62.21\%.$$

This corresponds to a mass-flow ratio, $\dot{m}_r/\dot{m}$ of about 0.61. From preceding analysis, we now that we can obtain higher efficiencies for the new engine by further reducing $T_{o3}$ and increasing $\dot{m}_r/\dot{m}$.

This concludes Appendix 4 and the ideal theoretical analysis of the new engines.

APPENDIX 5

Rocket Booster Engine with Constant Thrust to Mach 9.

It has been pointed out that if a flight path of increasing altitude and velocity is arranged correctly, then the combustion pressure can be kept constant and equal to the sea-level value. This is because the Ram Pressure ratio, $R_{pr}$, as the velocity of the vehicle rises can be used to neutralize the reduction in atmospheric pressure. In this Appendix we are to calculate the performance and flight path of an engine which is arranged to give approximately constant thrust from zero to Mach 9. Such an engine could be used as a first stage booster for rockets and some parameters of a suitable booster for the Space Shuttle will be derived. Considerable fuel savings can be achieved. We have shown that control of the recirculating mass-flow ratio, $\dot{m}_r/\dot{m}$ provides a powerful means of regulation the combustion pressure and gas exit velocity. We will exploit this degree of freedom to achieve our objective.

Some other general considerations are discussed below:

1) The Ram Pressure ratio at Mach 9 is about 17,000. Clearly the maximum practical limits in engines ar provided by the maximum operating Temperature and pressure. To limit the combustion pressure to an acceptable maximum with a high Ram Pressure ratio, we have the degree of freedom provided by altitude, since the atmospheric pressure is reduced. By this means we can arrange that we do not exceed the maximum design pressure of the engine.

2) Since the Ram Pressure ratio rises as a function to about the $7^{th}$ to $8^{th}$ power of velocity, about Mach 1 (depending on the value of $\delta$), and since the combustion pressure is the product of the compression ratio and Ram Pressure ratio, it is important that the initial engine compression ratio is kept as low as possible. Clearly an engine with a compression ratio of 25, traveling at Mach 9, would have a pressure ratio of 25×17,000=425,000. An impossible practical number for overall compression ratio, whereas an Engine with a static sea-level pressure ratio of 1.5, would give at Mach 9, 1.5×17,000=25,500. An order of magnitude nearer a feasible compression ratio. At an altitude of 78,000 ft. a combustion pressure of 450 bars is obtained in this condition, a very high pressure compared to current gas turbines, but within the realm of rocket combustion chamber pressures, and well below the 2000 bars which are becoming common pressures for the operation of steam plants.

3) Very high Ram Pressure ratios also give high Temperature ratios, and here again it is fortunate that the atmospheric temperature reduces with in creasing altitude. The inlet air temperature is about 217_K from a height between 11 to 20 km, and this phenomenon is exploited to keep the engine operating temperature within practical bounds. It was shown in Appendix 4 that by having a large value for $\dot{m}_r/\dot{m}$ (10 being a reasonable practical maximum for this application), then ideally the combustion temperature, $T_{o3}$, is only about 10% above the temperature produced by the Ram Temperature ratio: (i.e. $T_{o2}$, the temperature produced by the adiabatic compression of the input gas). This is an entirely different situation from that present in gas turbines, where to achieve a meaningful output from an engine, the combustion temperature must well exceed the temperature produced by the Ram Temperature ratio: Furthermore, it was shown in Appendix 4 that as the ratio of $\dot{m}_r/\dot{m} \to \infty$ then the thermodynamic efficiency $\to 100\%$.

4) A factor to regulate is the overall mass-flow, $\dot{m}$. Since the density of air reduces with increasing altitude the tendency is that $\dot{m}$ is also reduced. However, the velocity of the engine rises with altitude and this factor is exploited to keep the mass-flow as near to the static sea-level as possible. However we will find that variation in the area of the main inlet throat around the Injector will be necessary to give practical values of $V_e$ for constant thrust. This arrangement must be combined with an inlet variable geometry to provide isentropic compression of the inlet gas by shock-waves.

5) As the atmospheric pressure falls with increasing altitude, for a given constant combustion pressure, the exit velocity $V_e$ rises. This is an important feature which assists in keeping the combustion temperature lower, for a constant value of thrust. We will assume that matters are arranged in the outlet nozzle to give an output mass-flow which is not choked, and could require the use of a variable area outlet nozzle.

From these general considerations we can draw up criteria for the specification of the engine as follows:

1/ The recirculating mass-flow ratio $\dot{m}_r/\dot{m}$ is as high as possible. (We shall use the initial value of 10).

2/ The sea-level static combustion pressure shall be as low as possible. (We shall use initially 1.5 bar). (A value, incidentally, that would give impractically low thermodynamic efficiency with gas turbines).

3/ The altitude and velocity will be arranged to give practical combustion pressures and temperatures at the very high Mach numbers. (As Mach numbers above 6, rocket technology will be required).

4/ The areas of the inlet nozzle, main Injector throat will be adjustable to prevent major variations in the overall mass-flow, as the air density reduces with altitude.

5/ Variations in the value of $\dot{m}_r/\dot{m}$, and combustion temperature, will be used to keep the value of $\dot{m}(V_e - V_a)a$ constant, (i.e. the thrust will be substantially constant).

Using these criteria, Mach numbers from zero to Mach 10 were tabulated and the atmospheric properties derived from Table 1, were used to compute the Ram Pressure and Temperature ratios at the engine Inlet, assuming isentropic conditions. The overall pressure and temperature ratio is given by the product of the Ram Pressure ratio and the static engine pressure ratio. i.e.

$$\frac{Po2}{Po1} = 1.5 \text{ when } M = 0.$$

Overall Pressure ratio, $$\frac{P_{o2}}{P_{o1}} = R_{pr.} \times 1.5$$

The actual combustion pressure is given by multiplying this pressure by the atmospheric pressure at the altitude of flight for each given Mach number.
Since $P_{o1} = P_a$ $$\therefore \text{Combustion Pressure } P_{o3} = P_a \, R_{pr} \times 1.5.$$

Now when M=0, the gas exit velocity, $V_e$ = 270 m/s, for $$\frac{\dot{m}_r}{\dot{m}} = 10 \text{ and } \frac{P_{o2}}{P_{o1}} = 1.5.$$

At all Mach numbers the parameter $(V_e - V_a)$ will be arranged to be about 270 m/s. (The condition for constant thrust for a constant mass-flow). In practice $\dot{m}$, will not be constant, so variations in $(V_e - V_a)$ will be calculated.

The altitude for each Mach number was chosen by inspection of the values in Table 1, to give reasonable practical values of $P_{oe}$ and $T_{oe}$. The choice of the flight path therefore, is not unique, and is one of an infinite number of differing possibilities. Table A.5.1. shows values of Mach Number versus altitude, and the parameters $P_{o2}/P_a$, and $P_{o2}$, (bar), $T_{o2}$, and $T_{o3}$ are given. Lastly $\dot{m}_r/\dot{m}$ and thermodynamic efficiency are given and the fuel flow at each Mach Number.

LIST OF TABLES IN APPENDICES

| TABLE | TITLE |
|---|---|
| A4.1 | Values of Pressure Ratio and $T_{O2}$ |
| A4.2 | Values of Mass Flow Ratios |
| A4.3 | Comparison of Mass-Flow Ratios of a Type 2 Engine with a Type 1 Engine of Identical Efficiency |
| A4.4, A, B, C | Values of many Parameters at given Pressure Ratios |
| A4.5 | Values of Equivalent New Engines parameters Equivalent to Gas Turbine |

TABLE A4.1

$\frac{\delta}{\delta-1} = 3.554$  $T_{01} = 288°\text{K}$

| $\frac{P_{02}}{P_{01}}$ | $\left(\frac{P_{01}}{P_{02}}\right)^{\frac{\delta-1}{\delta}}$ | $T_{02}°\text{K}$ |
|---|---|---|
| 1.01 | 0.99720416 | 288.80746 |
| 1.1 | 0.97354 | 295.828 |
| 1.5 | 0.89218 | 322.805 |
| 2.0 | 0.82281 | 350.20 |
| 3.0 | 0.73409 | 392.322 |
| 10.0 | 0.52315 | 550.510 |
| 12.0 | 0.496989 | 579.490 |
| 20.0 | 0.430452 | 669.064 |
| 30.0 | 0.384041 | 749.920 |
| 50.0 | 0.332625 | 865.839 |
| 100 | 0.273687 | 1052.297 |
| 250 | 0.21148725 | 1361.784 |
| 500 | 0.174013 | 1655.05 |
| 1,000 | 0.143179 | 2011.47 |
| 5,000 | 0.091035 | 3163.62 |
| 10,000 | 0.074904 | 3,844.90 |

A.4.2

| $\frac{\dot{m}_r}{\dot{m}}$ | $\frac{\dot{m}_r}{\dot{m}+\dot{m}_r}$ | $\frac{\dot{m}+\dot{m}_r}{\dot{m}_r}$ | $\frac{\dot{m}_r}{\dot{m}+\dot{m}_r}$ |
|---|---|---|---|
| 0.1000 | 0.0909091 | 11 | 0.9090909 |
| 0.11111 | 0.100000 | 10 | 0.900000 |
| 0.14286 | 0.125000 | 8 | 0.87499781 |
| 0.2000 | 0.1666667 | 6 | 0.833333 |
| 0.25000 | 0.200000 | 5 | 0.800000 |
| 0.33333 | 0.2500000 | 4 | |
| 0.50000 | 0.333333 | 3 | |
| 1.0000 | 0.500000 | 2 | |
| 2.0000 | 0.6666667 | 1.5 | |
| 2.50000 | 0.714286 | 1.4 | |
| 3.3333 | 0.769231 | 1.3 | |
| 5.0000 | 0.833333 | 1.2 | |
| 10.0000 | 0.909091 | 1.1 | |
| 20.0000 | 0.952381 | 1.05 | |
| 25.0000 | 0.961538 | 1.04 | |
| 33.3333 | 0.970874 | 1.03 | |
| 50.0000 | 0.980392 | 1.02 | |
| 100.000 | 0.99009901 | 1.01 | |

TABLE #1

| Altitude Ft. | Altitude km | $T_a$ °K | $P_a(\text{N/m}^2)$ | kg/m³ $\rho$ | $C_p$ J/kgK | $\delta$ | c m/s | $\frac{\delta}{\delta-1}$ | $\frac{\delta-1}{2}$ | $P_a$ bur | $P_{SL}/P_a$ | M for $P_r = P_{SL}$ | V m/s |
|---|---|---|---|---|---|---|---|---|---|---|---|---|---|
| 0 | 0 | 288 | 101,325 | 1.226 | 1005.7 | 1.3993 | 340.10 | 3.5044 | 0.1996 | 1 | 1 | 0 | 0 |
| 5,000 | 1.515 | 278 | 83,937 | 1.052 | 1003.8 | 1.4000 | 334.22 | 3.5000 | 0.2000 | 0.8284 | 1.2072 | 0.7251 | 242.3 |
| 10,000 | 3.03 | 268.5 | 69,932 | .9075 | 1002.0 | 1.4014 | 328.6 | 3.4913 | 0.2007 | 0.6902 | 1.4489 | 0.7472 | 245.5 |
| 15,000 | 4.55 | 258.5 | 57,298 | .7723 | 1000 | 1.4025 | 322.6 | 3.4845 | 0.2012 | 0.5655 | 1.7684 | 0.9399 | 302.2 |
| 20,000 | 6.06 | 249 | 47,072 | .6587 | 998.1 | 1.4036 | 316.7 | 3.4777 | 0.2018 | 0.4646 | 2.1526 | 1.1055 | 350.1 |
| 30,000 | 9.1 | 229 | 30,329 | .4610 | 994.2 | 1.4059 | 304.0 | 3.4637 | 0.2030 | 0.2993 | 3.3409 | 1.4326 | 435.5 |
| 40,000 | 12.12 | 217 | 23,991 | .3852 | 991.8 | 1.4072 | 296.0 | 3.4558 | 0.2036 | 0.2368 | 4.2235 | 1.5939 | 471.85 |
| 57,500 | 17.5 | 217 | 8,171 | 1.312–1 | 991.8 | 1.4072 | 296.0 | 3.4558 | 0.2036 | 8.064₁₀–2 | 12.40 | 2.295 | 679.22 |
| 87,500 | 26.7 | 230 | 2,020 | 3.06–2 | 994.2 | 1.4059 | 304.0 | 3.4637 | 0.2030 | 1.994₁₀–3 | 50.16 | 3.214 | 977.0 |
| 116,000 | 35.4 | 250 | 528.1 | 7.36–3 | 998.1 | 1.4036 | 316.7 | 3.4777 | 0.2018 | 5.21₁₀–3 | 191.9 | 4.1848 | 1325.3 |
| 156,000 | 47.5 | 278 | 117.3 | 1.47–3 | 1003.8 | 1.4000 | 334.2 | 3.5000 | 0.2000 | 1.16₁₀–3 | 863.8 | 5.4323 | 1815.5 |
| 182,000 | 55.5 | 265 | 43.8 | 5.76–4 | 1002 | 1.4014 | 328.6 | 3.4913 | 0.2007 | 4.32₁₀–4 | 2,313.3 | 6.3904 | 2099.9 |
| 200,000 | 60.61 | 255 | 14.0 | 7.42–5 | 1000 | 1.4025 | 322.6 | 3.4845 | 0.2012 | 1.38₁₀–4 | 7,237 | 7.6622 | 2471.8 |
| 250,000 | 75.76 | 183 | 2.11 | 4.02–5 | 985 | 1.4112 | 272.2 | 3.4319 | 0.2056 | 2.08₁₀–5 | 48,021 | 10.3738 | 2823.7 |

A.4.2

| $\dot{m}_r/\dot{m}$ | $\dot{m}_r/(\dot{m}+\dot{m}_r)$ | $(\dot{m}+\dot{m}_r)/\dot{m}_r$ | $\dot{m}_r/(\dot{m}+\dot{m}_r)$ |
|---|---|---|---|
| 500.000 | 0.9980040 | 1.002 | |
| 1,000.00 | 0.999000999 | 1.001 | |
| 10,000.0 | 00.999900010 | 1.0001 | |
| ∞ | 1 | 1 | 0.0 |

A.4.3
Comparison of Mass-Flow Ratios of a Type 2 Engine With a Type 1 Engine of Identical Efficiency

| $\dot{m}_{r2}/\dot{m}$ | $\dot{m}_{r1}/\dot{m}$ | $\dot{m}_{r1}/\dot{m}_{r2}$ |
|---|---|---|
| \multicolumn{3}{c}{$P_{02}/P_{01} = 2$} |
| 0.1 | 1.337 | 13.4 |
| 0.5 | 1.823 | 3.65 |
| 1 | 2.43 | 2.43 |
| 5 | 7.29 | 1.58 |
| 10 | 13.37 | 1.34 |
| 100 | 122.7 | 1.23 |

A.4.3
Comparison of Mass-Flow Ratios of a Type 2 Engine With a Type 1 Engine of Identical Efficiency

| $\dot{m}_{r2}/\dot{m}$ | $\dot{m}_{r1}/\dot{m}$ | $\dot{m}_{r1}/\dot{m}_{r2}$ |
|---|---|---|
| \multicolumn{3}{c}{$P_{01}/P_{02} = 12$} |
| 0.1 | 2.213 | 22.1 |
| 1 | 4.02 | 4.02 |
| 1 | 4.02 | 4.02 |
| 5 | 12.07 | 2.41 |
| 10 | 22.13 | 2.21 |
| 100 | 203.2 | 2.03 |
| \multicolumn{3}{c}{$P_{01}/P_{02} = 30$} |
| 0.1 | 2.86 | 28.6 |
| 0.5 | 3.91 | 7.82 |
| 1 | 5.21 | 5.21 |
| 5 | 15.62 | 3.12 |
| 10 | 28.64 | 2.86 |
| 100 | 263.0 | 2.63 |
| \multicolumn{3}{c}{$P_{01}/P_{02} = 250$} |
| 0.1 | 5.201 | 52.0 |
| 0.5 | 7.093 | 14.02 |
| 1 | 9.457 | 9.46 |
| 5 | 28.37 | 5.67 |
| 10 | 52.01 | 5.21 |
| 100 | 477.6 | 4.78 |

TABLE A4.4(A)

| | | | | | | | | | | Type 1 Engine | |
|---|---|---|---|---|---|---|---|---|---|---|---|
| | | | | | | $P_{o2}/P_{o1} = 12$ | $\eta TJ = 50.301\%$ | | | For 10,000 lbs.st. Thrust | |
| $\dot{m}_r/\dot{m}$ | $T_{o3}\,°K$ | $\eta_1\,\%$ | $T_{o6}\,°K$ | $\eta_a\,\%$ | $V_e\,m/s$ | $F_e$ | $F_e\,lbs.st.$ | $P_{out}\,MW$ | $P_{out}\,MW$ | Fuel kg/s | $\dot{m}\,kg/s$ |
| 0.1 | 6,377 | 52.68 | 841.59 | 76.47 | 2,558 | 127,908 | 28,753 | 164.0 | 57.04 | 2.5779 | 17.39 |
| 1.0 | 1158.9 | 66.94 | 723.5 | 83.56 | 1090.5 | 54,526 | 12,258 | 29.73 | 24.25 | 0.8627 | 40.79 |
| 5 | 695.4 | 85.86 | 627.5 | 92.97 | 844.7 | 42,237 | 9,495 | 17.84 | 18.79 | 0.5210 | 52.66 |
| 10 | 637.6 | 91.76 | 605.8 | 95.88 | 808.9 | 40,443 | 9,092 | 16.36 | 17.9 | 0.4669 | 55.00 |
| 100 | 585.3 | 99.030 | | | 775.0 | 38,749 | 8,711 | 15.02 | 17.24 | 0.4105 | 57.40 |
| 1000 | 574.9 | 99.901 | | | 768.1 | 38,404 | 8,633 | 14.75 | 17.09 | 0.4072 | 57.92 |
| \multicolumn{12}{c}{$P_{o2}/P_{o1} = 30$ $\eta TJ = 61.5959\%$} |
| 0.1 | 8,250 | 63,824 | 1,011.8 | 86.10 | 3,220 | 160,985 | 36,189 | 259 | 71.57 | 2.6699 | 13.82 |
| 1.0 | 1,499.9 | 76.234 | 893.94 | 90.87 | 1,372.8 | 68,640 | 15,430 | 47.1 | 30.53 | 0.9534 | 32.40 |
| 5 | 899.9 | 90.587 | 797.9 | 96.39 | 1,063.4 | 53,170 | 11,953 | 28.3 | 24.13 | 0.6643 | 40.43 |
| 10 | 824.9 | 94.636 | 776.1 | 97.94 | 1,018.1 | 50,905 | 11,443 | 25.9 | 22.63 | 0.5694 | 43.69 |
| 100 | 757.4 | 99.386 | 752.8 | 99.76 | 975.57 | 48,778 | 10,965 | 23.8 | 21.71 | 0.5199 | 45.60 |
| \multicolumn{12}{c}{$P_{o2}/P_{o1} = 250$ $\eta TJ = 78.8513\%$} |
| 0.1 | 14,980 | 80.40 | 1,623 | 95.85 | 4,909 | 245,440 | 55,175 | 602 | 109.1 | 3.231 | 9.06 |
| 1.0 | 2,724 | 88.17 | 1,506 | 97.94 | 2,093 | 104,655 | 23,527 | 110 | 46.75 | 1.2625 | 22.25 |
| 5 | 1,634 | 95.72 | 1,410 | 99.09 | 1,621 | 81,064 | 18,223 | 65.69 | 36.05 | 0.8967 | 27.44 |
| 10 | 1,498 | 97.62 | 1388 | 99.49 | 1,552 | 77,615 | 17.447 | 60.22 | 34.52 | 0.8418 | 28.66 |
| 100 | 1,375 | 99.735 | 1,364 | 99.95 | 1,487 | 74,371 | 16,719 | 55.28 | 33.06 | 0.7893 | 29.91 |
| 1000 | 1,362 | 99.73213 | 1,362.672 | 99.9943 | 1,480 | 74,008 | 16,637 | 54.76 | 32.91 | 0.7837 | 30.05 |

TABLE A4.4(B)

$\frac{P_{o2}}{P_{o1}} = 1.01 : \eta_{TJ} = 0.2796\%$ Type 1 Engine For 10,000 lbs.st. Thrust

| $\dot{m}_r/\dot{m}$ | $T_{o3}$ °K | $\eta_1$ % | $T_{o6}$ °K | $\eta_2$ % | $V_e$ m/s | $F_e$ | $F_e$ lbs.st. | $P_{out}$ MW | $P_{out}$ MW | Fuel kg/s | $\dot{m}$ kg/s |
|---|---|---|---|---|---|---|---|---|---|---|---|
| 1 | 577.62 | 0.5576 | 432.0 | 0.837 | 57.4 | 2,870 | 645.1 | 82.34 | 1.276 | 5,450 | 775 |
| 5 | 346.568 | 1.6544 | 336.8 | 1.93 | 44.5 | 2,223 | 499.7 | 49.17 | | | 1,000 |
| 10 | 317.688 | 2.9918 | 315.0 | 3.26 | 42.6 | 2,128 | 478.5 | 45.31 | 0.947 | 0.7537 | 1,046 |
| 100 | 291.695 | 22.07 | 291.60 | 22.32 | 40.8 | 2,039 | 485.5 | 41.60 | 0.907 | 0.0979 | 1,092 |
| 1,000 | 289.096 | 73.71 | | | 40.6 | 2,030 | 456.4 | 41.23 | 0.903 | 0.0292 | 1,096 |
| 10,000 | 288.836 | 96.55 | | | | | | | | | |

$\frac{P_{o2}}{P_{o1}} = 1.1 : \eta_{TJ} = 2.646\%$

| 1 | 591.60 | 5.156 | 439.8 | 7.64 | 178.7 | 8935 | 2009 | 0.798 | 3.972 | 1.8343 | 248.9 |
| 10 | 325.41 | 23.02 | 322.0 | 25.06 | 132.5 | 6627 | 1490 | 0.439 | 2.946 | 0.3048 | 335.6 |
| 100 | 299.98 | 66.26 | 299.86 | 66.89 | 127.2 | 6362 | 1430 | 0.404 | 2.82 | 0.1015 | 349.6 |
| 1000 | 296.123 | 96.45 | | | 126.4 | 6321 | 1421 | 0.399 | 2.808 | 0.0693 | 352.1 |

$\frac{P_{o2}}{P_{o1}} = 2.0 : \eta_{TJ} = 17.719\%$

| 0.1 | 3,849 | 19.152 | 611.7 | 33.48 | 1179 | 58,976 | 13,257 | 34.75 | 26.21 | 3.2587 | 37.72 |
| 1 | 700.0 | 30.104 | 4894.0 | 42.49 | 503 | 25,150 | 4,654 | 6,325 | 11.19 | 0.8849 | 88.43 |
| 5 | 421.0 | 56.371 | 393.8 | 63.76 | 390 | 19,505 | 4,385 | 3.80 | 8.665 | 0.3660 | 114.02 |
| 10 | 385.0 | 70.32 | 376.1 | 75.58 | 373 | 18,652 | 4,193 | 3.48 | 8.299 | 0.2810 | 119.25 |
| 100 | 353.5 | 95.60 | 352.8 | 96.38 | 357.2 | 17,860 | 4,015 | 3.19 | 7.945 | 0.1979 | 124.50 |
| 1000 | 350.37 | 99.54 | | | 355.9 | 17,793 | 4,000 | 3.17 | 4,925 | 0.1178 | 125.0 |

TABLE A4.4(C)

$\frac{P_{o2}}{P_{o1}} = 1,000 \; \eta TJ = 85.682\%$ Type 1 Engine For 10,000 lbs.st. Thrust

| $\dot{m}_r/\dot{m}$ | $T_{o3}$ °K | $\eta_1$ % | $T_{o6}$ °K | $\eta_2$ % | $V_e$ m/s | $F_e$ | $F_e$ lbs.st. | $P_{out}$ MW | $P_{out}$ MW | Fuel kg/s | $\dot{m}$ kg/s |
|---|---|---|---|---|---|---|---|---|---|---|---|
| 0.1 | 22,127 | 86.812 | 2,274 | 98.1 | 6219 | 310,950 | 69,902 | 967 | 138.3 | 3.7940 | 7.15 |
| 1.0 | 4,023 | 92.289 | 2,155 | 98.9 | 2652 | 132,588 | 29,806 | 176 | 59.05 | 1.5233 | 16.77 |
| 5 | 2,414 | 97.290 | 2,060 | 99.1 | | | | | | | |
| 10 | 2,213 | 98.503 | 2,038 | 99.786 | 2033 | 101,637 | 22,848 | 103 | 45.08 | 1.0897 | 21.88 |
| 100 | 2,032 | 99.835 | | | | | | | | | |

$\frac{P_{o2}}{P_{o1}} = 10,000 \; \eta TJ = 92.509\%$

| 0.1 | 42,348 | 93.143 | 4,112 | 99.50 | 8,940 | 445,982 | 100,481 | 1,998 | 199.0 | 4.738 | 4.98 |
| 1 | 7,692 | 96.108 | 3,990 | 99.70 | 3,810 | 190,501 | 42,824 | 363 | 84.74 | 2.099 | 11.68 |
| 5 | 4,614 | 98.668 | 3,870 | 99.94 | 2,967 | 148,329 | 33,344 | 220 | | | |
| 10 | 4,229 | 99.270 | | | 2,825 | 141,253 | 31,754 | 199 | 62.83 | 1,507 | 15.75 |
| 100 | 3,883 | 99.820 | | | 2,707 | 135,356 | 30,428 | 183 | 60.14 | 1.433 | 16.43 |

TABLE A4.5

| $T_{o3}/T_{o1}$ | $T_{o2}/T_{o1}$ | $P_{o2}/P_{o1}$ | $T_{o3}^1/T_{o1}$ | $T_{o3}$ | $T_{o3}^1$ | $T_{o3}^1/T_{o3}$ | $P_{o7}/P_{o2}$ | $P_{c7}$ |
|---|---|---|---|---|---|---|---|---|
| 2 | 1.414 | 3.425 | 1.586 | 576 | 457 | 0.793 | 0.438 | 1.502 |
| 3 | 1.732 | 7.044 | 2.268 | 864 | 653 | 0.756 | 0.370 | 2.607 |
| 4 | 2.000 | 11.75 | 3.000 | 1152 | 864 | 0.750 | 3.360 | 4.230 |
| 5 | 2.236 | 17.46 | 3.764 | 1440 | 1084 | 0.753 | 0.365 | 6.371 |
| 6 | 2.449 | 24.12 | 4.551 | 1728 | 1311 | 0.758 | 0.374 | 9.010 |
| 7 | 2.646 | 31.74 | 5.354 | 2016 | 542 | 0.765 | 0.386 | 12.254 |
| 8 | 2.828 | 40.23 | 6.172 | 2304 | 1778 | 0.771 | 9.397 | 15.96 |
| 10 | 3.162 | 59.82 | 7.838 | 2,880 | 2257 | 0.7838 | 0.421 | 25.17 |
| 12 | 3.464 | 82.73 | 9.536 | 3,456 | 2746 | 0.795 | 0.443 | 36.61 |
| 14 | 3.742 | 108.8 | 11.258 | 4,032 | 3242 | 0.804 | 0.461 | 50.11 |
| 16 | 4.000 | 137.9 | 13.00 | 4,608 | 3744 | 0.8125 | 0.478 | 65.93 |

I claim:

1. A thermodynamic gas heat engine comprising:
a gas or working fluid inlet means comprising a first geometry and area;
mixing chamber means wherein inlet gas is entrained and mixed with a recirculating gas;
at least one injector means which incorporates at least one convergent-divergent nozzle comprising a second geometry and area and which generate supersonic flow from the said recirculating gas for compressing said entrained inlet and recirculation gas or at least one working fluid;
a diffuser means, which reduces the velocity of the combined inlet, entrained gas and the recirculating gas, and thus increases the pressure of the combined gas stream, said diffuser optionally including means for the development of shock waves to aid the compression process;
a primary combustion system means used in connection with Joule-Brayton turbo-jet engines;
at least one outlet nozzle having a third geometry and area and optionally arranged to enable the outlet gas to be at least one of choked and unchoked;
at least one scoop means optionally including at least one diffuser-that divert, said at least one scoop means diverting a portion of the gas moving to an engine outlet and so derive said recirculating gas by diverting it to the input of the engine for supplying the said injector means;
duct means for diverting said recirculating gas and diverting said gas to the injector means;
fuel supply means for the primary combustion system means;
diverted cooling gas bleeds means for cooling at least one duct and combustion chambers;
regulation means for regulating the geometry and area of said gas or working fluid inlet means.

2. An engine as in claim 1, further comprising a secondary combustion system placed in the recirculating gas stream having an independently regulated fuel supply system, and wherein the fuel supply system for the direct and recirculating gas combustion system being independently adjustable, and wherein the secondary combustion system means is optionally preceded by diffuser means.

3. An engine as described in claim 2, wherein the engine dispenses with the primary combustion system in the path of the inlet entrained and recirculated gas means, and only incorporates a secondary combustion system means in the recirculating gas path, and wherein the secondary combustion means is optionally preceded by the diffuser means in the recirculating gas path.

4. An engine as described in claim 1, wherein the inlet injector means is directed to not only entrain said gas or working fluid from the inlet but are also directed at an angle about the main inlet to an outlet axis of the engine such that the gas rotates about said outlet axis, and wherein the rotating gas means increases the stored energy in gas or the working fluid and increases the transit time for said gas or working fluid for the purpose that such means enables lower temperatures operating in the engine for a given fuel energy flow and given operating parameters.

5. An engine as described in claim 1, wherein the engine incorporates multiple sets of scoops, ducts, and the injectors-incorporate a variable geometry and area producing multiple stages of injection and compression of the inlet entrained gas or working fluid.

6. An engine as described in claim 1 wherein the engine incorporates one or more sets of multiple scoops and ducts to entrain gas or working fluid external to the engine for the purpose of improving the Froude propulsive efficiency of the engine(s) at certain engine velocities.

7. An engine as described in claim 1 wherein the engine incorporates afterburning means for boosting thrust, and such afterburning means incorporates an independently regulated fuel supply.

8. An engine as described in claim 1 wherein the engine incorporates a turbo-jet engine or auxiliary power unit (APU) for the purpose of supplying auxiliary power to run engine services, and the auxiliary power unit is used for starting said engine by directing an APU outlet gas to the inlet of said engine to start initial gas flow through said engine.

9. An engine as described in claim 1 wherein said engine comprises a thrust component of the net energy output of the engine, and wherein the thrust component is used for the purpose of propelling aircraft or other moving or flying vehicles.

10. An engine as described in claim 1 wherein the engine incorporates turbine means, said turbine means connected by a shaft directly or via reduction gears to at least one electrical generator(s) so that the net energy output of said engines is converted to electrical energy for cogeneration.

11. A thermodynamic gas heat engine comprising:
a gas or working fluid inlet device comprising a first geometry and area;
mixing chamber device wherein inlet gas is entrained and mixed with a recirculating gas;
at least one injector device which incorporates at least one convergent-divergent nozzle comprising a second geometry and area and which generate supersonic flow from the said recirculating gas for compressing said entrained inlet and recirculating gas or at least one working fluid;
a diffuser device, which reduces the velocity of the combined inlet, entrained gas and the recirculating gas, and thus increases the pressure of the combined gas stream, said diffuser optionally including a device for the development of shock waves to aid the compression process;
a primary combustion system device used in connection with Joule-Brayton turbo-jet engines;
at least one outlet nozzle having a third geometry and area and optionally arranged to enable the outlet gas to be at least one of choked and unchoked;
at least one scoop device optionally including at least one diffuser, said at least one scoop device diverting a portion of the gas moving to the engine outlet and so derive said recirculating gas by diverting it to the input of the engine for supplying the said injector device;
duct device for diverting said recirculating gas and diverting said gas to the injector device;
fuel supply device for the primary combustion system device;
diverted cooling gas bleeds device for cooling at least one duct and combustion chambers;
regulation device for regulating at least one of the geometry and area of said gas or working fluid inlet device for regulating the thermodynamic conditions of the working fluid or gas.

12. An engine as in claim 11, further comprising a secondary combustion system placed in the recirculating gas stream having an independently regulated fuel supply system, and wherein the fuel supply system for the direct and recirculating gas combustion system being independently adjustable, and wherein the secondary combustion system device is optionally preceded by diffuser device.

13. An engine as described in claim 12, wherein the engine dispenses with the primary combustion system in the path of the inlet entrained and recirculated gas device, and only incorporates a secondary combustion system device in the recirculating gas path, and wherein the secondary combustion device is optionally preceded by the diffuser device in the recirculating gas path.

14. An engine as described in claim 11, wherein the inlet injector device is directed to not only entrain said gas or working fluid from the inlet but are also directed at an angle about the main inlet to an outlet axis of the engine such that the gas rotates about said outlet axis, and wherein the rotating gas device increases the stored energy in the gas or working fluid and increases the transit time for said gas or working fluid for the purpose that such device enables lower temperatures operating in the engine for a given fuel energy flow and given operating parameters.

15. An engine as described in claim 11, wherein the engine incorporates multiple sets of scoops, ducts, and the injectors incorporate a variable geometry and area device producing multiple stages of injection and compression of the inlet entrained gas or working fluid.

16. An engine as described in claim 11 wherein the engine incorporates one or more sets of multiple scoops and ducts to entrain gas or working fluid external to the engine for the purpose of improving the Froude propulsive efficiency of the engine(s) at certain engine velocities.

17. An engine as described in claim 11 wherein the engine incorporates an afterburning device for boosting thrust, and such afterburning device incorporates an independently regulated fuel supply.

18. An engine as described in claim 11 wherein the engine incorporates a turbo-jet engine or auxiliary power unit (APU) for the purpose of supplying auxiliary power to run engine services, and the auxiliary power unit device is used for starting said engine by directing an APU outlet gas to the inlet of said engine to start initial gas flow through said engine.

19. An engine as described in claim 11 wherein the engine comprises a thrust component of the net energy output of the engine, and wherein the thrust component is used for the purpose of propelling aircraft or other moving or flying vehicles.

20. An engine as described in claim 11 wherein the engine incorporates turbine device, said turbine device connected by a shaft directly or via reduction gears to at least one electrical generator so that the net energy output of said engine is converted to electrical energy for cogeneration.

* * * * *